(12) United States Patent
Bennett et al.

(10) Patent No.: US 7,647,225 B2
(45) Date of Patent: Jan. 12, 2010

(54) ADJUSTABLE RESOURCE BASED SPEECH RECOGNITION SYSTEM

(75) Inventors: Ian M. Bennett, Palo Alto, CA (US); Bandi Ramesh Babu, Anantapur (IN); Kishor Morkhandikar, Gulbarga (IN); Pallaki Gururaj, Bangalore (IN)

(73) Assignee: Phoenix Solutions, Inc., Palo Alto, CA (US)

( * ) Notice: Subject to any disclaimer, the term of this patent is extended or adjusted under 35 U.S.C. 154(b) by 51 days.

(21) Appl. No.: 11/561,568

(22) Filed: Nov. 20, 2006

(65) Prior Publication Data

US 2007/0094032 A1    Apr. 26, 2007

Related U.S. Application Data

(63) Continuation of application No. 11/030,864, filed on Jan. 7, 2005, now Pat. No. 7,139,714, and a continuation of application No. 10/684,357, filed on Oct. 10, 2003, and a continuation of application No. 09/439,145, filed on Nov. 12, 1999, now Pat. No. 6,633,846.

(51) Int. Cl.
*G10L 15/00* (2006.01)
*G10L 15/02* (2006.01)
*G10L 15/22* (2006.01)

(52) U.S. Cl. .............. 704/251; 704/270.1; 704/275; 709/203

(58) Field of Classification Search ............. 704/231, 704/251, 257, 270, 270.1, 275; 709/203
See application file for complete search history.

(56) References Cited

U.S. PATENT DOCUMENTS

| | | | |
|---|---|---|---|
| 4,473,904 A | 9/1984 | Suehiro et al. | |
| 4,521,907 A | 6/1985 | Amir et al. | |
| 4,587,670 A | 5/1986 | Levinson et al. | |
| 4,783,803 A | 11/1988 | Baker et al. | |
| 4,785,408 A | 11/1988 | Britton et al. | |
| 4,852,170 A | 7/1989 | Bordeaux | |
| 4,868,750 A | 9/1989 | Kucera et al. | |
| 4,868,780 A | 9/1989 | Kucera et al. | |
| 4,914,590 A | 4/1990 | Loatman et al. | |
| 4,937,870 A | 6/1990 | Bossemeyer, Jr. | |
| 4,956,865 A | 9/1990 | Lennig et al. | |
| 4,991,094 A | 2/1991 | Fagan et al. | |
| 4,991,217 A | 2/1991 | Garrett et al. | |
| 5,036,539 A | 7/1991 | Wrench et al. | |
| 5,068,789 A | 11/1991 | van Vliembergen | |
| 5,146,405 A | 9/1992 | Church | |
| 5,157,727 A | 10/1992 | Schloss | |
| 5,231,670 A | 7/1993 | Goldhor et al. | |

(Continued)

FOREIGN PATENT DOCUMENTS

EP       1094388       4/2001

(Continued)

OTHER PUBLICATIONS

Buo, Finn Dag et al., "Learning to parse spontaneous speech." Believed to be published in ICSLP, 1996, 4 pages.

(Continued)

*Primary Examiner*—Martin Lerner
(74) *Attorney, Agent, or Firm*—PatentBest; Andrew McAleavey

(57) ABSTRACT

A real-time speech recognition system includes distributed processing across a client and server for recognizing a spoken query by a user. Both the client and server can dedicate a variable number of processing resources for performing speech recognition functions. The partitioning of responsibility for speech recognition operations can be done on a client by client or connection by connection basis.

13 Claims, 31 Drawing Sheets

U.S. PATENT DOCUMENTS

| | | |
|---|---|---|
| 5,265,014 A | 11/1993 | Haddock et al. |
| 5,278,980 A | 1/1994 | Pedersen et al. |
| 5,293,584 A | 3/1994 | Brown et al. |
| 5,317,507 A | 5/1994 | Gallant |
| 5,371,901 A | 12/1994 | Reed et al. |
| 5,384,892 A | 1/1995 | Strong |
| 5,454,106 A | 9/1995 | Burns et al. |
| 5,475,792 A | 12/1995 | Stanford et al. |
| 5,500,920 A | 3/1996 | Kupiec |
| 5,509,104 A | 4/1996 | Lee et al. |
| 5,513,298 A | 4/1996 | Stanford et al. |
| 5,519,608 A | 5/1996 | Kupiec |
| 5,524,169 A | 6/1996 | Cohen et al. |
| 5,540,589 A | 7/1996 | Waters |
| 5,553,119 A | 9/1996 | McAllister et al. |
| 5,602,963 A | 2/1997 | Bissonnette et al. |
| 5,615,296 A | 3/1997 | Stanford et al. |
| 5,625,748 A | 4/1997 | McDonough et al. |
| 5,625,814 A | 4/1997 | Luciw |
| 5,630,121 A | 5/1997 | Braden-Harder et al. |
| 5,652,789 A | 7/1997 | Miner et al. |
| 5,652,897 A | 7/1997 | Linebarger et al. |
| 5,668,854 A | 9/1997 | Minakami et al. |
| 5,675,707 A | 10/1997 | Gorin et al. |
| 5,675,788 A | 10/1997 | Husick et al. |
| 5,675,819 A | 10/1997 | Schuetze |
| 5,680,511 A | 10/1997 | Baker et al. |
| 5,680,628 A | 10/1997 | Carus et al. |
| 5,689,617 A | 11/1997 | Pallakoff et al. |
| 5,694,592 A | 12/1997 | Driscoll |
| 5,696,962 A | 12/1997 | Kupiec |
| 5,699,456 A | 12/1997 | Brown et al. |
| 5,703,935 A | 12/1997 | Raissyan et al. |
| 5,719,997 A | 2/1998 | Brown et al. |
| 5,721,938 A | 2/1998 | Stuckey |
| 5,727,950 A | 3/1998 | Cook et al. |
| 5,730,603 A | 3/1998 | Harless |
| 5,737,485 A | 4/1998 | Flanagan et al. |
| 5,748,841 A | 5/1998 | Morin et al. |
| 5,748,974 A | 5/1998 | Johnson |
| 5,751,907 A | 5/1998 | Moebius et al. |
| 5,758,023 A | 5/1998 | Bordeaux |
| 5,758,322 A | 5/1998 | Rongley |
| 5,765,130 A | 6/1998 | Nguyen |
| 5,774,841 A | 6/1998 | Salazar et al. |
| 5,774,859 A | 6/1998 | Houser et al. |
| 5,794,050 A | 8/1998 | Dahlgren et al. |
| 5,794,193 A | 8/1998 | Gorin |
| 5,797,123 A | 8/1998 | Chou et al. |
| 5,802,251 A | 9/1998 | Cohen et al. |
| 5,802,256 A | 9/1998 | Heckerman et al. |
| 5,802,493 A * | 9/1998 | Sheflott et al. ................. 705/1 |
| 5,802,526 A | 9/1998 | Fawcett et al. |
| 5,819,220 A | 10/1998 | Sarukkai et al. |
| 5,826,227 A | 10/1998 | Jayant |
| 5,836,771 A | 11/1998 | Ho et al. |
| 5,838,683 A * | 11/1998 | Corley et al. ................. 370/408 |
| 5,839,106 A | 11/1998 | Bellegarda |
| 5,842,196 A | 11/1998 | Agarwal et al. |
| 5,855,002 A | 12/1998 | Armstrong |
| 5,860,063 A | 1/1999 | Gorin et al. |
| 5,865,626 A | 2/1999 | Beattie et al. |
| 5,867,817 A | 2/1999 | Catallo et al. |
| 5,870,706 A | 2/1999 | Alshawi |
| 5,873,062 A | 2/1999 | Hansen et al. |
| 5,878,406 A | 3/1999 | Noyes |
| 5,878,423 A | 3/1999 | Anderson et al. |
| 5,884,302 A | 3/1999 | Ho |
| 5,895,466 A | 4/1999 | Goldberg et al. |
| 5,897,616 A | 4/1999 | Kanevsky et al. |
| 5,905,773 A | 5/1999 | Wong |
| 5,913,193 A | 6/1999 | Huang et al. |
| 5,915,236 A | 6/1999 | Gould et al. |
| 5,933,822 A | 8/1999 | Braden-Harder et al. |
| 5,934,910 A | 8/1999 | Ho et al. |
| 5,953,701 A | 9/1999 | Neti et al. |
| 5,956,675 A | 9/1999 | Setlur et al. |
| 5,956,683 A | 9/1999 | Jacobs et al. |
| 5,960,394 A | 9/1999 | Gould et al. |
| 5,960,399 A | 9/1999 | Barclay et al. |
| 5,963,940 A | 10/1999 | Liddy et al. |
| 5,974,413 A | 10/1999 | Beauregard et al. |
| 5,978,756 A | 11/1999 | Walker et al. |
| 5,983,190 A | 11/1999 | Trower, II et al. |
| 5,987,404 A | 11/1999 | Della Pietra et al. |
| 5,987,410 A | 11/1999 | Kellner et al. |
| 5,995,918 A | 11/1999 | Kendall et al. |
| 5,995,928 A | 11/1999 | Nguyen et al. |
| 6,006,221 A | 12/1999 | Liddy et al. |
| 6,009,387 A | 12/1999 | Ramaswamy et al. |
| 6,018,736 A | 1/2000 | Gilai et al. |
| 6,021,384 A | 2/2000 | Gorin et al. |
| 6,023,697 A | 2/2000 | Bates et al. |
| 6,029,124 A | 2/2000 | Gillick et al. |
| 6,032,111 A | 2/2000 | Mohri |
| 6,035,275 A | 3/2000 | Brode et al. |
| 6,038,535 A | 3/2000 | Campbell |
| 6,044,266 A | 3/2000 | Kato |
| 6,044,337 A | 3/2000 | Gorin et al. |
| 6,044,347 A | 3/2000 | Abella et al. |
| 6,052,439 A | 4/2000 | Gerszberg et al. |
| 6,052,656 A | 4/2000 | Suda et al. |
| 6,061,646 A | 5/2000 | Martino et al. |
| 6,076,088 A | 6/2000 | Paik et al. |
| 6,078,886 A | 6/2000 | Dragosh et al. |
| 6,078,914 A | 6/2000 | Redfern |
| 6,081,774 A | 6/2000 | De Hita et al. |
| 6,085,160 A | 7/2000 | D'Hoore et al. |
| 6,088,692 A | 7/2000 | Driscoll |
| 6,094,635 A | 7/2000 | Scholz et al. |
| 6,101,472 A | 8/2000 | Giangarra et al. |
| 6,105,023 A | 8/2000 | Callan |
| 6,112,176 A | 8/2000 | Goldenthal et al. |
| 6,119,087 A | 9/2000 | Kuhn et al. |
| 6,122,613 A | 9/2000 | Baker |
| 6,125,284 A | 9/2000 | Moore et al. |
| 6,125,341 A | 9/2000 | Raud et al. |
| 6,131,085 A | 10/2000 | Rossides |
| 6,138,087 A | 10/2000 | Budzinski |
| 6,138,088 A | 10/2000 | Goeser |
| 6,138,089 A | 10/2000 | Guberman |
| 6,138,091 A | 10/2000 | Haataja et al. |
| 6,138,100 A | 10/2000 | Dutton et al. |
| 6,141,640 A | 10/2000 | Moo |
| 6,144,848 A | 11/2000 | Walsh et al. |
| 6,144,938 A | 11/2000 | Surace et al. |
| 6,157,705 A | 12/2000 | Perrone |
| 6,157,909 A * | 12/2000 | Mauuary et al. ............ 704/228 |
| 6,157,912 A | 12/2000 | Kneser et al. |
| 6,173,260 B1 | 1/2001 | Slaney |
| 6,173,261 B1 | 1/2001 | Arai et al. |
| 6,173,266 B1 | 1/2001 | Marx et al. |
| 6,173,279 B1 | 1/2001 | Levin et al. |
| 6,175,634 B1 | 1/2001 | Graumann |
| 6,178,404 B1 | 1/2001 | Hambleton et al. |
| 6,182,038 B1 | 1/2001 | Balakrishnan et al. |
| 6,182,068 B1 | 1/2001 | Culliss |
| 6,185,535 B1 | 2/2001 | Hedin et al. |
| 6,188,976 B1 | 2/2001 | Ramaswamy et al. |
| 6,192,110 B1 | 2/2001 | Abella et al. |
| 6,192,338 B1 | 2/2001 | Haszto et al. |
| 6,195,636 B1 | 2/2001 | Crupi et al. |
| 6,199,041 B1 | 3/2001 | Liu et al. |
| 6,216,013 B1 | 4/2001 | Cyr et al. |

| | | | | | | |
|---|---|---|---|---|---|---|
| 6,219,643 B1 | 4/2001 | Cohen et al. | | 6,574,597 B1 | 6/2003 | Mohri et al. |
| 6,226,610 B1 | 5/2001 | Keiller et al. | | 6,578,068 B1 * | 6/2003 | Bowman-Amuah ......... 709/203 |
| 6,233,559 B1 | 5/2001 | Balakrishnan | | 6,584,464 B1 | 6/2003 | Warthen et al. |
| 6,243,679 B1 | 6/2001 | Mohri et al. | | 6,587,818 B2 | 7/2003 | Kanevsky et al. |
| 6,246,977 B1 | 6/2001 | Messerly et al. | | 6,587,822 B2 | 7/2003 | Brown et al. |
| 6,246,981 B1 | 6/2001 | Papineni et al. | | 6,594,269 B1 | 7/2003 | Polcyn |
| 6,246,986 B1 | 6/2001 | Ammicht et al. | | 6,594,348 B1 | 7/2003 | Bjurstrom et al. |
| 6,246,989 B1 | 6/2001 | Polcyn | | 6,594,657 B1 | 7/2003 | Livowsky |
| 6,256,607 B1 | 7/2001 | Digalakis et al. | | 6,598,039 B1 | 7/2003 | Livowsky |
| 6,260,008 B1 | 7/2001 | Sanfilippo | | 6,601,026 B2 | 7/2003 | Appelt et al. |
| 6,269,153 B1 | 7/2001 | Carpenter et al. | | 6,604,075 B1 | 8/2003 | Brown et al. |
| 6,269,336 B1 | 7/2001 | Ladd et al. | | 6,609,089 B1 | 8/2003 | Ball et al. |
| 6,278,968 B1 | 8/2001 | Franz et al. | | 6,614,885 B2 | 9/2003 | Polcyn |
| 6,278,973 B1 | 8/2001 | Chung et al. | | 6,615,172 B1 | 9/2003 | Bennett et al. |
| 6,292,767 B1 | 9/2001 | Jackson et al. | | 6,618,726 B1 | 9/2003 | Colbath et al. |
| 6,292,781 B1 | 9/2001 | Urs et al. | | 6,633,839 B2 | 10/2003 | Kushner et al. |
| 6,298,324 B1 | 10/2001 | Zuberec et al. | | 6,633,846 B1 | 10/2003 | Bennett et al. |
| 6,304,864 B1 | 10/2001 | Liddy et al. | | 6,647,363 B2 | 11/2003 | Claassen |
| 6,308,158 B1 | 10/2001 | Kuhnen et al. | | 6,651,043 B2 | 11/2003 | Ammicht |
| 6,311,150 B1 | 10/2001 | Ramaswamy et al. | | 6,661,845 B1 | 12/2003 | Herath |
| 6,311,159 B1 | 10/2001 | Van Tichelen et al. | | 6,665,640 B1 | 12/2003 | Bennett et al. |
| 6,311,182 B1 | 10/2001 | Colbath et al. | | 6,665,644 B1 | 12/2003 | Kanevsky et al. |
| 6,314,398 B1 | 11/2001 | Junqua et al. | | 6,678,655 B1 | 1/2004 | Hoory et al. |
| 6,314,402 B1 | 11/2001 | Monaco et al. | | 6,678,677 B2 | 1/2004 | Roux et al. |
| 6,327,343 B1 | 12/2001 | Epstein et al. | | 6,681,206 B1 | 1/2004 | Gorin et al. |
| 6,327,561 B1 | 12/2001 | Smith et al. | | 6,687,689 B1 | 2/2004 | Fung et al. |
| 6,327,568 B1 | 12/2001 | Joost | | 6,697,780 B1 | 2/2004 | Beutnagel et al. |
| 6,330,530 B1 | 12/2001 | Horiguchi et al. | | 6,701,294 B1 | 3/2004 | Ball et al. |
| 6,336,090 B1 | 1/2002 | Chou et al. | | 6,704,708 B1 | 3/2004 | Pickering |
| 6,341,306 B1 | 1/2002 | Rosenschein et al. | | 6,738,743 B2 | 5/2004 | Sharma et al. |
| 6,345,245 B1 | 2/2002 | Sugiyama et al. | | 6,742,021 B1 | 5/2004 | Halverson et al. |
| 6,356,869 B1 | 3/2002 | Chapados et al. | | 6,745,161 B1 | 6/2004 | Arnold |
| 6,363,349 B1 | 3/2002 | Urs et al. | | 6,757,718 B1 | 6/2004 | Halverson et al. |
| 6,370,504 B1 | 4/2002 | Zick et al. | | 6,766,295 B1 | 7/2004 | Murveit |
| 6,374,219 B1 | 4/2002 | Jiang | | 6,785,647 B2 | 8/2004 | Hutchison |
| 6,374,226 B1 | 4/2002 | Hunt et al. | | 6,785,653 B1 | 8/2004 | White et al. |
| 6,377,944 B1 | 4/2002 | Busey et al. | | 6,785,654 B2 | 8/2004 | Cyr et al. |
| 6,381,594 B1 | 4/2002 | Eichstaedt et al. | | 6,804,330 B1 | 10/2004 | Jones et al. |
| 6,388,056 B1 | 5/2002 | Sundstrom et al. | | 6,807,544 B1 | 10/2004 | Morimoto et al. |
| 6,389,389 B1 | 5/2002 | Meunier et al. | | 6,807,574 B1 | 10/2004 | Partovi et al. |
| 6,393,403 B1 | 5/2002 | Majaniemi | | 6,823,054 B1 | 11/2004 | Suhm et al. |
| 6,397,179 B2 | 5/2002 | Crespo et al. | | 6,823,308 B2 | 11/2004 | Keiller et al. |
| 6,397,181 B1 | 5/2002 | Li et al. | | 6,829,613 B1 | 12/2004 | Liddy |
| 6,397,188 B1 | 5/2002 | Iwasawa | | 6,842,767 B1 | 1/2005 | Partovi et al. |
| 6,408,272 B1 | 6/2002 | White et al. | | 6,850,603 B1 | 2/2005 | Eberle et al. |
| 6,411,926 B1 | 6/2002 | Chang | | 6,851,115 B1 | 2/2005 | Cheyer et al. |
| 6,418,199 B1 | 7/2002 | Perrone | | 6,856,957 B1 | 2/2005 | Dumoulin |
| 6,427,063 B1 | 7/2002 | Cook et al. | | 6,856,960 B1 | 2/2005 | Dragosh et al. |
| 6,434,524 B1 | 8/2002 | Weber | | 6,862,713 B1 | 3/2005 | Kraft et al. |
| 6,434,529 B1 | 8/2002 | Walker et al. | | 6,871,179 B1 | 3/2005 | Kist et al. |
| 6,434,556 B1 | 8/2002 | Levin et al. | | 6,873,953 B1 | 3/2005 | Lennig |
| 6,442,522 B1 | 8/2002 | Carberry et al. | | 6,877,001 B2 | 4/2005 | Wolf et al. |
| 6,446,064 B1 | 9/2002 | Livowsky | | 6,879,685 B1 | 4/2005 | Peterson et al. |
| 6,453,020 B1 | 9/2002 | Hughes et al. | | 6,879,956 B1 | 4/2005 | Honda et al. |
| 6,453,290 B1 | 9/2002 | Jochumson | | 6,885,734 B1 | 4/2005 | Eberle et al. |
| 6,496,799 B1 | 12/2002 | Pickering | | 6,901,366 B1 | 5/2005 | Kuhn et al. |
| 6,499,011 B1 | 12/2002 | Souvignier et al. | | 6,901,399 B1 | 5/2005 | Corston et al. |
| 6,499,013 B1 | 12/2002 | Weber | | 6,904,143 B1 | 6/2005 | Peterson et al. |
| 6,501,966 B1 | 12/2002 | Bareis et al. | | 6,910,003 B1 | 6/2005 | Arnold |
| 6,510,411 B1 | 1/2003 | Norton et al. | | 6,922,733 B1 | 7/2005 | Kuiken et al. |
| 6,513,037 B1 | 1/2003 | Ruber et al. | | 6,934,756 B2 | 8/2005 | Maes |
| 6,513,063 B1 | 1/2003 | Julia et al. | | 6,937,983 B2 | 8/2005 | Romero |
| 6,519,562 B1 | 2/2003 | Phillips et al. | | 6,940,953 B1 | 9/2005 | Eberle et al. |
| 6,519,631 B1 | 2/2003 | Rosenschein et al. | | 6,941,273 B1 | 9/2005 | Loghmani et al. |
| 6,522,725 B2 | 2/2003 | Kato | | 6,944,586 B1 | 9/2005 | Harless et al. |
| 6,523,061 B1 | 2/2003 | Halverson et al. | | 6,961,694 B2 | 11/2005 | Schmid et al. |
| 6,526,382 B1 | 2/2003 | Yuschik | | 6,961,700 B2 | 11/2005 | Mitchell et al. |
| 6,529,866 B1 | 3/2003 | Cope et al. | | 6,961,954 B1 | 11/2005 | Maybury et al. |
| 6,529,871 B1 | 3/2003 | Kanevsky et al. | | 6,964,012 B1 | 11/2005 | Zirngibl et al. |
| 6,532,444 B1 | 3/2003 | Weber | | 6,965,864 B1 | 11/2005 | Thrift et al. |
| 6,539,359 B1 | 3/2003 | Ladd et al. | | 6,965,890 B1 | 11/2005 | Dey et al. |
| 6,560,590 B1 | 5/2003 | Shwe et al. | | 6,970,554 B1 | 11/2005 | Peterson et al. |
| 6,567,778 B1 | 5/2003 | Chao Chang et al. | | 6,970,915 B1 | 11/2005 | Partovi et al. |

| | | | |
|---|---|---|---|
| 6,983,239 B1 | 1/2006 | Epstein | |
| 6,985,852 B2 | 1/2006 | Wang | |
| 6,996,529 B1 | 2/2006 | Minnis | |
| 7,003,079 B1 | 2/2006 | McCarthy et al. | |
| 7,003,463 B1 | 2/2006 | Maes et al. | |
| 7,010,486 B2 | 3/2006 | Peters | |
| 7,020,609 B2 | 3/2006 | Thrift et al. | |
| 7,027,586 B2 | 4/2006 | Bushey et al. | |
| 7,031,925 B1 | 4/2006 | Goldberg | |
| 7,039,166 B1 | 5/2006 | Peterson et al. | |
| 7,043,420 B2 | 5/2006 | Ratnaparkhi | |
| 7,043,439 B2 | 5/2006 | Jost et al. | |
| 7,050,977 B1 * | 5/2006 | Bennett | 704/270.1 |
| 7,058,573 B1 | 6/2006 | Murveit et al. | |
| 7,062,428 B2 | 6/2006 | Hogenhout et al. | |
| 7,065,201 B2 | 6/2006 | Bushey et al. | |
| 7,072,835 B2 | 7/2006 | Konuma et al. | |
| 7,076,049 B2 | 7/2006 | Bushey et al. | |
| 7,082,397 B2 | 7/2006 | Cohen et al. | |
| 7,085,716 B1 | 8/2006 | Even et al. | |
| 7,092,871 B2 | 8/2006 | Pentheroudakis et al. | |
| 7,107,218 B1 | 9/2006 | Preston | |
| 7,127,417 B2 | 10/2006 | Azuma | |
| 7,139,714 B2 * | 11/2006 | Bennett et al. | 704/270.1 |
| 7,143,042 B1 | 11/2006 | Sinai et al. | |
| 7,158,934 B2 | 1/2007 | Honda et al. | |
| 7,177,799 B2 | 2/2007 | Calcagno et al. | |
| 7,194,069 B1 | 3/2007 | Jones et al. | |
| 7,194,409 B2 | 3/2007 | Balentine et al. | |
| 7,197,457 B2 | 3/2007 | Weng et al. | |
| 7,197,460 B1 | 3/2007 | Gupta et al. | |
| 7,200,210 B2 | 4/2007 | Tang | |
| 7,203,643 B2 | 4/2007 | Garudadri | |
| 7,203,646 B2 * | 4/2007 | Bennett | 704/257 |
| 7,206,389 B1 | 4/2007 | Dumoulin et al. | |
| 7,225,125 B2 * | 5/2007 | Bennett et al. | 704/233 |
| 7,231,341 B2 | 6/2007 | Bangalore et al. | |
| 7,231,343 B1 | 6/2007 | Treadgold et al. | |
| 7,236,922 B2 | 6/2007 | Honda et al. | |
| 7,277,854 B2 * | 10/2007 | Bennett et al. | 704/257 |
| 7,349,845 B2 | 3/2008 | Coffman et al. | |
| 7,349,917 B2 | 3/2008 | Forman et al. | |
| RE40,235 E | 4/2008 | Doktor | |
| 7,353,176 B1 | 4/2008 | Baray et al. | |
| 7,356,463 B1 | 4/2008 | Isabelle | |
| 7,359,852 B2 | 4/2008 | Mori et al. | |
| 7,359,860 B1 | 4/2008 | Miller et al. | |
| 7,359,891 B2 | 4/2008 | Nishino et al. | |
| 7,363,223 B2 | 4/2008 | Chaudhari et al. | |
| 7,376,556 B2 * | 5/2008 | Bennett | 704/215 |
| 7,392,185 B2 * | 6/2008 | Bennett | 704/243 |
| 7,398,209 B2 | 7/2008 | Kennewick et al. | |
| 7,555,431 B2 * | 6/2009 | Bennett | 704/255 |
| 2001/0013001 A1 | 8/2001 | Brown et al. | |
| 2001/0016813 A1 | 8/2001 | Brown et al. | |
| 2001/0032083 A1 | 10/2001 | Van Cleven | |
| 2001/0053968 A1 | 12/2001 | Galitsky et al. | |
| 2001/0056346 A1 | 12/2001 | Ueyama et al. | |
| 2002/0032566 A1 | 3/2002 | Tzirkel-Hancock et al. | |
| 2002/0046023 A1 | 4/2002 | Fujii et al. | |
| 2002/0059068 A1 | 5/2002 | Rose et al. | |
| 2002/0059069 A1 | 5/2002 | Hsu et al. | |
| 2002/0086269 A1 | 7/2002 | Shpiro | |
| 2002/0087325 A1 | 7/2002 | Lee et al. | |
| 2002/0087655 A1 | 7/2002 | Bridgman et al. | |
| 2002/0091527 A1 | 7/2002 | Shiau | |
| 2002/0147581 A1 | 10/2002 | Shriberg et al. | |
| 2003/0158738 A1 | 8/2003 | Crosby et al. | |
| 2003/0191625 A1 | 10/2003 | Gorin et al. | |
| 2003/0204492 A1 | 10/2003 | Wolf et al. | |
| 2004/0006465 A1 | 1/2004 | Phillips et al. | |
| 2004/0064447 A1 | 4/2004 | Simske et al. | |
| 2004/0148160 A1 | 7/2004 | Ramabadran | |
| 2004/0148172 A1 | 7/2004 | Cohen et al. | |
| 2004/0225494 A1 | 11/2004 | Mayginnes et al. | |
| 2005/0060158 A1 | 3/2005 | Endo et al. | |
| 2005/0091056 A1 | 4/2005 | Surace et al. | |
| 2005/0131704 A1 | 6/2005 | Dragosh et al. | |
| 2006/0015339 A1 | 1/2006 | Charlesworth et al. | |
| 2006/0111909 A1 | 5/2006 | Maes et al. | |

FOREIGN PATENT DOCUMENTS

| | | |
|---|---|---|
| EP | 1096471 | 5/2001 |
| WO | WO9811534 | 3/1998 |
| WO | WO9948011 | 9/1999 |
| WO | WO9950830 | 10/1999 |
| WO | WO0014727 | 3/2000 |
| WO | WO0017854 | 3/2000 |
| WO | WO0020962 | 4/2000 |
| WO | WO0021075 | 4/2000 |
| WO | WO0021232 | 4/2000 |
| WO | WO0022610 | 4/2000 |
| WO | WO0030072 | 5/2000 |
| WO | WO0030287 | 5/2000 |
| WO | WO0068823 | 11/2000 |
| WO | WO0116936 | 3/2001 |
| WO | WO0118693 | 3/2001 |
| WO | WO0126093 | 4/2001 |
| WO | WO0178065 | 10/2001 |
| WO | WO0195312 | 12/2001 |
| WO | WO0203380 | 1/2002 |

OTHER PUBLICATIONS

Golden, J. et al., "Automatic Topic Identification for Two-level Call Routing," Proc. International Conference on Acoustics, Speech and Signal Processing, vol. 1, pp. 509-512, 1999.

Carbonell, J. et al., Dynamic strategy selection in flexible parsing.) In Proceedings of the 19th annual meeting of the ACL (ACL 81), 1981, pp. 143-147.

Seneff, S. et al., "Galaxy-II: a Reference Architecture for Conversational System Development," Believed to be published in Proceedings of ICSLP98 (1998), 4 pages.

Microsoft Internet Developer, "Add Natural Language Search Capabilities to Your Site with English Query," http://www.microsoft.com/mind/0498/equery.asp, 1998, 9 pages.

Carroll, J. et al., "Dialogue Management in Vector-Based Call Routing," Believed to be published In Proceedings of the Annual Meeting of the Association for Computational Linguistics, 1998, pp. 256-262.

Kaiser, Ed., "Robust, Finite-state Parsing for Spoken Language", Student Session of ACL '99, Jun. 1999, pp. 573-578.

Cox, Richard V. et al., "Speech and Language Processing for Next-Millennium Communications Services," Proceedings of the IEEE, vol. 88, No. 8, Aug. 2000, pp. 1314-1337.

Kuhn, Roland, and Renato De Mori, "The Application of Semantic Classification Trees to Natural Language Understanding," IEEE Transactions on Pattern Analysis and Machine Intelligence, vol. 17, No. 5, May 1995, pp. 449-460.

Unisys Corp., "Natural Language Speech Assistant (NLSA) Capabilities Overview," NLR 3.0, Aug. 1998, Malvern, PA, 27 pages.

European Patent Office search report for EP Application No. 00977144, dated Mar. 30, 2005, 5 pages.

Burstein, A. et al. "Using Speech Recognition In A Personal Communications System," Proceedings of the International Conference on Communications, Chicago, Illinois, Jun. 14-18, 1992, pp. 1717-1721.

V. Digalakis et al., "Quantization of Cepstral Parameters for Speech Recognition over the World Wide Web," believed to be published in: IEEE Journal on Selected Areas of Communications, 22 pages, 1999.

Kuhn, T. et al., "Hybrid In-Car Speech Recognition For Mobile Multimedia Applications," Vehicular Technology Conference, Houston, Texas, May 1999, pp. 2009-2013.

B. Arons, "The Design of Audio Servers and Toolkits for Supporting Speech in the User Interface," believed to be published in: Journal of the American Voice I/O Society, pp. 27-41, Mar. 1991.

L.R. Bahl et al., "A Maximum Likelihood Approach to Continuous Speech Recognition," IEEE Transactions on Pattern Analysis and Machine Intelligence, PAMI-5, pp. 179-190, Mar. 1983. (12 pages).

J.H. Baker, "The Dragon System—An Overview," IEEE Trans. on ASSP Processing, ASSP-23(1): Feb. 24-29, 1975.

L.E. Baum et al., "Statistical Inference for Probabilistic Functions for Finite State Markov Chains," The Annals of Mathematical Statistics, 37: 1554-1563, 1966.

L.E. Baum et al., "A Maximization Technique Occurring in the Statistical Analysis of Probabilistic Functions of Markov Chains," The Annals of Mathematical Statistics, 1970, vol. 41, No. 1, pp. 164-171.

L.E Baum, "An Inequality and Associated Maximation Technique in Statistical Estimation for Probabilistic Functions of Markov Processes," Inequalities-III, pp. 1-8, 1972.

I. Bennett, "A Study of Speech Compression Using Analog Time Domain Sampling techniques," A Dissertation Submitted to the Dept. Of Electrical Engineering and the Committee on Graduate Studies of Stanford University, May 1975, pp. 16-32; 76-111.

V. Digalakis et al., "Product-Code Vector Quantization of Cepstral Parameters for Speech Recognition over the WWW," believed to be published in: Proc. ICSLP '98, 4 pages, 1998.

J.L. Flanagan, "Speech Analysis Synthesis and Perception," 2nd edition, Springer-Verlag Berlin, 1972, pp. 1-53.

G.D. Forney, "The Viterbi Algorithm," Proceedings of the IEEE, vol. 73, pp. 268-278, Mar. 1973.

A. Gersho et al., "Vector Quantization and Compression," Kluwer Academic Publishers, 1991, pp. 309-340.

D. Giuliani et al., "Training of HMM with Filtered Speech Material for Hands-Free Recognition," believed to be published in: Proceedings of ICASSP '99, Phoenix, USA, 4 pages, 1999.

T. Hazen et al., "Recent Improvements in an Approach to Segment-Based Automatic Language Identification," believed to be published in: Proceedings of the 1994 International Conference on Spoken Language Processing, Yokohama, Japan, pp. 1883-1886, Sep. 1994.

D. House, "Spoken-Language Access to Multimedia (SLAM): A Multimodal Interface to the World-Wide Web," Masters Thesis, Oregon Graduate Institute, Department of Computer Science & Engineering, 59 pages, Apr. 1995.

R.A. Hudson, "Word Grammar," Blackman Inc., Cambridge, MA, 1984, pp. 1-14; 41-42; 76-90; 94-98; 106-109; 211-220.

F. Jelinek et al, "Continuous Speech Recognition: Statistical Methods," Handbook of Statistics, vol. 2, P.R. Krishnaiah, Ed. Amsterdam, The Netherlands, North-Holland, 1982, pp. 549-573.

L. Julia et al., "HTTP://WWW.SPEECH.SRI.COM/DEMOS/ ATIS. HTML," believed to be published in: Proceedings AAAI'97: Stanford, pp. 72-76, Jul. 1997.

R. Lau et al, "Webgalaxy-Integrating Spoken Language and Hypertext Navigation," believed to be published in: in Kokkinakis, G. et al., (Eds.) Eurospeech '97, Proceedings of the 5th European Conference on Speech Communication and Technology, Rhodes (Greece), Sep. 22-25, 1997. pp. 883-886, 1997.

P. Lieberman, "Intonation, Perception and Language," Research Monograph No. 38, MIT Press, Cambridge, Mass., 1967, pp. 5-37.

B. Lin et al., "A Distributed Architecture for Cooperative Spoken Dialogue Agents with Coherent Dialogue State and History," believed to be published in: IEEE Automatic Speech Recognition and Understanding Workshop, Keystone, Colorado, USA, 4 pages, Dec. 1999.

B. Lu et al., "Scalability Issues in the Real Time Protocol (RTP)," Project Report for CPSC 663 (Real Time Systems), Dept. of Computer Science, Texas A & M University, 19 pages, 1999.

J. Makhoul et al., "Vector Quantization in Speech Coding," Proceedings of the IEEE, vol. 73, No. 11, Nov. 1985, pp. 1551-1588. (38 pages).

H. Melin, "On Word Boundary Detection in Digit-Based Speaker Verification," believed to be published in: Workshop on Speaker Recognition and its Commercial and Forensic Applications (RLA2C), Avignon, France, Apr. 20-23, pp. 46-49, 1998.

N. Morgan et al., "Hybrid Neural Network/Hidden Markov Model Systems for Continuous Speech Recognition," Journal of Pattern Recognition and Artificial Intelligence, vol. 7, No. 4, 1993, pp. 899-916.

R. Quirk et al., "A Comprehensive Grammar of English Language," Longman, London and New York, 1985, pp. 245-331.

L. Rabiner, "Digital Processing of Speech Signals," Prentice Hall, 1978, pp. 116-171; 355-395.

L. Rabiner, "A Tutorial on Hidden Markov Models and Selected Applications in Speech Recognition," Proceedings of the IEEE, vol. 77, No. 2, Feb. 1989, pp. 257-286. (30 pages).

L. Rabiner et al., "Fundamentals of Speech Recognition," Prentice Hall, 1993, pp. 11-68.

G. Ramaswamy et al., "Compression of Acoustic Features for Speech Recognition in Network Environments," believed to be published in: IEEE International Conference on Acoustics, Speech and Signal Processing, pp. 977-980, Jun. 1998.

L. Travis, "Handbook of Speech Pathology," Appleton-Century-Crofts, Inc., 1957, pp. 91-124.

Agarwal, R., "Towards a Pure Spoken Dialogue System for Information Access, " believed to be published in Proceedings of the ACL/ EACL Workshop on Interactive Spoken Dialog Systems: Bringing Speech and NLP Together in Real Applications, Madrid, Spain, 1997, 9 pages.

Ammicht, Egbert et al., "Knowledge Collection for Natural Language Spoken Dialog Systems," believed to be published in Proc. Eurospeech, vol. 3, p. 1375-1378, Budapest, Hungary, Sep. 1999, 4 pages.

AT&T Corp., "Network Watson 1.0 System Overview," 1998, 4 pages.

AT&T Corp., "AT&T Watson Advanced Speech Applications Platform," 1996, 3 pages.

AT&T Corp., "AT&T Watson Advanced Speech Applications Platform Version 2.0," 1996, 3 pages.

AT&T Corp., "AT&T Watson Advanced Speech Application Platform Version 2.0," 1996, 8 pages.

Gorin, Allen, "Processing of Semantic Information in Fluently Spoken Language," believed to be published in Proc. ICSLP, Philadelphia, PA, Oct. 1996, 4 pages.

Gorin, Allen et al., "How May I Help You," believed to be published in Proc.IVTTA, Basking Ridge, NJ, Oct. 1996, 32 pages.

Mohri, Mehryar, "String Matching With Automata," Nordic Journal of Computing, 1997, 15 pages.

Prudential News, "Prudential Pilots Revolutionary New Speech-Based Telephone Customer Service System Developed by AT&T Labs—Company Business and Marketing," Dec. 6, 1999, 3 pages.

Riccardi, Giuseppe et al., "A spoken language system for automated call routing," believed to be published in Proc. ICASSP '97, 1997, 4 pages.

Sharp, Douglas, et al., "The Watson Speech Recognition Engine," accepted by ICASSP, 1997, 9 pages.

21st Century Eloquence, Inc. (Archived Internet advertisement © 1997-1998), 9 pages.

Appelt, D & Pollack, M., "Weighted abduction for plan ascription," believed to be published in SRI International, Technical Note 491, Menlo Park, CA, 1990, 35 pages.

Baker, Collin F., Fillmore, Charles J., & Lowe, John B., "The Berkeley FranneNet project," believed to be published in Proceedings of the Coling-ACL, Montreal, Canada, 1998, 6 pages.

Beckman, M. E. et al., (1997): Guidelines for ToBl labelling, version 3. The Ohio State University Research Foundation, http://www.ling.ohio-state.edu/research/phonetics/E_ToBl/, 5 pages.

Bengio, Y., "A Connectionist Approach to Speech Recognition," in Advances in Pattern Recognition Using Neural Network Technologies, edited by I Guyon, 1993, 14 pages.

Bennett, I. And J. Linvill, "A Study of Time Domain Speech Compression by Means of a new Analog Speech Processor", Journal of the Audio Engineering Society, vol. 23, No. 9, 1975.

Boersma, P. et al., "Praat, Doing Phonetics by Computer," Institute of Phonetic Sciences, University of Amsterdam, Netherlands, 2004, http://www.praat.org, 3 pages.

Breiman, L. et al., Excertps from "Classification and Regression Trees," Wadsworth, Inc., 1984, pp. 1-173; 216-353.

Coffman, Daniel et al., Provisional Application for Patent, U.S. Appl. No. 60/117,595, filed Jan. 27, 1999, 111 pages.

Cowie, R. et al., "Feeltrace: An instrument for recording perceived emotion in real time," believed to be published in Proc. ISCA ITRW on Speech and Emotion: Developing a Conceptual Framework, R. Cowie, Douglas-Cowie, and E. Schroder, Eds., Belfast, 2000.

Creative Labs (VoiceAssist.™ "User's Guide" © Jul. 1993), 4 pages.

Dejong, G., "Skimming newspaper stories by computer," New Haven, CT: Department of Computer Science, Yale University, Research Report 104,1977, pp. 1-31.

Drucker, H. et al., "Boosting Performance in Neural Networks," in Advances in Pattern Recognition Using Neural Network Technologies, edited by I Guyon, 1993, 11 pages.

Gildea, D. et al., "Automatic Labeling of Semantic Roles," Computational Linguistics 28(3) (2002), 43 pages.

Graesser, A. C. et al., "AutoTutor: A simulation of a human tutor," Journal of Cognitive Systems Research 1 (1999) 35-51.

Graesser, A. C., Wiemer-Hastings, P., Wiemer-Hastings, K., Harter, D., Person, N., and the TRG (in press), "Using latent semantic analysis to evaluate the contributions of students in AutoTutor," Interactive Learning Environments, 33 pgs.

Grice, H. P., "Utterer's meaning and intentions," Philosophical Review, 68(2), 1969, pp. 147-177.

Grosz, B. & Kraus, S., "Collaborative plans for complex group action," Artificial Intelligence 86 (2); 269-357, 1996.

Grosz, B. et al., "Attention, intentions and the structure of discourse," Computational Linguistics,12(3):175—204, 1986.

Grosz, B. et al., "Some intonational characteristics of discourse structure," believed to be published In International Conference on Spoken Language Processing, 1992, 10 pages.

Hobbs, J. & Evans, D., "Conversation as planned behavior," Cognitive Science 4(4), 1980, pp. 349-377.

Hobbs, J., Stickle, M., Appelt, D. & Martin P. (1993). "Interpretation as Abduction," believed to be published in Artificial Intelligence, 63(1-2), 68 pages.

Kim, E-Y., et al., "Comparison of Neural Network and K-NN Classification Methods in Vowel and Patellar Subluxation Image Recognitions," in Advances in Pattern Recognition Using Neural Network Technologies, edited by I Guyon, 1993, 8 pages.

Kim, H. et al., "A Bitstream-Based Front-End for Wireless Speech Recognition on IS-136 Communications System," IEEE Transactions on Speech and Audio Processing, vol. 9, No. 5, pp. 558-568, Jul. 2001.

Lascarides, A. & Asher, N., "Discourse relations and defeasible knowledge," believed to be published in Proceedings of the 29th Annual Meeting of the Association for Computational Linguistics (ACL '91), Berkeley, CA, 1991. pp. 55-62.

Lascarides, A. & Oberlander, J., (1992). "Temporal Coherence and Defeasible Knowledge," believed to be published in Theoretical Linguistics, 19, 34 pages.

Lewis, D., "Scorekeeping in a language game," Journal of Philosophical Logic 6, 1979, pp. 339-359.

Litman, D. et al., "Designing and Evaluating an Adaptive Spoken Dialogue Systenn,"User Modeling and User-Adapted Interaction 12: 111-137, 2002.

Lochbaum, K., "Using Collaborative Plans to Model the Intentional Structure of Discourse," PhD thesis, Harvard University, 1994, pp. 1-158.

McRoy, S. "The Repair of Speech Act Misunderstandings by Abductive Inference," Computational Linguistics 21, 4 (Dec. 1995), 44 pages.

McRoy, Susan W. and Hirst, Graeme (1993a). "Abductive explanation of dialogue misunderstandings," in Proceedings of the 6th conference of the European chapter of the Association for Computational Linguistics, Utrecht, The Netherlands, pp. 277-286.

Meunier, J., "RTP Payload Format for Distributed Speech Recognition," 48th IETF AVT WG—Aug. 3, 2000, 10 pages, 2000.

Perlis, D., Purang, K., & Anderson C. "Conversational Adequacy: Mistakes are the Essence," Dept. of Computer Science, University of Maryland, College Park MD, Jan. 10, 1997 as found at http://www.cs.umd.edu/projects/active/active.html, pp. 1-47.

Perrault, C. & Allen, J., (1980). "A Plan-Based Analysis of Indirect Speech Acts," American Journal of Computational Linguistics, 6(3-4), pp. 167-182.

Plutchik, R. Editor et al., Excerpts from "Circumplex Models of Personality and Emotions," Washington, APA, 1997, pp. 1-151.

Plutchik, R. Editor et al., Excerpts from "Circumplex Models of Personality and Emotions," Washington, APA, 1997, pp. 155-295.

Plutchik, R. Editor et al., Excerpts from "The Psychology and Biology of Emotion," HarperCollins College Publishers, 1994, pp. 1-171; 362-387.

Pollack, M., "A model of plan inference that distinguishes between the beliefs of actors and observers," believed to be published in Proceedings of 24th Annual Meeting of the Association for Computational Linguistics, New York, 1986, pp. 207-214.

Rayner, M. & Alshawi, H., (1992), "Deriving Database Queries from Logical Forms by Abductive Definition Expansion," believed to be published in Proceedings of the Third Conference of Applied Natural Language Processing, Trento, Italy, pp. 1-8.

Rieger, C., "Conceptual Memory: A Theory and Computer Program for Processing the Meaning Content of Natural Language Utterances," Stanford, CA: Stanford Artificial Intelligence Laboratory, Memo AIM-233, 1974, pp. 1-23.

Sand Cherry Networks, SoftServer product literature, 2 pages, 2001.

Schank, R., "Conceptual Information Processing," New York: Elsevier, 1975, pp. 1-21.

Schank, R., Lebowitz, M., & Birnbaum, L., "An integrated understander," American Journal of Computational Linguistics, 6(1), 1980, pp. 13-30.

Searle, J., "Speech Acts: An Essay in the Philosophy of Language," Cambridge: Cambridge University Press, 1969, pp. 3-53.

Shriberg, E. et al., "Can Prosody Aid the Automatic Classification of Dialog Acts in Conversational Speech?" believed to be published in Language and Speech 41(34). Special Issue on Prosody and Conversation, 1998, 55 pages.

Sperber, D. & Wilson, D., "Relevance: Communication and Cognition," Cambridge, MA: Harvard University Press, 1986, pp. 1-64.

Taylor, P. et al., "Chapter 10, Classification and Regression Trees," Edinburgh Speech Tools Library, System Documentation, Edition 1.2, http://festvox.org/docs/speech_tools-1.2.0/c16616.htm, Centre for Speech Technology, Univ. of Edinburgh, (2003), 9 pages.

Tsakalidis, S. et al., "Efficient Speech Recognition Using Subvector Quantization and Discrete-Mixture HMMs," believed to be published in: Proc. ICASSP '99, 4 pages, 1999.

Whissell, C. "The Dictionary of Affect in Language," in Emotion: Theory, Research, and Experience, edited by R. Plutchik et al., Academic Press Inc., 1989, 11 pages.

Zavaliagkos, G. et al., "A Hybrid Continuous Speech Recognition System Using Segmental Neural Nets with Hidden Markov Models," in Advances in Pattern Recognition Using Neural Network Technologies, edited by I Guyon, 1993, 11 pages.

Jurafsky, Daniel et al.; "The Berkeley Restaurant Project," To appear in ICSLP-94, International Computer Science Institute, Berkeley, CA, 4 pages, 1994.

Periphonics, IWR Reference Manual, publication #9070713(l) rev. 1.0, Dec. 13, 1996, 110 pages.

Periphonics, ASE 4.5.3 Release Notes (Software Release 4.5.3), publication #9070721(l), Oct. 6, 1997, 48 pages.

Periphonics, VPS/is Models 9500/IP and 9500/SN Product Description, publication #9050213(l), Jun. 14, 1996, 96 pages.

Periphonics, Voice Activated Dialing Product Description, publication #9050214(l), Jun. 16, 1997, 26 pages.

Periphonics, PeriWeb User's Guide (Software Release5.3.1/4.6.0), publication #9071308(l) rev. 2.2, Jan. 15, 1998, 158 pages.

Periphonics,VPS/is Features Application Programming Reference Manual (Software Release 5.4.0), publication # 9071310(1) rev. 1.5, Jul. 15, 1999, 428 pages.

Periphonics, VPS Model 9XXX Product Overview, publication # 9050202S(I), Oct. 18, 1990, 10 pages.

Coffman, Daniel, et al., U.S. Appl. No. 60/117,595, 111 pages, Jan. 27, 1999.

Coffman, Daniel, et al., U.S. Appl. No. 60/102,957, 88 pages, Oct. 2, 1998.

Wooters, Charles, Lexical Modeling in a Speaker Independent Speech Understanding System, International Computer Science Institute, 20 pages, Nov. 1993.

Ward, Wayne, The CMU Air Travel Information Service: Understanding Spontaneous Speech, School of Computer Science Carnegie Mellon University, 3 pages, 1990.

Denton, J.S., Final Report on Speech Recognition Research Dec. 1984 to Apr. 1990, School of Computer Science Carnegie Mellon University, 70 pages, Jul. 23, 1992.
Allen, James, et al., A Robust System for Natural Spoken Dialogue, Proceedings of 34th Annual Meeting of the ACL, 10 pages, Jun. 18, 1996.
Rahim, Mazin, et al. W99—A Spoken Dialogue System for the ASRU'99 Workshop, AT&T Labs 4 pages, 1999.
Internal Publication, Call for Papers, 1999 IEEE Automatic Speech Recognition and Understanding workshop,2 pages, Dec. 12-15, 1999.
Ward, Wayne et al., The CU Communicator System, Center for Spoken Language Research University of Colorado Boulder, 4 pages, 1999.
Peckham, Jeremy, Speech Understanding and Dialogue over the telephone: an overview of the Esprit Sundial project, Logica, 14 pages, Sep. 24-26, 1991.
Neumeyer, Leonardo, SRI International Speech Technology and Research (STAR) Laboratory Announces Speech-Enabled Web Access, Speech Technology and Research Laboratory, 2 pages, Jun. 27, 1996.
Murveit, Hy, et al., Speech Recognition in SRI's Resource Management and ATIS Systems, SRI International, 7 pages, 1991.
Digalakis, V. et al., Genones: Generalized Mixture Tying in Continuous Hidden Markov Model-Based Speech Recognizers, Technical University of Crete and Nuance Communications, 28 pages, Dec. 6, 1995.
Jackson, Eric, et al., A Template Matcher for Robust NL Interpretation SRI International, 5 pages, 1991.
Rabiner, Lawrence, Applications of Speech Recognition in the Area of Telecommunications, AT&T Labs, 10 pages, 1997.
David Goddeau, et al., Galaxy: A Human-Language Interface To On-Line Travel Information, Spoken Language Systems Group MIT Lab for Computer Science, 4 pages, Sep. 18-22, 1994.
Victor Zue, et al., The Voyager Speech Understanding System: Preliminary Development and Evaluation Spoken Language Systems Group MIT Lab for Computer Science, 4 pages, 1990.
Lee, Steven, et al., Real-time Probabilistic Segmentation For Segment-based Speech Recognition, Spoken Language Systems Group MIT Lab for Computer Science, 4 pages, 1998.
Seneff,Stephanie, et al., Organization, Communication, and Control in the Galaxy-II Conversational System Spoken Language Systems Group MIT Lab for Computer Science, 4 pages, 1999.
Glass, James, Challenges for Spoken Dialogue Systems, Spoken Language Systems Group MIT Lab for Computer Science, 10 pages, 1999.
Zue, Victor, Toward Systems that Understand Spoken Language, ARPA Strategic Computing Initiative 9 pages, Feb. 1994.
Zue, Victor, Human Computer Interactions Using Language Based Technology, 1994 International Symposium on Speech, Image Processing and Neural Networks,7 pages,Apr. 13, 1994.
Meng, Helen, Wheels: A Controversial System in the Automobile Classifieds Domain, Spoken Language Systems Group MIT Lab for Computer Science, 4 pages, 1996.
Seneff, Stephanie, et al., A New Restaurant Guide Conversational System: Issues in Rapid Prototyping for Specialized Domains, Spoken Language Systems Group MIT Lab for Computer Science, 5 pages, 1996.
Seneff, Stephanie, Dialogue Management in the Mercury Flight Reservation System, Spoken Language Systems Group MIT Lab for Computer Science, 6 pages, May 2000.
Taylor, Dennis, E-Trade calls on voice-recognition system, The Business Journal, 3 pages, Dec. 22, 1997.
Internal Publication—Datasheet, Intel Dialogic Voice Boards, Intel, 18 pages, Mar. 12, 1997.
Business and High Tech Editors, Mapquest.com and SpeechWorks to Develop First Speech Recognition Application for Accessing Driving Directions Over the Phone Business Wire, 3 pages, Sep. 13, 1999.
Nuance, Nuance Speech Recognition System Version 6, Nuance Developer's Manual, 406 pages, 1997.
Dougherty, Bruce, Charles Schwab and Nuance Communications Redefine Telephone-based Customer Information Services Nuance Communications, 2 pages, Sep. 1996.

Lamel, L. et al., The LIMSI Arise System, Spoken Language Processing Group, 6 pages, 1996.
Internal Document, Speech Processing, Transmission and Quality aspects, ETSI Standard, 20 pages, 2000.
Internal Document, Work Programme, ETSI Standard, 1 page, Jul. 27, 2008.
Robins, Marc, Speaking in Tongues: Speech Recognition Goes Mainstream Voice Processing Magazine, 9 page, Apr. 1994.
Internal Document, Implementation of New Technologies-Applications and Human Considerations, AVIOS '91, 41 pages,1991.
Lee, Kai Fu, et al. The Spoken Word, Byte Magazine, 7 pages, Jul. 1990.
Meisel, William, Adding Intelligence in Speech Recognition, Speech Systems Incorporated,11 pages, Jun. 1987.
Patty Price et al., Spoken Language System Integration and Development, SRI International, 8 pages, Oct. 27, 1990.
Carlson, Rolf, Recent Developments in The Experimental "Waxholm" Dialog System, Department of Speech Communication and Music Acoustics, KTH, 6 pages, 1994.
Smith, Graeme, Development Tools for Speech Recognition, BBN Hark Systems Corporation, 9 pages, 1993.
Meisel, William, Straight Talk about Speech Recognition,Business Communications Review, 5 pages, Aug. 1996.
Martin, Paul et al., SpeechActs: A Spoken-Language Framework, Computer Journal, 8 pages, Jul. 1996.
Internal Document, Automated Speech Recognition (ASR) Tutorial, 36 pages, Jan. 10, 1996.
Internal Document, New version of Unisys speech understanding software, Speech Recognition Update, 2 pages, Apr. 1997.
Wang, Hsien Chang et al., A Telephone Number Inquiry System with Dialog Structure, Institute of Information Engineering, National Cheng-Kung University, 4 pages, May 1998.
Commercial Speech Recognition, 10 pages, Apr. 17, 1999.
Hollman, Lee, IVR Systems Talk Back: The Speech Recognition Revolution, CallCenter Journal, 7 pages, Nov. 1999.
Scholz, Bill, The Natural Language Interpretation of Speech Recognizer Output, Unisys Corporation, 31 pages, 1999.
Mangold, Helmut, Chair, Collection of Abstracts from Systems, architectures, interfaces, Eurospeech'99, 9 pages, 1999.
Rodriguez, L.J. et al., An Integrated System for Spanish CSR Tasks, Universidad del Pais Vasco, 4 pages, 1999.
Billa, J. et al, Recent Experiments in Large Vocabulary Conversational Speech Recognition, BBN Technologies, 4 pp., 1999.
Jeanrenaud, et al., A Multimodal, Multilingual Telephone Application: The Wildfire Electronic Assistant, Wildfire Communications Inc., 4 pages, Sep. 5-9, 1999.
Kamm, Candace et al., The role of speech processing in human-computer intelligent communication, Speech Communication Journal, 15 pages, Aug. 22, 1997.
Hastings, John, Design and Implementation of a Speech Recognition Database Query System, Department of Computer Science the University of Wyoming, 55 pages, Aug. 1991.
Zhang, Weiqi et al., The Study on Distributed Speech Recognition System, Intel Architecture Development Lab, 4 pages, Jun. 2000.
Koumpis, Konstantinos et al., Corporate Activities in Speech Recognition and Natural Language: Another "New-Science"—based Technology, Dept of Computer Science University of Sheffield, 34 pages, Sep. 1999.
Sutton, Stephen et al., Universal Speech Tools: The CSLU Toolkit, Center for Spoken Language Understanding, Oregon Graduate Institute et al., 4 pages, 1998.
Moore, Robert, Using Natural-Language Knowledge Sources in Speech Recognition, Microsoft Research, 23 pages, 1999.
Young, Steve et al., The HTK Book, Microsoft Corporation, 368 pages, Dec. 1995.
Lunati, Jean Michel et al., The design of a spoken language interface, School of Computer Science Carnegie Mellon University, 5 pages, 1990.
Pateras, Claudia et al., A Mixed-Initiative Natural Dialogue System for Conference Room Reservation, Nortel Networks, 4 pages, 1998.
Luperfoy, Susann et al., An Architecture for Dialogue Management, Context Tracking, and Pragmatic Adaptation in Spoken Dialogue Systems, The Mitre Corporation, 8 pages, 1998.

Traum, David, Conversational Agency: The Trains-93 Dialogue Manager, Universite de Geneve, 11 pages, 1996.

Young, Sheryl et al., High Level Knowledge Sources in Usable Speech Recognition Systems, Communications of the ACM, 12 pages, Feb. 1989.

Young, Steve, Large Vocabulary Continuous Speech Recognition: a Review, Cambridge University Engineering Department, 23 pages, Apr. 8, 1996.

Kiss, Imre et al., Robust Feature Vector Compression Algorithm for Distributed Speech Recognition, Nokia Research Center, 5 pages, Sep. 5-9, 1999.

Austin, Steve et al., Toward a Real-Time Spoken Language System Using Commercial Hardware, BBN Systems and Technologies Inc., 6 pages, 1990.

Stolzle, A. et al., Hardware for Hidden Markov Model Based Large Vocabulary Real Time Speech Recognition, UC Berkeley, 7 pages, Jun. 15, 1990.

Wilpon, Jay et al., Speech Recognition in the AT&T Telephone Network, AT&T Bell Laboratories, 11 pages, 1990.

Glass, James et al., Real-Time Telephone Based Speech Recognition in the Jupiter Domain, MIT Spoken Language Systems Group, 4 pages, 1999.

Hemphill, Charles et al., Accessing Information by Voice on the World Wide Web, Texas Instruments and Stanford University, 6 pages, 1996.

Suarez, Ruth et al., UNISYS and MediaSoft Team for Natural Understanding, Voice Technology and Services News, 1 page, Feb. 18, 1997.

Schwartz, Rich, Chair, CSR Search, 1 page, Mar. 11, 1994.

Businessweek, Cool Applications that Listen to What You Say, Business Week Special Report, 2 pages, Feb. 13, 1998.

Barchard, Richard, Speech Comes to the Call Center, Application Development Journal, 6 pages, Apr. 1998.

Tu, Zhemin et al., Speech Recognition over the Internet using Java, University of Arkansas at Little Rock, 4 pages, Mar. 1999.

Bayer, Samuel, Embedding Speech in Web Interfaces, The MITRE Corporation, 4 pages, 1996.

Goddeau, David et al., Deploying Speech Applications over the Web, Digital Equipment Corporation, 4 pages, 1997.

House, David, Spoken-Language Access to Multimedia (SLAM): A Multimodal Interface to the World-Wide Web, Oregon Graduate Institute, 39 pages, 1995.

Internal Publication, InterVoice System Product Description Manual, InterVoice, 7 pages, Apr. 15, 1995.

Internal Publication, OSCAR Feature Documentation, Periphonics, 22 pages, Sep. 15, 1995.

Internal Publication, VRNA 2000 Product Description, Periphonics, 36 pages, Apr. 29, 1993.

Internal Publication, VPS/VAS Model 7XXX/9XXX Product Description, Periphonics, 48 pages, Jan. 28, 1994.

Internal Publication, VPS/sp Model 7XXX/9XXX Product Description, Periphonics, 52 pages, Apr. 4, 1994.

Internal Publication, Company Background, ALTech, 4 pages, Aug. 31, 1998.

Richman, Lauren, ASRNews, ALTech, 1 page. Aug. 1998.

Internal Publication, Demos, ALTech Free Stock Service, 2 pages, Jul. 16, 1997.

Internal Publication, ALTech Partners and Solutions, ALTech, 3 pages, Dec. 18, 1997.

Internal Publication, Enabling Software Technologies for Antares, Dialogic, 3 pages, Mar. 12, 1997.

Press Release, ALTech's SpeechWorks System Brings Speech-Enabled Yellow Pages To BellSouth Customers, ALTech, 2 pages, Jan. 20, 1998.

Internal Publication, Dialogic D/41 ESC, Dialogic, 10 pages, 2002.

Taylor, Dennis, E-Trade calls on voice-recognition system, The Business Journal, 3 pages, Dec. 22, 1997.

Press Release, ALTech and InterVoice Combine to Develop E*Trade's Speech-Enabled Telephone Investing, ALTech, 3 pages, Dec. 8, 1997.

Internal Publication, DialogModules: The Key to Rapid Systems Development, ALTech, 2 pages, Jan. 9, 1998.

Internal Publication, SpeechWorks in Brokerage: A Broad Spectrum of Applications, ALTech, 3 pages, Jan. 9, 1998.

Internal Publication, SpeechWorks in Brokerage: Solution Services, ALTech, 2 pages, Jan. 9, 1998.

Internal Publication, SpeechWorks in Brokerage: Demonstrations, ALTech, 2 pages, Jan. 9, 1998.

Internal Publication, Springware, Dialogic, 7 pages, Mar. 26, 1998.

Datasheet, Intel Dialogic D/240PCI-T1, D/2405C=T1, D/300PCI-E1, and D/300SC-E1 Voiice Boards, Intel, 18 pages, 1998-2004.

Webpage, CU Communicator Spoken Dialog System, The Center for Spoken Language Research, 6 pages, Jun. 1999.

Furui, Sadaoki, Automatic Speech Recognition and its Application to Information Extraction, Tokyo Institute of Technology, 10 pages, 1999.

Cheyer, Adam et al., Using a Community of Distributed Electronic Agents to Support a Highly Mobile, Ambient Computing Environment, Provisional Patent 60-124718, 14 pages, Mar. 17, 1999.

Cheyer, Adam et al., Using a Community of Distributed Electronic Agents to Dynamically Monitor and Support the Negotiation of Electronic Transactions, U.S. Appl. No. 60/124,719, 21 pages, Mar. 17, 1999.

Cheyer, Adam, An "Invisible" User Interface Providing a High Degree of Integration Across Multiple Applications in a Personal Computer Environment, U.S. Appl. No. 60/124,720, 9 pages, Mar. 17, 1999.

Woodland, Phil et al., Cued HTK Large Vocabulary Recognition Systems, HTK, 3 pages, Sep. 2000.

Clarkson, Philip et al., Statistical Language Modeling Using the CMU-Cambridge Toolkit, Cambridge University Engineering Department, 4 pages, 1997.

Hain, T. et al., The 1998 HTK System for Transcription of Conversational Telephone Speech, Cambridge University Engineering Department, 4 pages, 1999.

Woodland, et al., HTK Speech Recognition Toolkit, HTK, 3 pages, Sep. 2000.

Odell, J. et al., The CUHTK-Entropic 10xRT Broadcast News Transcription System, Entropic Ltd et al., 5 pages, 1998.

Woodland, Phil et al., the HTK Large Vocabulary Recognition System for the 1995 ARPA H3 Task, Cambridge University Engineering Dept, 6 pages, 1995.

Woodland, Phil et al., The Development of the 1996 HTK Broadcast News Transcription System, Cambridge University Engineering Dept, 6 pages, 1996.

Woodland, Phil et al., The 1997 HTK Broadcast News Transcription System, Cambridge University Engineering Dept., 8 pages, 1997.

Woodland, Phil et al., The 1998 HTK Broadcast News Transcription System: Development and Results, Cambridge University Engineering Dept., 6 pages, 1998.

Woodland, Phil et al., The 1994 HTK Large Vocabulary Speech Recognition System, Cambridge University Engineering Dept., 4 pages, 1995.

Woodland, Phil et al., Experiments in Broadcast News Transcription, Cambridge University Engineering Dept., 4 pages, 1997.

Entropic, 16.1 SLF Files, 1 page, 1999.

Entropic, 16.5 Example SLF file, 2 pages, 1999.

Entropic, 5.15 Summary, 4 pages, 1999.

Entropic, About Entropic, 2 pages, 1999.

Entropic, Entropic HTK, 6 pages, 1999.

Entropic, 1.1 General Principles of Recognition, 4 pages, 1998.

Entropic, 2.6 Speech Input/Output, 2 pages, 1998.

Entropic, 3.6 Results Processing, 4 pages, 1998.

Entropic, 4.3 Alternative Hypotheses, 3 pages, 1998.

Entropic, HAPI Book Table of Contents, 6 pages, 1998.

Entropic, An Introduction to HAPI, 2 pages, 1998.

Entropic, HTK Book Table of Contents, 6 pages, 1999.

Entropic, Entropic Press Release, 2 pages, Nov 1998.

Entropic, Entropic Press Release, 2 pages, Aug 1998.

Entropic, Network, Dictionaries and Language Models, 2 pages, 1999.

Entropic, 12.7 N-Best Lists and Lattices, 2 pages, 1999.

Entropic, 5.1 General Mechanism, 3 pages, 1999.

Entropic, Entropic Truetalk Products, 1 page, 1988.

Maes et al., File history for U.S. patent 7,003,462, 377 pages, Oct. 1, 1999.
Internal Document, Corona Speech Recognition System Developer's Manual, Corona Corporation,143 pages,1994.
Internal Document, Corona Speech Recognition System Developer's Manual UNIX, Corona Corporation,219 pages,1995.
Internal Document, Nuance Speech Recognition System Developer's Manual Version 4.0.1 For The UNIX Operating system, Nuance Communications,221 pages,1995.
Denenberg, L. et al., Gisting Conversational Speech in Real Time, BBN Systems and Technologies,4 pages,1993.
Zue, Victor et al., Conversational Interfaces: Advances and Challenges, Proceedings of the IEEE,15 pages, Aug. 2000.
Chien, Lee Feng et al., Internet Chinese Information Retrieval Using Unconstrained Mandarin Speech Queries Based on a Client Server Architecture and a PAT tree-based Language Model, IEEE, 4 pages, 1997.
Cox, Richard et al., Scanning the Technology On the Applications of Multimedia Processing to Communications, Proceedings of the IEEE, 70 pages, May 1998.
Glass, J. et al., A Bilingual Voyager System, MIT, 6 pages, Sep. 1993.
Danielsen, Peter, The Promise of a Voice enabled Web, Lucent Technologies, 3 pages, Aug. 2000.
Internal Document, Speech Processing, Transmission and Quality aspects; Distributed speech recognition; frontend feature extraction algorithm; compression algorithms, ETSI Standard, 20 pages, 2000.
Hemphill, Charles et al., Speech Aware Multimedia, Texas Instruments Inc, 5 pages,1996.
Kondo, Kazuhiro et al., Surfin' the World Wide Web with Japanese, Texas Instruments Personal Systems Lab, 4 pages, 1997.
Internal Document, Voice eXtensible Markup Language, VoiceXML Forum,101 pages, Mar. 7, 2000.
White, Jim, Voice Browsing, Internet Computing, 2 pages, Feb. 2000.
Levin, Esther et al., Spoken Language Dialogue: From Theory to Practice, AT&T Bell Labs Research, 4 pages, Dec. 1999.
Rudnicky, A. et al., An Agenda Based Dialog Management Architecture for Spoken Language Systems, IEEE ASRU Workshop, 4 pages,1999.
Ellis, Daniel et al., Investigations into Tandem Acoustic Modeling for the Aurora Task, Proc. Eurospeech01, Special Event on Noise Robust Recognition, 4 pages, 2001.
Hermansky, Hynek, et al., Tandem Connectionist Feature Extraction for Conventional HMM Systems, in Proc. ICASSP, 4 pages, 2000.
Adami , Andre et al., Qualcomm-ICSI-OGI Features for ASR, ICSLP-2002, Denver, Colorado, USA, 4 pages, Sep. 2002.
Karna, Kamal, Artificial Intelligence for man machine interface, Computer Magazine, 2 pages, Sep. 1984.
Hayesroth, Frederick The Knowledge Based Expert System: A Tutorial, Proc. IEEE 1984,17 pages, Sep. 1984.
Rich, Elaine, Natural Language Interfaces, Proc. IEEE 1984, 9 pages, Sep. 1984.
Mangione, Paul, Speech Recognition and Office Automation, in Voice I/O Systems Applications Conference '85, American Voice I/O Society (AVIOS), 12 pages, Sep. 10, 1985.
Houle, G.R. et al., Software Interface for Keyword Spotting Applications, Lockeed Missiles & Space Company, 13 pages, 1987.
Anonymous, American Express Credit Authorization Voice Response System, AVIOS 1987 Conference, 4 pages, 1987.
Dunn, Marcia, Computers learning to be as literate as humans, The Arizona Republic, 2 pages., Sep. 25, 1988.
Bingham, Sanford, Computers Know What We're Saying, Inbound/Outbound, 5 pages, Oct. 1980.
Pallett, D.S. et al., Preliminary DARPA ATIS Test Results,NIST/DARPA, 6 pages, Jun. 1990.
Price, P.J., Evaluation of Spoken Language Systems: the ATIS Domain,Human Language Technology Conference, 4 pages, 1990.
Griffith, Laura et al., Two Classes of Interactive Voice Response Applications, Ameritech Services Science and Technology, 12 pages, 1989.
Price, Patti, Spoke Language System Integration and Development, Proceeding of ICSLP 1990, vol. 2 1990, 8 pages.
Anonymous, Proceedings Voice I/O Systems Applications Conference, AVIOS, Sep. 24, 1991, 58 pages.

Lea, Wayne, Trends and Countertrends in Research on Speech Recognition Speech Science Institute et al., 12 pages, Sep. 22, 1992.
Boyce Rensberger, The Quest for Machines that not only Listen but also Understand, The Washington Post, May 3, 1993.
Spiegel, Murray, Coping with Telephone Directories that were never Intended for Synthesis Applications, 7 pages, paper presented at ESCA workshop on Applications of Speech Technology, Bavaria, Germany, Sept. 16-17, 1993.
Lea, Wayne et al., Designing Voice Interfaces for Video Switches and Navigational Displays, Speech Science Institute, 9 pages, presented in 1993.
Everett, Stephanie et al., Adding Speech Recognition to a Natural Language Interface, US Naval Research Laboratory, 12 pages, earlier version of this paper appeared in Proceedings of the American Voice I/O Society Conference, Sep. 1992.
Internal Document, Corporate Technology Strategy, AMEX, 4 pages, Sep. 21, 1993.
TRS Technologies, 1992-1993 Operational Test Results Advanced Technology Group, 11 pages, 1993.
TRS Technologies, Automated Speech Recognition 1992-1993 R&D Project Review, Advanced Technology Group, 11 pages, 1994.
Bernstein, Peter, Intelligent Agents: It's Magic, Wireless Magazine, 6 pages, 1994.
Warner, William, Letter to Anita Bounds re Avid Technology, 1 page, Nov. 2, 1994.
Churbuck, David, Secretary Killer, Forbes Magazine, 2 pages, Nov. 7, 1994.
Rifkin, Glen, A Phone that Plays Secretary for Travelers, New York Times, 1 page, Oct 9, 1994.
Internal Document, Patent Infringement Suit Research, Wildfire, 1 page, Apr. 18, 1999.
Tauber, Josh, Virtual Assistants: Speech's next "Killer App, "Speech Technology Magazine, 4 pages, Dec./Jan. 1999.
Wildfire Press Release, McCaw Cellular Communications Invests in Wildfire Communications, Maker of Phone-based Electronic Assistant, 3 pages, Jan. 23, 1995.
Wildfire, Corporate Profile, 7 pages, 1994.
Computer Telephony, Wildfire's Wildfire Electronic Assistant, 1 page, 11/994.
Meyers, Jason, Wireless Wildfire, BellSouth Cellular launches service trial, Wireless Networks, 2 pages, May 26, 1997.
Dahl et al., ATIS Overview SLT Workshop, 12 pages, Mar. 7-9, 1994.
Woodland, P.C., et al., Large Vocabulary Continuous Speech Recognition Using HTK, 4 pages, to appear in ICASSP 1994.
Agenda ARPA 2 pages, Mar. 8, 1994.
Dahl, Deborah et al., Expanding the Scope of the ATIS Task: The ATIS3 Corpus, Unisys Corporation, 6 pages, 1994.
Rayner, Manny et al., Combining Knowledge Sources to Reorder N-Best Speech Hypothesis Lists, SRI International, 12 pages, 1994.
Speech Recognition Update, ARPA Workshop on Human Language Technology 1994, 10 pages, Mar. 1994.
Pallett, David et al., 1993 Benchmark Tests for the ARPA Spoken Language Program, NIST, 10 pages, 1993.
Anita Bounds, Speech Recognition in Travel Services, 8 pages., Report on 1992-1993 ARPA ATIS Project, 1994.
Anita Bounds, Automated Speech Recognition (ASR) History Within American Express, AMEX Travel Related Services Memo, 4 pages, Nov. 1, 1994.
Avios 1994, Spoken Dialogue Recognition, Powerpoint Presentation, 13 pages, 1994.
Anita Bounds, Speech Recognition in Travel Services, 12 pages, Report on 1992-1993 ARPA ATIS Project, 1994.
Penny Baran, Universal Card Recognizes Value of Voice Recognition AT&T Communication News, 2 pages, Sep. 1995.
Chris Chinnock, Calling Out for the Next User Interface, OEM Magazine, 6 pages, Jul./Aug. 1995.
Anonymous, The PowerPC Alliance Response to Slater's Open Letter, OEM Magazine, 1 page, Jul. /Aug. 1995.
Sheryl R. Young, Discourse Structure for Multi-Speakers Spontaneous Spoken Dialogs: Incorporating Heuristics into Stochastic RTNS, Carnegie Mellon University, 4 pages, 1995.

Claudia Pateras et al., Understanding Referring Expressions in a Person-Machine Spoken Dialogue, MCGill University, 4 pages, 1995.
Paul McGoldrick, Did You Hear What I Said,? Electronic Design, 5 pages, Oct. 1, 1996.
Mary Lenz, Coming In Loud and Clear, Call Center Magazine, 5 pages, Aug. 1996.
Van White, Internet Telephony Gateway, Internet Call Center, Concept Trial, Lucent Technologies, 24 pages, Jul. 1996.
Isaac Frydman, The Internet is coming to a Call Center Near You, Or is it? TeleProfessional, 2 pages, Sep. 1996.
Voicenews et al., Industry Highlights for Jul. 1996, 4 pages, Jul. 1996.
David Einstein, New Era in Speech Software, 2 pages, SF Chronicle, 2 pages, Sep. 12, 1996.
Call Center Management, Call Center 2000: The Future is Here, White Paper, 5 pages, Jun. 1996.
Speaker Verification Market Revving, Voice Technology & Services News, 3 pages, Nov 12, 1996.
Bill Manaris, et al., Interactive Natural Language Processing: Building on Success, Computer, 4 pages, 1996.
Alex Waibel, Interactive Translation of Conversational Speech, Computer, 8 pages, 1996.
Stefan Wermter, et al., Interactive Spoken-Language Processing in a Hybrid Connectionist System, Computer, 7 pages, Jul. 1996.
Peter Gantchev, One Number, Follow Me, Speech Technology, 3 pages, Aug./Sept. 1997.
Michael Harris, Put Your Best Voice Forward, Speech Technology, 3 pages, Aug./Sep.1997.
Anonymous, Headsets: An Essential Ingredient in Speech Recognition, Speech Technology, 1 page, Aug./Sep. 1997.
Draco, Intelligent agents etc., from Draco website, 12 pages, 1997.
Don Farber, The Internet challenge: One size doesn't fit all, Technology Marketing Corporation, 4 pages, Jul. 1997.
Speech Recognition Update, Dragon Will soon ship general purpose continuous dictation system, 2 pages, Apr. 1997.
Speech Recognition Update, New Version of Unisys speech understanding software, 2 pages, Apr. 1997.
Anonymous, Voice Technology & Services News, Vendors Revving Up Systems for Year 2000, 1 page, Feb. 4, 1997.
Ronald Croen, Natural Speech Recognition Impacts Fianancial Industry, Voice Technology & Services News, 1 page, Feb. 4, 1997.
Anonymous, Voice Technology & Services News, Personal Assistants Can Walk and Talk, 2 pages, Feb. 18. 1997.
Ruth Suarez et al, Unisys and Mediasoft Team for Natural Understanding, Voice Technology & Services News, 1 page, Feb 18, 1997.
Anonymous, Unisys Natural Language Speech Assistant, ASR News, 2 pages, Aug. 1998.
Anonymous, ViaVoice Ships at $99, ASR News, 2 pages, Aug. 1997.
Anonymous, VCS Speech Wave 1.0, ASR News, 3 pages, Nov. 1997.
R.A.Cole et al., Experiments with a spoken dialogue system for taking the US census, Speech Communications 23 (1997), 18 pages, 1997.
Baber et al., Factors Affecting Users' Choice of Words in Speech-Based Interaction with Public Technology, Int'l Journal of Speech Technology 2, 1997, 15 pages.
Denis Johnston, Telephony Based Speech Technology From Laboratory Visions to Customer Applications, Int'l Journal of Speech Technology 2, (1997), 11 pages.
Helmer Strik et al., A Spoken Dialog System for the Dutch Public Transport Information Service, International Journal of Speech Technology 2, 1997, 11 pages.
Mary G. Thyfault, Voice Recognition Enters the Mainstream, Information Week, 1 page, Jul. 14 1997.
J. Alvarez et al., Development and Evaluation of the ATOS Spontaneous Speech Conversational System, Speech Technology Group, 4 pages, 1997.
Neil Gross, Speech Technology Is The Next Big Thing in Computing, Special Report, Business Week, 14 pages, Feb.23, 1998.
Martin Krempasky, Unisys Unveils NLSA Program, Speech Technology, 3 pages, Jan./Feb. 1998.
Brian Lewis, Natural Language, Speech Technology, 5 pages, vol. 3 No. 2 Apr./May 1998.

Markku Hakkinen, Web Browsers that Speak Allow Students with Disabilities an Equal Chance, Speech Technology, 3 pages, Apr./May 1998.
Chin Lee et al., Speech Combines Telephone and Internet, Speech Technology, 2 pages, Jun./Jul. 1998.
Marie Meteer et al., Just the Facts, Speech Technology, 6 pages, Jun./Jul. 1998.
Anonymous, Speech Turns the Internet into a Global Village, Speech Technology, 4 pages, Aug./Sep. 1998.
Anonymous, Beyond Recognition, to Understanding, Speech Technology, 1 page, Oct./Nov. 1998.
Anonymous, Building the Interface of the Future, Speech Technology, 1 page, Oct./Nov. 1998.
Anonymous, Speech in Telecommunications, Speech Technology, 2 page, Oct./Nov. 1998.
Anonymous, Speech, Touch and Other Interfaces, 2 pages, Speech Technology, Oct./Nov. 1998.
Gabriel F. Groner, Specialized Vocabularies for Professional Speech, Speech Technology, 2 pages, Oct./Nov. 1998.
Anonymous, Voice Technology & Services News, Voice Piggybacks on Emerging Technologies, 1 page, Jan. 6, 1998.
Anonymous, Voice Technology & Services News, Wildfire Re-launches Personal Assistants, 1 page, Jan. 6,1998.
ASR News, Unisys NL Speech Assistant 3.0, 2 pages, vol. 9 No. 8, Aug. 1998.
Colleen Crangle, et al., Dollaborative Conversational Interfaces, International Journal of Speech Technology 2, 14 pages, 1998.
Judy Myerson, Internet Call Center, 8 pages, Jun. 29, 1999.
Website, Commercial Speech Recognition, 10 pages, Apr. 17. 1999.
Julie Vallone, New Phone Menu Option: Press 1 for Personality, Investor's Business Daily, 1 page, Dec. 23, 1999.
Jordan Cohen et al., Dragon Systems AudioMining for Call Centers Technical Overview, 5 page, Nov. 27, 1999.
William Meisel, BellSouth Mobility to Deploy General Magic telecom assistant service, Speech Recognition Update, 2 pages, 1999.
William Meisel, Speech Machines offers Internet transcription service aided by speech recognition, Speech Recognition Update, 2 pages, May 1999.
Anonymous, General Magic Selects Speech Works for Portico, Speech Technology, 1 page, Apr./May 1999.
James A Larson, Parts of Speech: Building Dialogs, Speech Technology, 3 pages, Apr./May 1999.
Asrnews, Mobile Offerings from Dragon and L&H, vol. 10 No. 4, Apr. 1999, 4 pages.
Asrnews, Speechworks Licenses Rules from E-Speech, vol. 10 No. 4, Apr. 1999, 2 pages.
Anonymous, Extending the benefits of electronic commerce through natural language speech recognition technologies, 9 pates, VCommerce, White Paper, 1998.
Anonymous, Speech Recognition. Large Voc. Cont. Speech Rec (LVCSR) 5 abstracts of papers presented at Eurospeech'99, 5 pages.
Wolfgang Minker, The Role of Evaluation in the Development of Spoken Language Systems, International Journal of Speech Technology 3, 514 (1999), 10 pages.
Smith, Brad, Yes, But Does It Talk Back? Wireless Week, 4 pages, Mar. 6, 2000.
Speaking Tour: ASR and TTS Follow the Money, http://www.computertelephony.com, Jul. 3, 2001, 15 pages.
Greenman, Catherine, Web Surfing, at the Sound of Your Own Voice New York Times Archives, Aug. 3, 2000, 5 pages.
Anonymous, Update On Speech Recognition, Speech Recognition Update, 3 pages, Jan. 2000.
William Meisel, The Voice Web And The Telephone VUI, Speech Recognition Update, 1 page, May 2000.
Susan Spadaccini, The Word Is Out On The Street, Speech Technology, 3 pages, Dec. 1999/Jan. 2000.
Brian Lewis, Speech Recognition Enters The Internet Age, Speech Technology, 3 pages, Dec. 1999/Jan. 2000.
Pam Ravesi, Dialing The Future Of Customer Service, Speech Technology, 3 pages, Dec. 1999/Jan. 2000.
James Larson, Internet Appliances Are Inexpensive, Intuitive And Conversational, Speech Technology, 4 pages, Dec. 1999/Jan. 2000.

M.F.Weegles, Users' Concept Of Voice Operated Information Services, International Journal of Speech Technology 3, 75 82, 8 pages, Accepted Jan. 25, 2000.
Art Rosenberg et al., Where Is Self Service Going With Voice Portals?, Call Center 3 pages, Mar. 5, 2001.
Joe A. Nickell, To Voice Mail Hell And Back, Business 2.0, 6 pages, Jul. 10, 2001.
Eric Hammond, Web Meeets Telephone, Infoworld, 4 pages, Jul. 27, 2001.
Lee Hollman, Let Your Voice Do The Walking, Call Center Magazine, 9 pages, Nov. 4, 2002.
Savitha Srinivason et al., Is Speech Recognition Becoming Mainstream?, Computer, 4 pages, Apr. 2002.
Mukund Padmanabhan, et al., Large Vocabulary Speech Recognition Algorithms, Computer, 4 pages, Apr. 2002.
Allen Gorin et al., Automated Natural Spoken Dialog, Computer, 6 pages, Apr. 2002.
Pedro Moreno et al., From Multimedia To Knowledge Management, Computer, 4 pages, Apr. 2002.
James Flanagan, Computers That Talk And Listen: Man Machine Communication by Voice, Proceedings of IEEE. vol. 64, No. 4, 8 pages, Apr. 1976.
Michael Kieran, Human Thought Amplified Intelligent Machines, The Globe & Mail, (Canada), 6 pages, Nov. 24, 1980.
Scott Armstrong, Scientists Make Gains In Long Road Toward A Computer That 'Listens', Christian Science Monitor, 3 pages, May 2, 1985.
Hester et al., the AT&T Multi Mode Voice Systems Full Spectrum Solutions For Speech Processing Applications, Voice I/) Systems Applications Conference, 9 pages, Sep. 10 12, 1985.
Winn L. Rosch, Voice Recognition: Understanding The Master's Voice, PC Magazine, 23 pages, Oct. 27, 1987.
David Hinley, Hobart Mercury, Nationwide News, 3 pages, Feb. 9, 1988.
Ed Tagg, Automating Operator Assisted Calls Using Voice Recognition, Speech Technology, 4 pages, Mar./Apr. 1988.
Don Clark et al., 90s Hold High Tech Promise Experts Think Dreams May Come True, San Francisco Chronicle, 4 pages, Nov.27, 1989.
Anonymous, Defense Dept. Sponsored Competition Of Futuristic Spoken Language Computer Systems Won by SRI International, PR Newswire, 2 pages, May 14, 1991.
Victor Zue, et al., Integration Of Speech Recognition And Natural Language Processing In The MIT Voyager System, ICSSP 91, pp. 713 716, 5 pages, 1991.
Michael Philips, Letter To A. Bounds Re The Pegasus Demonstration, MIT, 4 pages, Feb. 11, 1994.
Gary McWilliams, Computers Are Finally Learning To Listen, Business Week, No. 3343, p. 100, 2 pages, Nov. 1, 1993.
Mary E. Thyfault, The Power Of Voice, Informationweek, 6 pages, May 9, 1994.
Gwendolyn Freyd, Friendly Chats With Computers, Technology Review, 3 pages, May/Jun. 1992.
Scott Leibs, Why Can't PC's Be More Fun?, Information Week, 7 pages, Aug. 15, 1994.
Anonymous, Creative Technology Takes Stake In Voice Processing, Newsbytes, 1 page, Jan. 3, 1994.
Anonymous, Creative Technology Intros Awe32 Pc Sound Card, Newsbytes, 2 pages, Mar. 1, 1994.
Anonymous, (BBN) Time Warner Cable And BBN Hark Systems Corporation Plan To Provide Voice Access To The Information Superhighway, Business Wire, 3 pages, Nov. 1, 1994..
Shari Caudron, General Magic Inc.: Technology Of The Year Section, Industry Week, 3 pages, Dec. 19, 1994.
Steve Rosenbush, Mechanics Road Test Mentis Portable Computer Lets Workers Learn While In The Field, USA Today, 2 pages., Aug. 12, 1997.
Sam Menefee, Comdex Mentis Wearable Voice Activated Computer, Newsbytes, 2 pages, Nov. 24, 1997.
Barbara Radisich, Speech Recognition Overview, Datapro Communications Analyst, 22 pages, Aug. 1994.
Rich Malloy, Article Sent To Anita Bounds: The Speech Recognition Revolution, Q52 Professional, 10 pages, Mar. 1994.

James Glass et al., The Mit Atis System: Dec. 1994 Progress Report, ARPA HLS meeting 1994, 5 pages, 1994.
Charles Hemphill et al., Surfing The Web By Voice, ACM Multimedia 95, Electronic Proceedings, 10 pages, Nov. 5 9, 1995.
Michael Kaufman, Sorry, Ma'm, No Listing for 'Enry 'Iggins; Voice Recognition Is Improving But Don't Stop The Elocution Lessons, New York Times, 5 pages, Jun. 26, 1995.
Ron Cole et al., The Challenge Of Spoken Language Systems: Research Directions For The Nineties, IEEE Transactions on Speech and Audio Processing, 21 pages, Jan. 1995.
Victor Zue, Navigating The Information Superhighway Using Spoken Language Interfaces, Proceedings of the IEEE p. 39, 5 pages, Oct. 1995.
Barbara Marx, BBN Survey Of Corporate Travel Buyers Finds Strong Consumer Demand For Speech Recognition Based Services, BBN Press Release, 2 pages, Oct. 1995.
Samuel Bayer, Embedding Speech In Web Interfaces, ICSLP 96 ISCA Archive, 4 pages, Oct. 1996.
Anonymous, Voice Recognition. The Galaxy's Guide To The Hitch Hiker, The Economist, 2 pages, May 11, 1996.
Lucas Graves, Voice Boards Galore, IVR, 6 pages, 1996.
Victor Zue, Conversational Interfaces: Advances And Challenges, 5th European Conference on Speech and Technology, 10 pages, Sep. 22 25, 1997.
Anonymous, Bellcore Learning Services Learn Your Link To The Business World Using Multimedia, PR Newswire, 2 pages, Aug. 19, 1997.
Anonymous, Cyber Call Centers: Integrating Internet Technology With Call Centers, Network Solutions/Yankee Watch, 12 pages, Aug. 1997.
Anonymous, Voice Browser Workshop Agenda, Voice Workshop, 7 pages Oct. 13, 1998.
Michael Brown et al., Phonebrowser: A Web Content Programmable Speech Processing Platform, Voice 1998 Workshop, 6 pages, 1998.
David Cearley, It's All About The Software, Information Week, 3 pages, May 4, 1998.
Gerry Blackwell, Learning Language The Fun Way Metro Edition, 4 pages, Sep. 24, 1998.
Bob Weinstein, Now You Can Be On Speaking Terms With Your Computer, The Boston Globe, 3 pages, Nov. 5, 1998.
Karlin Lillington, Mouth To Mouse: Have A Quiet Word With Your Computer One Day, The Guardian (London), 3 pages, Jan. 15, 1998.
Henry Kenyon, HRD Execs Concerned About Keeping Up With New Learning Technologies, Corporate University Review, 4 page, Feb. 1, 1998.
Anonymous, ISLIP Media Debuts World's First Speech Recognition Products Designed For Media Applications, PR Newswire 3 pages, Apr. 6, 1998.
Arlena Sawyers, GM Techs Get A Voice In Training, Automotive News, 2 pages, Jun. 1, 1998.
Anonymous, ISLIP Introduces Mediakey Logger And Finder 3.0, PR Newswire, 3 pages, Jul. 22, 1998.
Paul Proctor, Rave For Trainer, Aviation Week and Space Technology, 1 page, Jul. 27, 1998.
Laurie Bassie et al., Trends In The Workplace: Supply And Demand In Interesting Times, ASTD Annual Report, 33 pages, Nov. 1998.
Saul Feldman, Voice Recognition Doze It Reality Wok? Computer currents interactive, 18 pages, May 18, 1994.
Harry Chang, Is ASR Ready For Wireless Primetime: Measuring The Core Technology For Selected Applications IEEE Workshop, IVTTA'98 12 pages, 1998.
K. Georgila, et al., A Dialogue System For Telephone Based Services Integrating Spoken And Written Language, IEEE Workshop, IVTTA'98 5 pages, 1998.
Jonathan Marshall, When Computers Listen To You, The San Francisco Chronicle, 7 pages, 7 2 1998.
John Markoff, The Voice On The Phone Is Not Human, But It's Helpful, The New York Times on the Web, 7 pages Jun. 21, 1998.
Robin Kalbfleisch, Talk Is Chic, Canadian Computer Reseller Bizlink, 3 pages, Jul. 17, 1996.
Jonathan Marshall, Your Voice Is My Command Sophisticated Chips Let You Control A Variety Of Products, The San Francisco Chronicle, 3 pages, May 12, 1998.

Lee Pender, Rumbling Heard in Speech Recognition Lernout & Hauspie Still Faces Desktop Competition, Techweb, 3 pages, May 11, 1998.

Anonymous, L&H Ships Voicexpress & Voicexpress Plus, ASRNews, 2 pages, May 1998.

Anonymous, American Airlines, The Airline Leader In The Use Of Speech Recognition Technology, Expands The Innovation To Its Automated Flight Information, PR Newswire, 2 pages, Dec 8, 1998.

Anonymous, Reprints of several articles from Speech Recognition Update, 9 pages, 1998.

Den Is Faye, You're The Voice, Sydney Morning Herald(Australia), 4 pages, Jul. 13, 1999.

Anonymous, Brooktrout Software Expands Into The Enterprise E Business, PR Newswire, 5 pages, Aug 10, 1999.

Anonymous, First Searchable Video Website Solution Adds New Content Providers, PR Newswire, 3 pages, Jun. 24, 1999.

Anonymous, New Technology That Makes It Easy To Search And Retrieve Multimedia Web Content Demonstrated by Dragon Systems, Business Wire, 2 pages, Dec. 7, 1999.

Peter Danielsen, The Promise Of A Voice Enabled Web, Computer, 6 pages, Aug. 2000.

Howard D. Wactlar et al., Complementary Video And Audio Analysis For Broadcast News Archives, Communications of the ACM 6 pages, Feb. 2000.

Bank of America, Voice Processing Hardware, Ppt. Presentation Internal, 25 pages, May 20, 1996.

Anonymous, Altech Company Background, Website, 4 pages, Jun. 16, 1998.

Mike Phillips, Designing Successful Speech Recognition Systems, Altech, ppt. Presentation, 17 pages, May 17, 1992.

Roland Racko, Talking (To) Technology Software Development, 5 pages, Jul. 1997.

Martin Krempasky et al., Unisys And Periphonics Offer Natural Language Understanding In IVR Systems, Unisys News Release, 2 pages, Aug. 27, 1996.

Martin Krempasky et al., Unisys Unveils Unique Natural Language Understanding Program Unisys News Release, 2 pages, Jun. 19, 1996.

Anonymous, Adapting For Success, Unisys/ From Mortgage Banking Magazine, Mar. 1997 3 pages, Mar. 1997.

Rex Stringham, Hot Speech REC APP From Periphonics / Unisys, Computer Telephony, 1 page, Apr. 1997.

Anita Bounds, Memo From A. Bounds Re: Meeting Of Oct. 7 With Unisys, Bank of America memo, 1 page Oct. 2, 1997.

K. Derby Memo From K. Derby Re: Meeting With Unisys Natural Language Dialogue, Bank of America memo, 1 page, Oct. 9, 1997.

K. Read, Memo To A. Bounds Re: Meeting With Unisys Natural Language Dialogue, Bank of America memo, 1 page, Oct. 9, 1997.

Cheryl Armstrong, Memo From C. Armstrong Re: Meeting With Unisys Natural Language Dialogue, Bank of America memo, 1 page, Oct. 10, 1997.

Neil Gross, A Loan Officer Who's Almost Human, Business Week, 1 page, Jun. 9, 1997.

David Porter, Adapting For Success, Mortgage Banking, 2 pages, Mar. 1997.

Anonymous, Natural Language Mortgage Assistant, Unisys, 2 pages, 1997.

Anonymous, Natural Language Understanding, Unisys Brochure 8 pages, 1996.

Anonymous, From website http://www.pcinews.com/business/pci/un/nov/alliance.html, Unisys, Enterprise Integration Group create alliance to 'test-drive' speech applications, 1 page, Jul. 30, 1998.

Anonymous, Natural Language Speech Assistant, Catch The Newest Wave in Technology, Unisys Brochure, 4 pages, 1997.

Anonymous, Unisys' Natural Language Assistant, Teleconnect, 1 page, Dec. 1996.

William Meisel, New Version Of Unisys Speech Understanding Software, Speech Recognition Update, No. 46, 1 page Apr. 1997.

Anonymous, Charles Schwab And Nuance Communications Redefine Telephone Based Customer Information Services, Nuance Press Release, 2 pages, Sep. 24, 1996.

Intervoice, Interactive Information Company Annual Report, 32 pages, 1994.

Thomas Ball et al., Sisl: Several Interfaces, Single Logic, International Journal of Speech Technology 3, 93 108, 16 pages, 2000.

Anonymous, Inter Voice System Product Description Manual, Intervoice, 7 pages, Apr. 15, 1995.

Anonymous, Response To Vendor Questionnaire For Charles Schwab & Co., Inc's Request For Information, Norstan Communications Inc., 82 pages, Mar. 12, 1996.

Anonymous, Intervoice Robot Operator: System Architecture, Intervoice, 6 pages, Oct. 18, 1995.

Anonymous, Intervoice Competitive Strengths And Weaknesses, Voicetek Corporation, 1 page, Jul. 1995.

Anonymous, Memo:Technical Comparison. Various Products: Intervoice & Meridian, Intervoice, 2 page, Jul. 17, 1995.

Neil Marchin, Letter Offering Customers Free Demonstration Disk Of Interdial, Intervoice, 4 pages, May 28, 1996.

Anonymous, Voicedial Voice Recognition Intervoice, 2 pages, 1996.

Anonymous, Handwritten Memo Re Intervoice Presentation On CDA Project, Intervoice, 5 pages, May 7, 1996.

Anonymous, Visualconnect: Internet Solutions For Information Exchange, Intervoice, 2 pages, 1996.

Anonymous, In Vision : Product Description Intervoice, 2 pages, 1996.

Anonymous, Intext Text To Speech, Intervoice, 2 pages, 1996.

Anonymous, Dataconnect Fax Intervoice Brochure, 2 pages, 1996.

Anonymous, Interdia 1. . . The Complete Call Center Solution, Intervoice, 5 pages, 1996.

Anonymous, Onevoice Software Agent Platform Intervoice 7 pages, 1996.

Peter Tavernese, Fax to Anita Bounds re: Periphonics Digital Interface Card, 3 pages, Jul. 2, 1997.

Nigel Burns, Genesys Technical Product Overview, B. of America, Company Confidential, 36 pages, Aug. 7, 1992.

Nigel Burns, Re: Predictive Dialer System For Dealer Lending Division, Genesys Letter, 3 pages, Jun. 21, 1995.

Nigel Burns, Re:Genesys Predictive Dialer Quotation, Genesys Letter, 4 pages, Mar. 13, 1995.

Nigel Burns, Re: Genesys Campaign Manager System Genesys Letter 3 pages, Apr. 4, 1995.

Anita Bounds, Fax re: Genesys, In-Network Call Center Intelligence, Version 1.0, 26 pages, Oct. 3, 1996.

Bruce Runyan, Consulting Services, Presentation ppt, 10 pages, 1996.

Terri Pagelow, Pagelow Email,1 page, May 7, 1998.

Anonymous, Bofa Bankcard Call Center, Genesys, 61 pages, Apr. 16, 1998.

Anonymous, A Forward Thinking Solution For Intelligent Customer Interaction, Product Overview, 8 pages, 1998.

Anonymous, Genesys CTI Applications On Compaz Proliant Servers, Compaq Corporation White Paper, 31 pages, Mar. 1998.

Madeline Bodin, Putting It All Together, Computer Telephony Expo 94, 5 pages, 1994.

Denise Deverelle, Computer/Telephony Integrated Customer Management, Genesys Labs, 13 pages, 1994.

Anonymous, Nabnasset Corporation's Voice Enhanced Services Platform Aug. 1993, Nabnasset Corporation, 16 pages, Aug. 1993.

Anonymous, Genesys Lab Presentation, Ppt. Presentation, 4 pages, Mar. 29, 1995.

Ronald Beyner, Letter From Beyner, T Netix, Inc To Anita Bounds Morgan B. Of America, Letter, 1 page, Nov. 14, 1997.

Ronald Beyner, Letter From Beyner, T Netix To Don Owen, B Of America, Letter, 1 page, Nov. 14, 1997.

Thomas Schalk, Best Voice Verification Product: Presented To T Netix Inc. For Veri Air AVIOS'97 1 page, Sep. 9, 1997.

Anonymous, T Netix Installs Speakez Voice Print Solution For Intrust Bank T Netix Press Release 2 pages, Aug. 25,1997.

Tami Luhby In Apparent First, Bank To ID Customers By Voice, American Banker, 1 page, Sep. 10, 1997.

William Meisel, Speech Verification Api Available Shortly, Speech Recognition Update Newsletter, 1 page Apr. 1997.

Anonymous, T Netix Company Overview, T Netix, 4 pages, Oct. 1997.

Anonymous, T Netix Speakez Voice Print, T Netix, 4 pages, Oct. 1997.

Anonymous, T Netix Customer Verification Service T Netix, 4 pages, Oct. 1997.
Anonymous, Company Overview, T Netix, 4 pages, Oct. 1997.
Anonymous, Recording Access Management (Ram), T Netix, 3 pages, Oct. 1997.
Elise Koulouris, T Netix Voice Print Verification, T Netix Letter, 17 pages, Mar. 3,1997.
Bob Violino Biometrics, Information Week, 3 pages, Aug. 18, 1997.
Anonymous, CMA's Speaker Verification Speakez Voice Print, CMA Information Sheet, 5 pages, Jul. 7, 1997.
Anonymous, Re:Biometrics, Internal Memo Posting, 1 page, Oct. 23, 1997.
Anonymous, Speakez Voice Print Speaker Verification For The Financial And Commercial World, T Netix, 3 pages, Oct. 23, 1997.
Anonymous, Speakez Voice Print Speaker for The Wireline World T Netix, 3 pages, Oct. 1997.
Anita Bounds, Fax Re Basic Information On T Netix And Voice ID Technology, Bank of America 1 page, Oct. 24, 1997.
Anonymous, Speak Ez Voice Print: Speaker Verification Technology, T Netix 6 pages, Oct. 23, 1997.
Anonymous, Vpu Vendor Comparison Matrix, Periphonics, 36 pages, Jul. 1996.
Melinda Phillips, Competitive Strengths And Weakness Periphonics, Marketing Dept., 8 pages, Jul. 1995.
Anonymous, Oscar Feature: Document Revision History, Periphonics, 22 pages, May 13, 1996.
Ronald Marcelle, Letter & Product Literature Sent To Anita Bounds, B Of America, Periphonics, 23 pages, Jun. 13, 1995.
Ronald Marcelle, Letter & Product Literature Sent To Bank Of America, Anita Bounds Periphonics, 5 pages, Jun. 13, 1995.
Anonymous, Vps/Vas Product Description Periphonics, 48 pages, Jan. 28, 1994.
Anonymous, Vps/Sp Product Description Periphonics, 52 pages, Apr. 4, 1994.
Anonymous, People's Bank Saves $500,000 Each Year With Voice Processing Applications, Magazine article: Technology News Section, 2 pages, Jul. 19, 1993.
Anonymous, Periphonics Launches High Performance Risc Based Voice Processing System, Periphonics News, 2 pages, Feb. 28, 1994.
Anonymous, Charles Schwab Relies On Periphonics Corporation For Nationwide Automated Automated Stock Trading System, PeriGram.
C. Allison et al., The Corporate Call Center: Much More Than Call Handling, The Gartner Group Strategic Analysis Report, 58 pages, May 16, 1996.
Candace Kamm, et al., Design And Development Of A Spoken Dialogue Systems, ASRU'97, 24 pages, Dec. 25, 1997.
Alan Hunt, A Speaker Independent Telephone Speech Recognition System: The VCS Telerec, Speech Technology, 3 pages, Mar./Apr. 1988.
Anonymous, Vpu Hardware Analysis Periphonics Vps/ls, Periphonics, 17 pages, Apr. 12, 1996.
Anonymous, Product Review: Voice Processing Series, Periphonics, 1 page, 1996.
Anonymous, Product Review Vps/Is 7000 9000 75000 9500 Voice Processing Series Periphonics, 4 pages, Oct. 7, 1997.
Anonymous, Vps/Vas Voice Processing Series (Voice Application Server), Periphonics, 4 pages, Oct. 7, 1997.
Anonymous, Product Review Vps/Cti Voice Processing Series Computer Telephony Integration, Periphonics, 3 pages. Oct. 7, 1997.
Melinda Phillips Competitive Strengths And Weakness Periphonics, Marketing Dept., 9 pages, Jul. 1995.
Anonymous, Voicebroker Request For Proposal, Charles Schwab 16 pages, Mar. 29, 1995.
Anita Bounds, Letter From Bofa To Voice Information Systems Returning ASR Report For 1993 2001 , Bank of America, 2 pages, Jan. 16, 1998.
Anonymous, Invoice To B Of America For Automatic Speech For Telephony Applications, ASR News, Nov. 1997.
Anonymous, Invoice To B Of America For Automatic Speech For Telephony Applications ASR News 2 pages, Nov. 1997.
Mark Phillips, Fax Re: Future Directions. Spoken Language Generation, MIT Lab for Computer Science, 4 pages, Jun. 9, 1994.
Anonymous, Memo Abstract For Forum Let's Talk About Speech, AMEX, 2 pages, Feb. 2, 1994.
Anita Bounds, Session 57: Let's Talk About Speech, ICA EXPO'94 Dallas, 3 pages, May 22, 1994.
Anita Bounds, Fax Regarding Speech Recognition , AMEX, 26 pages, Sep.12,1994.
Anonymous, History Of Automated Speech Recognition American Express, AMEX, 10 pages, Nov. 1992.
Anonymous, Automated Speech Recognition 3rd Q Report, TRS Advanced Tech Group, 9 pages, 1991.
Anonymous, Automatic Speech Recognition 3rd Quarter 1991 Report, TRS Advanced Tech Group, 11 pages, 1991.
Chris Rising Memo Re ASR 3rd Q 1991 R&D Report, AMEX TCG New Products, 3 pages, Oct. 7, 1991.
Anonymous, 1991 R&D Proposal Natural Language Asr, AMEX, 5 pages, 1991.
Anonymous, 1991 Revised R&D Proposal Natural Language ASR, AMEX 11 pages, Feb. 26, 1991.
Anonymous, Asr Year End Report. Project No:Krc Rd/90 Aisr3, TRS Advanced Tech Group, 30 pages, 1990.
Anita Bounds, Memo De ASR Technology Assessment, AMEX Advanced Tech, 7 pages, Dec. 26, 1990.
Anonymous, Asr R&D Project Review 1989/1990, AMEX, 9 pages, Aug. 20, 1980.
Anonymous, Automated Speech Recognition 3rd Q Report Project KRC, TRS Advanced Tech Group Ppt Presentation, 9 pages, 1990.
Anonymous, 1989 R And D 2nd Qtr Report, AMEX Advanced Tech, 13 pages, Jul. 1989.
Anita Bounds, Schedule for CAS ASR Trial, Bank of America, 2 pages, Jun. 27, 1989.
Anonymous, 1989 R&D Quarterly Report, AMEX Advanced Tech, 13 pages, Apr. 1989.
Anonymous, Limited Automated Speech Recognition (ASR) Research And Development Project TRS Worldwide Telecommunications 3 pages, Feb. 1989.
C. Sinha, Automatic Speech Recognition (ASR) Trial System: Manual Method, AMEX, 5 pages, Mar. 7, 1989.
C. Sinha, Automatic Speech Recognition (ASR) Trial System Statistics Data File Format Specification AMEX, 5 pages. Mar. 22, 1989.
Anonymouse, World Wide Telecommunications; ASR Status, CCG Staff Meeting, 1 page, Mar. 1989.
Anita Bounds et al., Final Technology Report 1988, AMEX TRS, 50 pages, Jan. 1989.
Anonymous, 1989 Proposal Abstract Speaker Independent Speech Recognition, AMEX Travel, 5 pages, 1989.
Anonymous, Speech Recognition Development, Advanced Technology Monthly Status Report, 2 pages, Nov. 1998.
Anonymous, Advanced Technology 1988 R&D Quarterly Report, TRS Advanced Technology, 11 pages, Oct. 1998.
Rigsby Barnes et al., 1994 R&D Proposal, Amex, 10 pages, Jan. 26, 1994.
Victor Zue et al., Pegasus: A Spoken Dialogue Interface For On Line Air Travel Planning, Intl Symposium on Spoken Dialogue, Waseda Univ. Tokyo, Japan, 4 pages, Nov. 10 12, 1993.
Gary Mcwilliams, Computers Are Finally Learning To Listen, Business Week, Science & Technology Section, 2 pages, Nov. 1, 1993.
Gabrielle Watson, Friendly Chats With Computers, Technology Review, 3 pages, May/Jun. 1992.
Michael Phillips, Letter To A. Bounds Re: Video Of Latest Research Summary, MIT Lab for Computer Science, 2 pages, Feb. 11, 1994.
Anita Bounds, Memo Re TSC Automation Project, TRS Advanced Technology, 33 pages, May 6, 1988.
Anita Bounds, Memo De TSC Automation Project, TRS Advanced Technology 9 pages, May 6, 1988.
Bob Mercurio, Fax Of Draft ASR Article Speech Recognition A Technology Ready For Use Now, AMEX Travel, 9 pages, Apr. 12, 1991.
Anonymous, Project Schedules. Voice Recognition/Voice Response, AMEX Advanced Tech, 12 pages, 1985-1987.
Robert Reid, Letter To Anita Bounds, AMEX Re VR/VR Proposal, Logica, 2 pages, Sep. 4, 1985.
Anonymous, Voice Recognition/Voice Response Specification, Logica, 56 pages, Jun. 6, 1985.

Anonymous, Minutes Bidders Conference Voice Recognition/Voice Response, AMEX Advanced Tech, 2 pages, Jun. 26, 1985.
Anonymous, Voice Recognition/Voice Response Benchmark Test Criteria, Logica, 21 pages, 1985.
Oscaryir, Zawislak, Memo Re: Amex Vr/Vr Proposal, Logica, 5 pages, Jul. 25, 1985.
Oscaryir, Zawislak, Memo Re: Questions Pertaining To AMEX VR/VR Project Proposal, Logica, 3 pages, Jul. 23, 1985.
R. Reid, Report on Jul. 9, 1985 Meeting AMEX, Logica, 4 pages, Jul. 11, 1985.
Anonymous, Proposed Logica System Flowchart, Logica, 3 pages, Jul. 24, 1985.
Hasim Ozcayir, AMEX VR/VR Mother System Software Components Function List, Logica, 5 pages, Jul. 29, 1985.
Anonymous, Amex VR/VR Mother System Software Components Function List, Logica, 4 pages, Jul. 29, 1985.
Robert J. Zawislak, AMEX VR/VR Mother System Software Components Function List, Logica, 5 pages, Jul. 29, 1985.
Anonymous, Diagrams Of Proposed AMEX VR/VR System, Logica, 2 pages, 1985.
Anonymous, Amex Mother System Proposal Draft 2, Logica, 3 pages, Aug. 5, 1985.
Anonymous, ICA '94 Tutorial Abstract On Voice Processing, AMEX Advanced Tech, 5 pages, Jan. 18, 1994.
Anonymous, Abstract Re: Tutorial On Voice Processing Services, AMEX Advanced Tech, 72 pages, Feb. 2, 1994.
Anita Bounds, Memo Re Visit To Thomas Cook, AMEX TRS, 2 pages, Aug. 25, 1994.
William O'Farrell, Altech Letter To AMEX Re Proposal, AMEX, 2 pages, Sep. 12, 1994.
C. Sinha, Automatic Speech Recognizer Evaluation Criteria And Setup. Version 0.1, AMEX, 5 pages, Oct. 8, 1992.
Anonymous, Special Report: Voice Input Technologies Technical Analysis Specification, Bellcore, 25 pages, Mar. 1, 1992.
Vicki Walstrom, Memo To Bob Eyres, Re: MIT Lab Development Of ASR AMEX: Walstrom, 3 pages, Apr. 1992.
Roy Lowrance et al., Memo Re Corporate R&D Funding For 1990 Speaker Independent Recognition Project, AMEX Advanced Tech, 2 pages, Jan. 22, 1990.
Anonymous, Speaker Independent Recognition Applied Research Proposal, AMEX Advanced Tech, 5 pages, Jan. 12, 1990.
Barbara Sohn, 1990 Speech Recognition Project Extension Request, Lehman Brothers, 1 page, Feb. 6, 1992.
Roy Lowrance et al., Corporate R&D Funding For 1990, AMEX Memo, 8 pages, Feb. 28, 1990.
Annabelle Bexiga, Speaker Independent Second Quarter Report, Lehman Brothers, 7 pages, Aug. 9, 1990.
Anonymous, 1994 Request For Funding For NLS Recognition, AMEX TRS, 5 pages, 1994.
Anita Bounds, Potential Automated Travel Reservation Project, AMEX TRS Memo, 16 pages, Oct. 7, 1993.
Anita Bounds, Mail Re: Voice Recognition, 2 pages, Jun. 23, 1994.
Steve Bonnell, Note To Anita Bounds From Steve Bonnell Re: Voice Recognition, 1 page, Jun. 22, 1994.
Anita Bounds, Note To Steve Bonnell Re:IME, 1 page, Jul. 6, 1994.
Steve Bonnell, Note To Anita Bounds From Steve Bonnell Re: Voice Recognition, 2 pages, Jun. 17, 1994.
Anita Bounds, Fax Re: Project Schedule And Costs, AMEX Advanced Technology Group, 4 pages, Sep. 9, 1994.
Anonymous, Advanced Technology Group, Voice Processing Product Standards Document, AMEX TRS, 6 pages, Jun. 27, 1988.
Anita Bounds et al., CAS ASR Architecture Report Final Draft, AMEX TRS Memo 31 pages, Jan. 17, 1990.
Anonymous, Advanced Technology Group, Operational Test And Evaluation (OT&E) Plan For ASR, AMEX TRS Draft, 51 pages, Jan. 5, 1990.
C. Sinha, ASR Systems Evaluation Criteria And Methodology, AMEX ASR Group, 19 pages, Nov. 3, 1989.
Mark Helsey, VR/VR Cas Application Host Requirements Specifications, 29 pages, Oct. 26, 1986.
Darius Irani et al., Amex Cas VR/VR System VR1 System Functional Specification, Logica, 69 pages, Jan. 19, 1987.
Anita Bounds, Travel Service Delivery Speech Recognition Project Functional Specification Document, AMEX TRS Memo, 2 pages, May 24, 1994.
Rich Siemborski, Letter To Anita Bounds Re: AVIOS Paper, 1 page, Jul. 26, 1994.
Bob Mercurio, Memo To Anita Bounds Re: Adv. Tech Activity, 1 page, Sep. 25, 1994.
Anita Bounds, ASR Potential Projects, AMEX TRS Memo, 6 pages, Feb. 21, 1991.
Anita Bounds, Pending Tasks For ASR Group, AMEX TRS Memo, 4 pages, Jul. 1, 1992.
Anita Bounds, ASR Projects, AMEX TRS Memo, 5 pages, Jul. 13, 1992.
Anonymous, R&D Review, 1989 And 1990 Results Analysis, Amex ppt. Presentation, 9 pages, Aug. 20, 1990.
Anita Bounds, Fax To Rigsby Barnes Re: 1994 Speech Recognition R&D Proposal, AMEX, 14 pages, Oct. 5, 1993.
Anita Bounds, Mail Re: Voice Recognition, WROC, 1 page, Jun. 14, 1994.
Steve Bonnell, Note To Anita Bounds From Steve Bonnell Re: Voice Recognition, WROC, 1 page, Jun. 16, 1994.
Denis Perrachio, Memo To Anita Bounds, AMEX, 3 pages, Jun. 15, 1994.
Anita Bounds, Mail Re: Vendor List for RFI For Agentless, AMEX, 1 page Oct. 26, 1994.
Anita Bounds, Mail Re: Vendor List For RFI For Agentless, AMEX, 2 pages, Oct. 26, 1994.
Rich Siemborski, Note To Anita Bounds Re: Speech Recognition, 1 page Jun. 3, 1994.
Robert Hoss, Letter To Anita Bounds Re Note Of May 17, 1994, 1 page, May 19, 1994.
Mark Phillips, Fax To Anita Bounds Re: Collaboration Between AMEX And NNY, MIT, 5 pages, May 25, 1994.
Anita Bounds, Trip Report Apr. 5 14, 1994 To Neural Net Conference, AMEX TRS Report 3 pages, 1994.
Anonymous, Cas/VR/Ani Project Update, AMEX TRS Memo, 3 pages, Jul. 23, 1991.
Steve Karl, ANI/CAS/Voice Response—Project Update #4, AMEX TRS Memo, 9 pages, Sep. 16, 1991.
Steve Karl, Ani/CAS/Voice Response—Project Update #5, AMEX TRS Memo, 8 pages, Oct. 1, 1991.
Steve Karl, Ani/CAS/Voice Response—Project Update #6, AMEX TRS Memo, 7 pages, Oct. 10, 1991.
Steve Karl, Ani/CAS/Voice Response—Project Update #7, AMEX TRS Memo, 2 pages, Oct. 25, 1991.
Steve Karl, Ani/CAS/Voice Response—Project Update #7, AMEX TRS Memo, 8 pages, Oct. 25, 1991.
Anonymous, Credit Card On Line Object Server High Level Design, Bank of America, 18 pages, Jul. 30, 1996.
Anonymous, IBPC/Call Center/FRM Vision Architectural Convergence, Bank of America, 17 pages, Mar. 18, 1997.
John Edmonson, Re: Call Volumes, Bank of America, 2 pages, Feb. 4, 1998.
Anonymous, GRB Universal Workstation High Level Business Function Definitions, Bank of America, 5 pages, Jan. 20, 1998.
Anonymous, Desktop Function Migration Path, Bank of America, 1 page, Mar. 7, 1997.
Robert Goto, Implementation Strategy, Bank of America, 16 pages, Mar. 17, 1997.
Anita Bounds, Re: Bus And Processor Architecture For The SUN/CAM System, Bank of America, 31 pages, Nov. 22, 1996.
Anita Bounds, Intervoice Fonerac 5000 Config., Bank of America, 3 pages, Jun. 26, 1997.
Anonymous, Voice Services Task Force Meeting: Agenda, Bank of America, 8 pages, Jun. 25, 1997.
Eddie Meeks, Letter To Dean Bell, Intervoice, 2 pages, Jun. 24, 1997.
Anonymous, Important Vpu Hardware Aspects, Bank of America, 7.
Anonymous, RFP Evaluation Form—ADA, Bank of America, 4 pages, Jun. 25, 1997.
Anonymous, Computer Telephony Interface Cost Analysis, Voice Services Taskforce, 2 pages, Jun. 24, 1997.
Anonymous, Component Weighting Matrix, Voice Services Taskforce, 6 pages, Jun. 25, 1997.

Anonymous, Automated Call Distribution System, Voice Services Taskforce, 2 pages Jun. 24, 1997.
Anonymous, California Bankers On Call Welcome Asia Division, Bank of America, 24 pages, Oct. 9, 1996.
Anonymous, Voice Services Taskforce: Hypothetical Call Center Detail, Bank of America, 22 pages, Apr. 23, 1997.
Anonymous, Voice Services Taskforce: Vendor Response Information, Bank of America, 30 pages, Mar. 17, 1997.
Anonymous, Voice Services Taskforce: Infrastructure Strategy Description Final Draft, Bank of America, 25 pages, Feb. 25, 1997.
Anonymous, B. Of A Call Center Towards Evolution, Bank of America, 22 pages, Sep. 6, 1996.
Anonymous, Voice Services Taskforce: Call Center Components, Bank of America, 20 pages, Jan. 14, 1996.
Anonymous, ASR Tutorial, Bank of America, 36 pages, Jan. 10, 1996.
Nell Treseder, Fax To Ellington, Bounds & Friedman Re: "Test Drive" On A B Of A Stock Application, Voicetek Corp., 13 pages, Nov. 9, 1995.
Connie Adachi, Final Request for Information (RFI) And Vendor List, Charles Schwab, 10 pages, Feb. 8, 1996.
Anonymous, Voicebroker Request For Proposal, Charles Schwab, 21 pages, Mar. 29, 1996.
Anonymous, Voicebroker Application Specifications, Charles Schwab, 40 pages, Nov. 5, 1995.
Anonymous, Voicebroker Functional Specification, Charles Schwab, 27 pages, Nov. 3, 1995.
Ron Croen, Say Hello To Speech Recognition, Telemarketing & Call Center Solutions, vol. 16, Iss.9, p. 110, 5 pages, Mar. 1998.
Dan Furman, Hear And Now, Telephony, vol. 236, Iss.23, p. 230, 3 pages, Jun. 7, 1999.
Business Editors, Fidelity Investments Unveils New Suite Of Brokerage Offerings, Business Wire, 3 pages, May 25, 1999.
Anonymous, Philips Catapults To World's Leader In Speech Recognition For Telecom Market, PR Newswire, 5 pages, Oct. 13, 1999.
Business Editors, Forbes Magazine Reviews One Voice Technologies, Business Wire, 2 pages, Nov. 4, 1999.
Business/Technology Editors, On The 30th Anniversary Of The First Moon Landing, Speechworks Defines A New Site—Speechsite, Business Wire, 5 pages, Jul. 20, 1999.
Anonymous, Delta Express Debuts Voice Driven Reservations System With Technologies From Edify And Nuance, PR Newswire, 3 pages, Oct. 25, 1999.
Scott Tiazkun, Nuance Gives Voice To CRM, Computer Reseller News, Iss.857, 3 pages, Aug. 30, 1999.
Nils Lenke, Build NL Applications That Go Beyond 'Speech Recognition': Giving Power To The Human Voice, Unisys World, vol. 20, Iss 10, 4 pages, Oct.1999.
Joseph Yaworski, Speech Driven Computing Technologies May Soon Become A Part Of Everyday Life, Unisys World vol. 20, Iss.10, 3 pages, Oct. 1999.
Nicholas Cravotta, Speech Recognition: It's Not What You Say; It's How You Say It, EDN vol. 44, Iss.13, 8 pages, Jun. 24, 1999.
Alain Sherter, Speech Recognition Speaks Volumes, Bank Technology News, vol. 12, Iss.8, 4 pages, Aug. 1999.
Anonymous, Speechworks Host 1.1, Call Center Solutions, vol. 17, Iss.10, 5 pages, Apr. 1999.
Business/Technology Editors, Speechworks International Delivers Perfect Compliment To Web Enabled E Commerce With Launch of Speechworks 5.0, Business Wire, 4 pages, May 25, 1999.
Business and High Tech Editors, Mapquest.Com & Speechworks To Develop First Speech Recognition Application For Accessing Driving Directions Over The Phone, Business Wire, 3 pages, Sep. 13, 1999.
Anonymous, Natural Language Speech Assistant 3.0, Call Center Solutions, vol. 17, Iss.11, 4 pages, May 1999.
Anonymous, Nuance And Oracle Bring Multi Channel Access To Application Service Providers, PR Newswire, 2 pages, Jul. 27, 1999.
Anonymous, Nuance Ushers In New Age Of Communications With Voyager Voice Browser, PR Newswire, 3 pages, Oct. 5, 1999.
Anonymous, Nuance V-Builder Makes It Easy To Provide Voice Access To Web Sites Over The Telephone, PR Newswire, 3 pages, Oct. 5, 1999.
Anonymous, Intervoice Brite Unveils Innerview IVR Reporting Package, Audiotex Update vol. 12, Iss.9, 2 pages, Sep. 1, 2000.
Anonymous, Nuance Delivers V Builder 1.0 And Launches Voice Staging Center On The Web, Call Center CRM Solutions, vol. 19, Iss.2, 2 pages, Aug. 2000.
Anonymous, E Businesses Can't Ignore Telephone Access, Electronic Commerce News, vol. 5, Iss.10, 3 pages, Mar. 6, 2000.
Anonymous, Bell Offers Digitally Enhanced Customer Service, Marketing Magazine, vol. 108, Iss.21, 2 pages, Jun. 2, 2003.
Business and High Tech Editors, Canada's Largest Telecommunications Provider Calls On Nuance Speech Solutions For Excellence In Customer Care, Business Wire, 3 pages, Jan. 16, 2003.
Janice Dineen, Dialing For Distraction; [SA2 Edition], Toronto Star, 4 pages, Mar. 17, 1990.
Anonymous, Introducing Emily, The New Voice Of Bell Canada, Canada NewsWire, Ottawa, 2 pages, Jan. 16, 2003.
Gary Lamphier, Ma Bell Adopts Codebaby Virtual Agent [Final Edition], Edmonton Journal, 3 pages, Feb. 1, 2005.
Anonymous, Speech Integration Module Nuance Version 7 Administrator's Guide, Intervoice, 138 pages, 2003.
Richard Bray, Talk Back, Summit, Ottawa, Fall 2003, 4 pages, 2003.
Bruche Gillespie, That's Ms. Data To You: Quicker, More Accurate, And Never Sounds Grumpy, National Post, Don Mills, Ontario, 3 pages, May 5, 2003.
Rosenthal et al., A Multiline Computer Voice Response System Utilizing Adpcm Coded Speech, IEEE Transactions on Acoustics, Speech and Signal Processing, vol. ASSP 22, No. 5, 14 pages, Oct. 1974.
Lawrence Rabiner, Applications Of Voice Processing To Telecommunications, Proc. Of IEEE, vol. 82, No. 2, 30 pages, Feb. 1994.
Lawrence Rabiner, The Role Of Voice Processing In Telecommunications, IEEE Workshop on Interactive Voice Technology, 8 pages, Sep. 1994.
Lawrence Rabiner, The Power Of Speech, Science, vol. 301, p. 1494, 2 pages, Sep. 12, 2003.
Raymond Lau et al., Webgalaxy: Beyond Point And Click A Conversational Interface To A Browser, WWW6 Conference, Santa Clara, 25 pages, 1997.
Anonymous, Securities Trading by Voice, SRI International, 1 page, 1996.
Anonymous, Speech Technology And Research, SRI International, 2 pages, 1996.
Anonymous, Voice Banking, SRI International, 1 page, 1996.
Anonymous, Voice Interactive Language Instruction And Evaluation, SRI International, 1 page, 1996.
J.R. Galliers et al., Evaluating Natural Language Processing Systems, Computer Laboratory, University of Cambridge, England, 188 pages, Mar. 1993.
Jef Pearlman, SLS Lite: Enabling Spoken Language Systems Design For Non Experts, Master's Thesis, submitted to the Department of Electrical Engineering and Computer Science at MIT, 72 pages, Aug. 2000.
Chao Wang, Porting The Galaxy System To Mandarin Chinese, Master's Thesis, submitted to the Department of Electrical Engineering and Computer Science at MIT, 86 pages, May 1997.
Raymond Lau et al., Webgalaxy Integrating Spoken Language And Hypertext Navigation, Spoken Language Systems, MIT Laboratory for Computer Science, 12 pages, 1997.
Margot Peet, Spoken Language Interfaces Gaining Acceptance As Technology Matures, The Edge, vol. 3, No. 4, 12 pages, Dec. 1999.
Samuel Bayer et al., Communicator Testbed: A Research Tool, MITRE, 22 pages, Nov. 14, 1998.
Anonymous, DARPA Communicator Documentation And Briefings, Webpage, 1 page, Aug. 1999.
Dan Loehr et al., The Role Of The DARPA Architecture In The Human Computer Interface In Distributed Simulations, The Mitre Corporation, 14 pages, 1999.
John Aberdeen et al., The Mitre Travel System, DARPA Communicator Meeting, 21 pages, Jun. 1999.
Samuel Bayer et al., Five Minute Mitre: Resource Update, DARPA Communicator Meeting, 10 pages Jun. 1999.
Samuel Bayer et al., Mitre Communicator Resources, DARPA Communicator Kickoff, 20 pages, Jan. 1999.

Sasha Caskey et al., DARPA Communicator Architecture, Mitre, 15 pages, Nov. 4, 1999.

Anonymous, American Airlines Deploys Natural Language Speech Recognition System With Technology From Periphonics And Nuance, Press Release, 4 pages, Jul. 29, 1998.

Anonymous, Nuance Developer's Toolkit, Nuance, 2 pages, 1998.

R. Colin Johnson, Nuance Expands Speech Recognition Technology, Technology News, 4 pages, Feb. 22, 1999.

Anonymous, Platforms Natural Language Speech Recognition Systems From Nuance Communications, Nuance ,Communications, 1 page, 1999.

Anonymous, Nuance Conversational Transactions Suite, Nuance Communications, 6 pages, Oct. 1998.

Brian Quinton, Reach Out And Touch The Web, New Media, 4 pages, Oct. 19, 1998.

Anonymous, Nuance And Edify To Promote One Stop Web And V Commerce Applications, Press Release, 3 pages, Dec. 21, 1998.

Minami, Yasuhiro et al., A Large-Vocabulary Continuous Speech Recognition Algorithm and its Application to a Multi-Modal Telephone Directory Assistance System, NTT Human Interface Laboratories, 6 pages, 1994.

R. Colin Johnson, Voice Recognition Added to Web-based Businesses, 2 pages, Nov. 16, 1998.

Anonymous, Nuance's Travel Plan Demo, Nuance Communications, 2 pages, 1999.

Anonymous, Nuance 6, Nuance Communications, 2 pp., 1999.

Anonymous, Fax regarding Periphonics VPS/is 7XXX/9XXX Product Description, 1 page, Dec. 9, 1996.

Nuance Communications, Nuance Speech Recognition System Developer's Manual, Version 6.2, Menlo Park, CA, 1999, 486 pages.

Nuance Communications, Nuance Verifier Developer's Manual, Version 6.2, Menlo Park, CA 1999, 78 pages.

Nuance Communications, Nuance Verifier 2.0 Developer's Guide, Version 6.2, Menlo Park, CA, 2001, 126 pages.

Nuance Communications, Nuance Speech Recognition System Version 7.0, Grammar Developer's Guide, Menlo Park, CA, 2001, 114 pages.

Nuance Communications, Nuance Speech Recognition System Version 7.0, Introduction to the Nuance System, Menlo Park, CA, 2001, 102 pages.

Nuance Communications, Nuance Speech Recognition System Version 7.0, Application Developer's Guide, Menlo Park, CA, 2001, 418 pages.

Nuance Communications, Nuance Speech Recognition System Version 7.0, Installation Guide, Menlo Park, CA, 2001, 118 pages.

Nuance Communications, Nuance Speech Recognition System Version 7.0, Nuance Platform Integrator's Guide, Menlo Park, CA, 2001, 204 pages.

Nuance Communications, Nuance Speech Recognition and Voice Authentication Systems: What's New in Nuance 8.0 and Verifier 3.0, Menlo Park, CA, 2001, 38 pages.

Nuance Communications, Nuance Speech Recognition System Version 8.0, Nuance System Administrator's Guide, Menlo Park, CA, 2001, 124 pages.

Nuance Communications, Nuance Speech Recognition System Version 8.0, Glossary, Menlo Park, CA, 2001, 250 pages.

Nuance Communications, Nuance Speech Recognition System Version 8.0, Application Developer's Guide, Menlo Park, CA, 2001, 20 pages.

Nuance Communications, Nuance Speech Recognition System Version 8.0, Grammar Developer's Guide, Menlo Park, CA, 2001, 196 pages.

Nuance Communications, Nuance Speech Recognition System Version 8.0, Nuance System Installation Guide, Menlo Park, CA, 2001, 38 pages.

Nuance Communications, Nuance Speech Recognition System Version 8.0, Nuance platform Integrators Guide, Menlo Park, CA, 2001, 276 pages.

Nuance Communications, Nuance Speech Recognition System Version 8.0, Introduction to the Nuance System, Menlo Park, CA, 2001, 122 pages.

Nuance Communications, Nuance Verifier Version 3.0, Developer's Guide, Menlo Park, CA, 2001, 154 pages.

Lenning, Matt, Nuance Product Overview, Nuance Communications, Menlo Park, CA, Apr. 2, 1999, 91 pages.

Nuance Communications, Features/Platform Matrix (6.0 and 6.1), Mar. 23, 1998, 1 page.

Nuance Communications, Features/Platform Matrix (6.2), Mar. 23, 1998, 1 page.

Nuance Communications, Nuance Speech Recognition System Version 6, Release Notes, Nov. 24, 1997, 17 pages.

Nuance Communications, Nuance Speech Recognition System Version 6.1.1, Release Notes, Nov. 17, 1997, 8 pages.

Nuance Communications, Nuance Speech Recognition System Version 6.2, Release Notes, Apr. 2, 2000, 23 pages.

Nuance Communications, Nuance Speech Recognition System Version 6.2, New Features, Mar. 13, 2000, 6 pages.

Nuance Communications, Nuance Speech Recognition System Version 7.0.4, Release Notes, Mar. 30, 2001, 29 pages.

Nuance Communications, Nuance Speech Recognition System Version 3.0, Nuance Verifier Version 3.0 Release Notes, Release Notes, Jul. 14, 2003, 18 pages.

Agarwal, R., et al., Voice Browsing the Web for Information Access, Papers submitted to the W3C Voice Browser Workshop, Oct. 13, 1998, Cambridge, Mass, 5 pages.

Bahl, L. R. et al., Large Vocabulary Natural Language Continuous Speech Recognition, IEEE, 1999, 3 pages.

Bai, B-R et al., Intelligent Retrieval of Dynamic Networked Information From Mobile Terminals Using Spoken Natural Language Queries, IEEE Transactions on Consumer Electronics, vol. 44 No. 1, 1998, 12 pages.

Chien, L-F, et al., Internet Chinese Information Retrieval Using Unconstrained Mandarin Speech Queries Based on a Client-Server Architecture and a PAT-Tree-Based Language Model, 1997 IEEE International Conference on Acoustics, Speech and Signal Processing, 1997, 6 pages.

Choi, W., et al., Splitting and Routing Audio Signals in Systems with Speech Recognition, IBM Technical Disclosure Bulletin, Dec, 1995, 1 page.

Collingham, R. J. et al., The Durham Telephone Enquiry System, International Journal Of Speech Technology 2, 113-119 (1997).

Digilakis, V., et al., Quantization of Cepstral Parameters for Speech Recognition over the World Wide Web, Proceedings of the 1998 IEEE International Conference on Acoustics, Speech and Signal Processing, 1998, 6 pages.

Fujisaki, H., Principles and Design of An Intelligent System for Information Retrieval Over the Internet with a Multimodal Dialogue Interface, Eurospeech '99, Budapest, Hungary, 1999, 4 pages.

Fujisaki, Hiroya et al., An Intelligent System for Information Retrieval Over the Internet Through Spoken Dialogue, Eurospeech '97, Rhodes, Greece, 1997, 4 pages.

Gustafson, Joakim, et al.,"An Educational Dialogue System With A User Controllable Dialogue Manager", In ICSLP-1998, 1998, 5 pages.

Gustafson, Joakim, Creating Web-Based Exercises for Spoken Language Technology, IDS 99, Kioster Irsee, DE, 1999, 4 pages.

Gustafson, Joakim, et al., Experiences From The Development of August-A Multi-Modal Spoken Dialogue System, IDS '99, Kloster Irsee, DE, 1999, 4 pages.

Jankowski, C., et al., NTIMIT: A Phonetically Balanced, Continuous Speech, Telephone Bandwidth Speech Database, IEEE, 1990, 4 pages.

Jourlin, P., et al., "General Query Expansion Techniques For Spoken Document Retrieval ", In *Access-Audio-1999*, 1999, 7 pages.

Kudo, I. et al., Data Collection of Japanese Dialects and Its Influence into Speech Recognition, 4th International Conference on Spoken Language Processing, Philadelphia, PA, USA, Oct. 3-6, 1996, 5 pages.

Maybury, Mark T., Multimedia Interaction for the New Millennium, Eurospeech '99, Budapest, Hungary, 1999, 8 pages.

Miller, D., et al., Statistical Dialect Classification Based On Mean Phonetic Features, Spoken Language, ICSLP 96 Proceedings, Fourth International Conference on, Oct. 1996, 4 pages.

Milner, B. et al., Robust Distributed Speech Recognition Across IP Networks, IEEE, London, UK, 1999, 6 pages.

Muthusamy, Y., et al., Speech-Enabled Information Retrieval In The Automobile Environment, Acoustics, Speech, and Signal Processing, ICASSP '99, Proceedings, 1999 IEEE International Conference on, Mar. 1999, 5 pages.

NG, K., Towards Robust Methods For Spoken Document Retrieval, 5th International Conference on Spoken Language Processing, Sydney, Australia, 1998, 5 pages.

Noble, Brian D., Mobile Data Access, Doctoral Thesis, Carnegie Mellon School of Computer Science, 1998, 160 pages.

Paul, D., A CSR-NL Interface Specification Version 1.5, From Proceedings Speech and Natural Language Workshop, Oct. 1989, sponsored by DARPA, 9 pages.

Robinson, T. et al., Recognition, Indexing and Retrieval of British Broadcast News With the THISL System, Eurospeech '99, Budapest, Hungary, 1999, 4 pages.

Rouillard, José, et al., "Halpin: A Multimodal And Conversational System For Information Seeking On The World Wide Web", believed to be in Access-Audio1999, 5 pages.

Rouillard, Joséet al., Multimodal Information Seeking Dialogues on the World Wide Web, Eurospeech '99, 1999, 4 pages.

Sheridan, Paraic, et al., Cross-Language Speech Retrieval: Establishing a Baseline Performance, SIGIR 97, Philadelphia PA, 1997, 10 pages.

Shalonova, K., Automatic Modeling of Regional Pronunciation Variation for Russian, ISD'99, Springer-Verlag, Berlin, DE 1999 5 pages.

Sjolander, Kare, Web-Based Educational Tools for Speech Technology, ICSLIP '98, Sydney, AU, 1998, 4 pages.

Stzalkowski, T. et al., Building Effective Queries In Natural Language Information Retrieval, Proceedings of: Fifth Conference on Applied Natural language Processing, Washington DC, 1997, 9 pages.

Tucker, R.et al., Compression of Acoustic Features-Are Perceptual Quality and Recognition Performance Incompatible Goals?, Eurospeech '99, Budapest, Hungary, 1999, 4 pages.

Vaufreydaz, D. et al., A Network Architecture For Building Applications That Use Speech Recognition And/Or Synthesis, Eurospeech '99, Budapest, Hungary, 1999, 5 pages.

Witbrock, M., et al., Speech Recognition And Information Retrieval: Experiments In Retrieving Spoken Documents, In Proc. DARPA Speech Recognition Workshop '97, 1997, 6 pages.

Zissman, M., et al., Automatic Dialect Identification Of Extemporaneous, Conversational, Latin American Spanish Speech*, Proceedings of the Acoustics, Speech, and Signal Processing, 1996, on Conference Proceedings, 1996 IEEE International Conference-vol. 02, 4 pages.

DirecTV, "Introducing Natural Language Voice Recognition", bill stuffers, May 2006, 4 pages.

DirecTV, "Now You're Talking," bill stuffer, May 2006, 1 page.

* cited by examiner

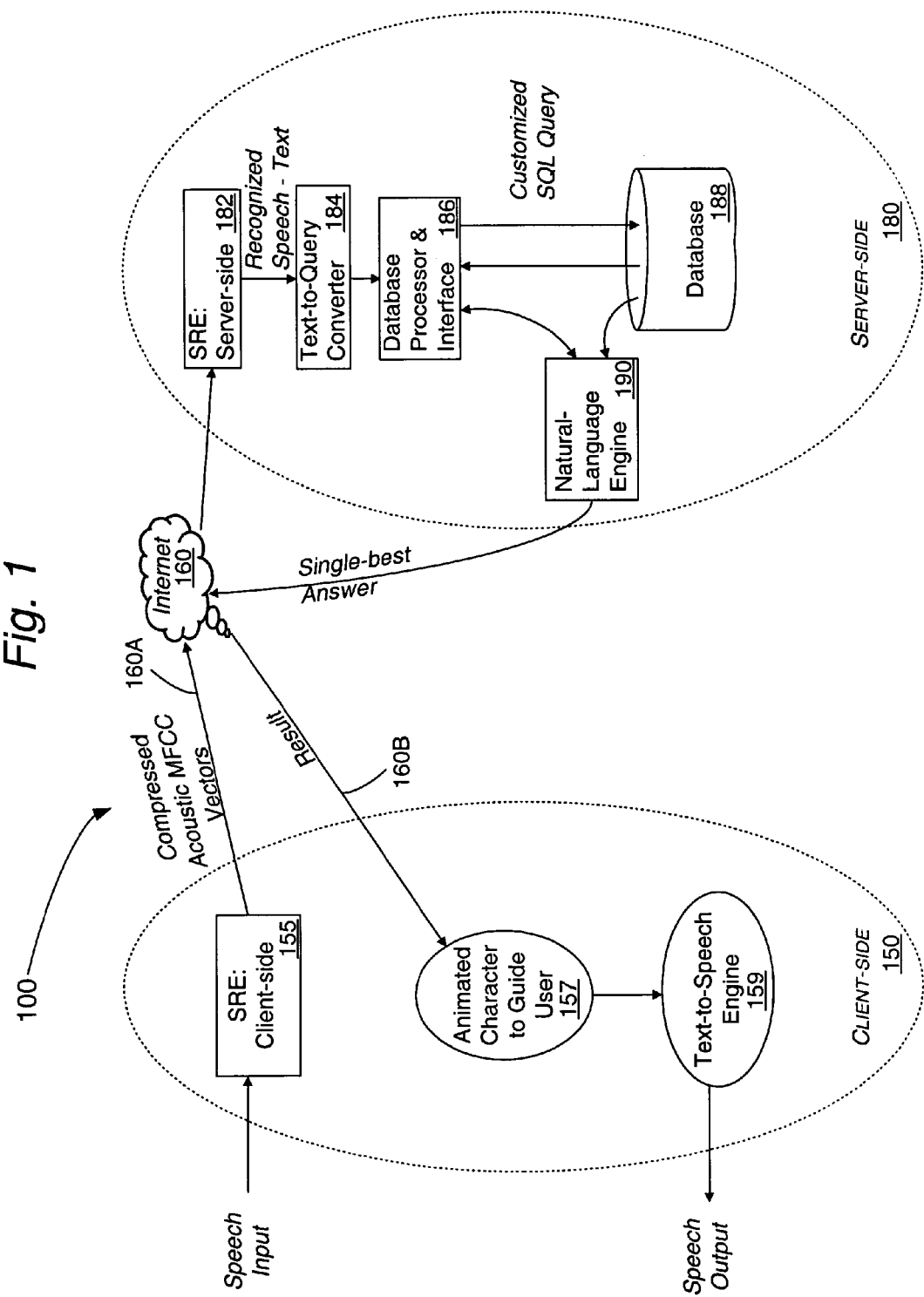

CLIENT-SIDE SYSTEM LOGIC

CLIENT-SIDE SYSTEM LOGIC

CLIENT-SIDE SYSTEM LOGIC

Client-side Initialization

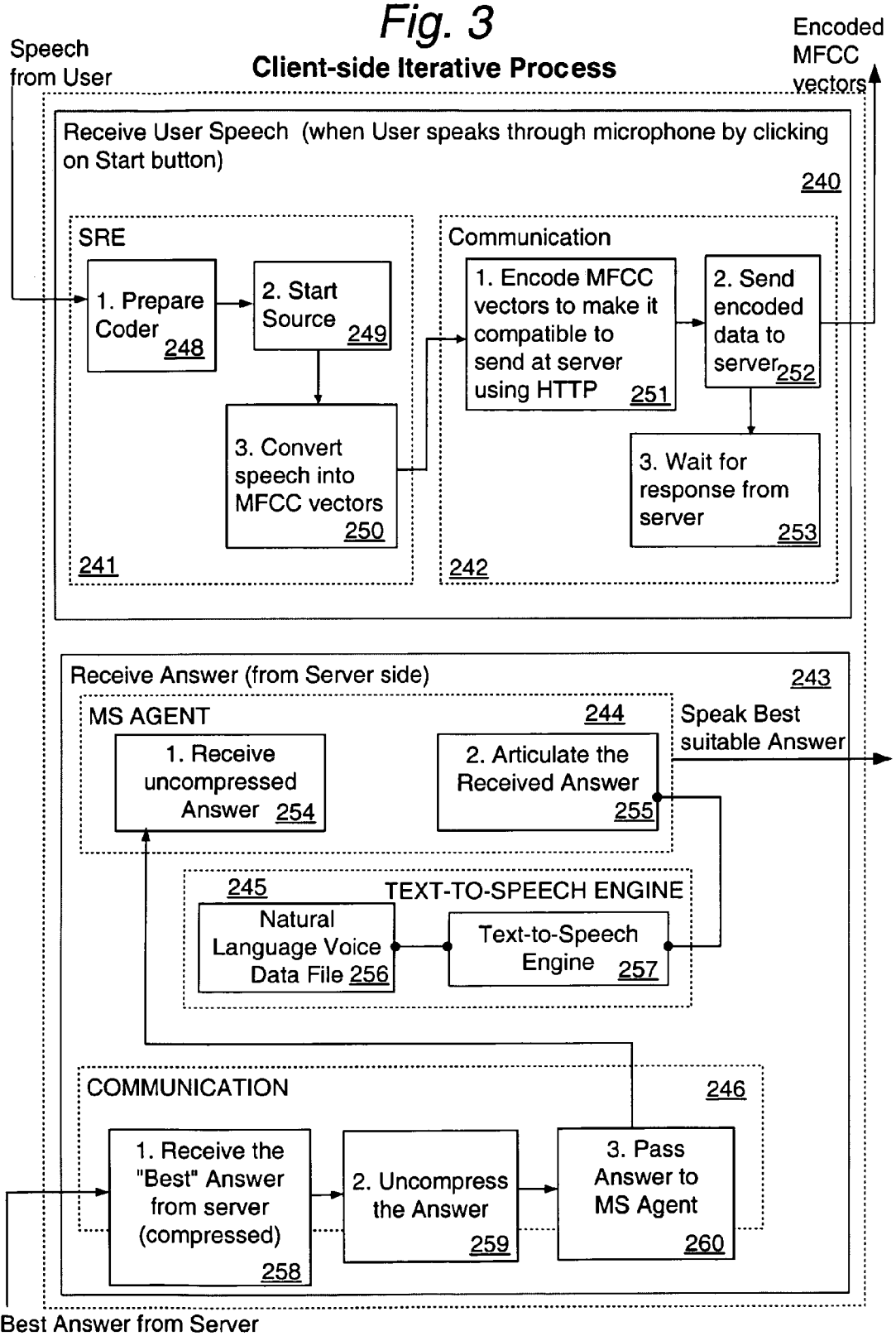

Client-side Un-Initialization

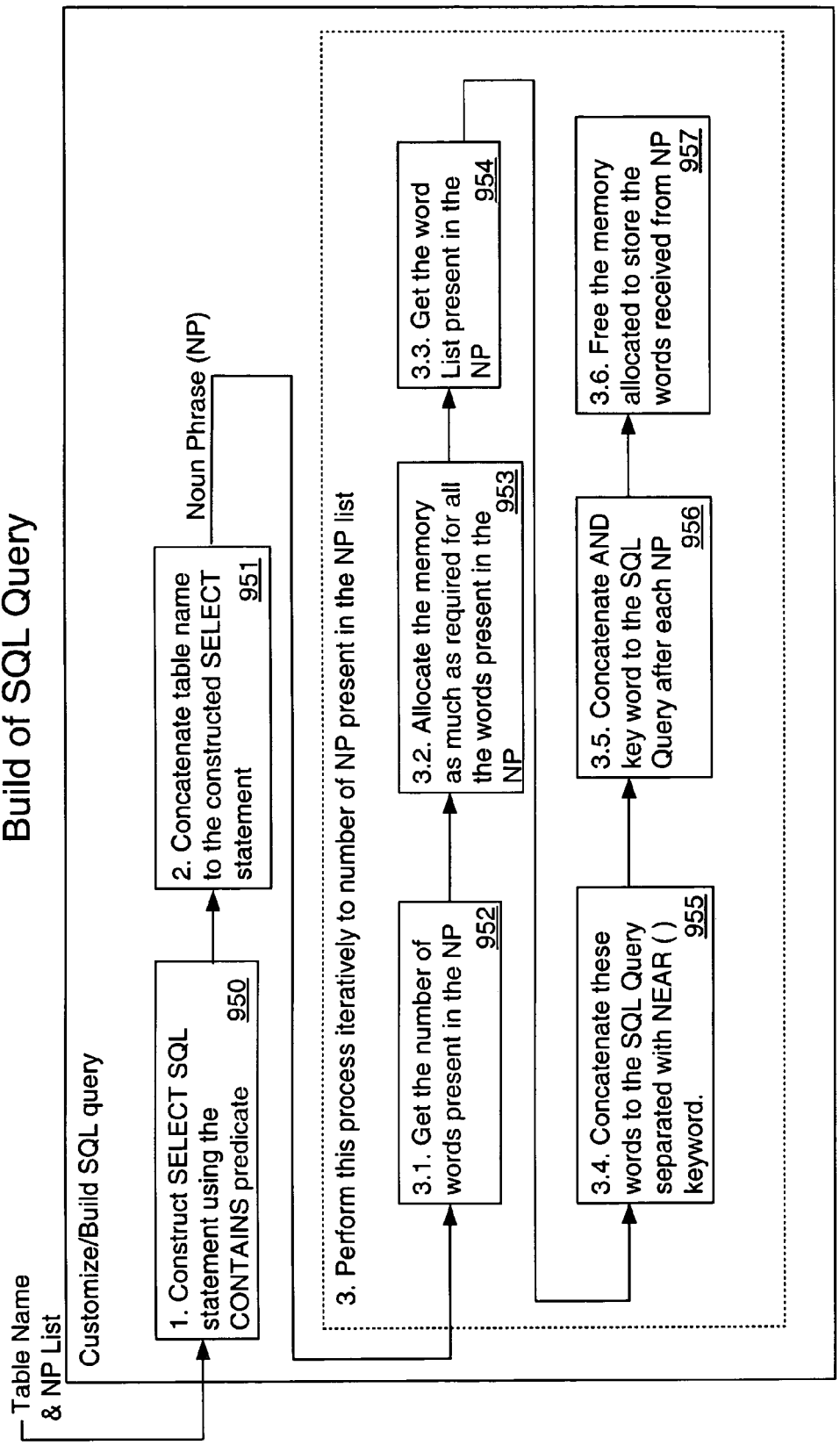

Fig.7A

| FIELD NAME 701A | DATA TYPE 702A | SIZE 703A | NULL 704A | PRIMARY KEY 705A | INDEXED? 706A |
|---|---|---|---|---|---|
| ChapterName 707A | Varchar | 255 | No | No | Yes |
| SectionName 708A | Varchar | 255 | No | No | Yes |

Fig. 7B

| FIELD NAME 720 | DATA TYPE 721 | SIZE 722 | NULL 723 | PRIMARY KEY 724 | INDEXED? 725 |
|---|---|---|---|---|---|
| Chapter_ID 726 | Integer | | No | Yes | Yes |
| Answer_ID 727 | Char | 5 | No | UNIQUE | Yes |
| Section_Name 728 | Varchar | 255 | No | UNIQUE | Yes |
| Answer_Title 729 | Varchar | 255 | Yes | No | Yes |
| PairedQuestion 730 | Text | 16 | No | No | Yes (Full-Text) |
| AnswerPath 731 | Varchar | 255 | No | No | Yes |
| Creator 732 | Varchar | 50 | No | No | Yes |
| Date_of_Creation 733 | Date | - | No | No | Yes |
| Date_of_Modification 734 | Date | - | No | No | Yes |

Fig. 7C

| Field | Description |
|---|---|
| | 735 |
| AnswerID  720 | An integer - automatically incremented for user convenience |
| Section_Name  727 | Name of section to which the particular record belongs. This field along with AnswerID has to be made primary key |
| Answer_Title  728 | A short description of the answer |
| PairedQuestion  729 | Contains one or more combinations of questions for the related answer whose path is stored in the next column AnswerPath |
| AnswerPath  730 | Contains the path of text file, which contains the answer to the related questions stored in the previous column |
| Creator  731 | Name of content creator |
| Date_of_Creation  732 | Date on which content has been added |
| Date_of_Modification  733 | Date on which content has been changed or modified |
| 734 | |

Fig. 7D

| FIELD 740 | DATA TYPE 741 | SIZE 742 | NULL 743 | PRIMARY KEY 744 | INDEXED 745 |
|---|---|---|---|---|---|
| Answer_ID 746 | Char | 5 | No | Yes | Yes |
| Answer_Title 747 | Varchar | 255 | Yes | No | No |
| PairedQuestion 748 | Text | 16 | No | No | Yes (Full-Text) |
| Answer_Path 749 | Varchar | 255 | No | No | No |
| Creator 750 | Varchar | 50 | No | No | No |
| Date_of_Creation 751 | Date | - | No | No | No |
| Date_of_Modification 752 | Date | - | No | No | No |

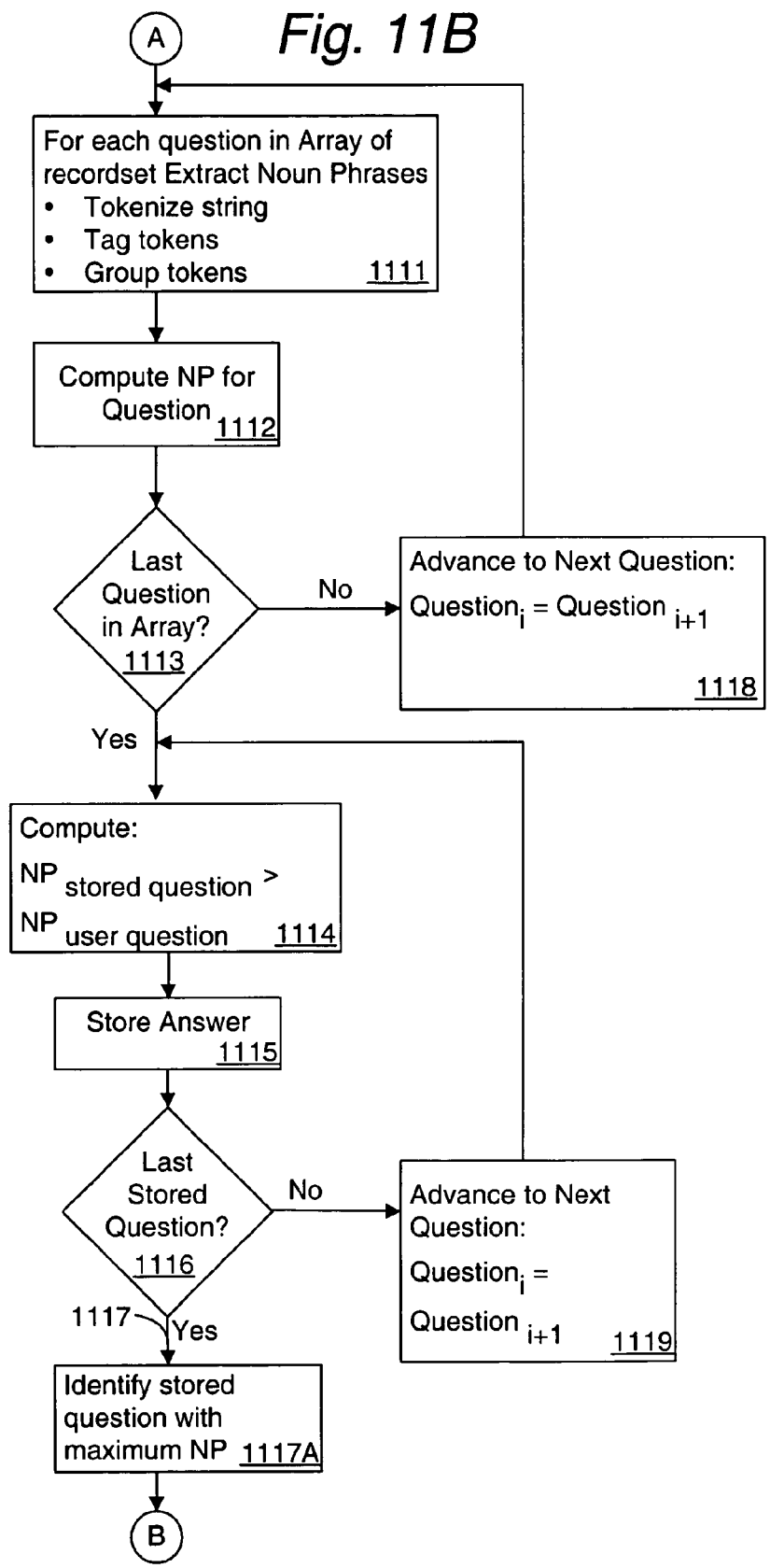

ADJUSTABLE RESOURCE BASED SPEECH RECOGNITION SYSTEM

RELATED APPLICATIONS

The present application claims priority to and is a continuation of Ser. No. 11/030,864 filed Jan. 7, 2005 (now U.S. Pat. No. 7,139,714), which is a continuation of Ser. No. 10/684,357 filed Oct. 10, 2003—which in turn is a continuation of Ser. No. 09/439,145 filed Nov. 12, 1999 (now U.S. Pat. No. 6,633,846). All of the above applications are hereby incorporated by reference herein.

FIELD OF THE INVENTION

The invention relates to a system and an interactive method for responding to speech based user inputs and queries presented over a distributed network such as the INTERNET or local intranet. This interactive system when implemented over the World-Wide Web services (WWW) of the INTERNET, functions so that a client or user can ask a question in a natural language such as English, French, German, Spanish or Japanese and receive the appropriate answer at his or her computer or accessory also in his or her native natural language. The system has particular applicability to such applications as remote learning, e-commerce, technical e-support services, INTERNET searching, etc.

BACKGROUND OF THE INVENTION

The INTERNET, and in particular, the World-Wide Web (WWW), is growing in popularity and usage for both commercial and recreational purposes, and this trend is expected to continue. This phenomenon is being driven, in part, by the increasing and widespread use of personal computer systems and the availability of low cost INTERNET access.

The emergence of inexpensive INTERNET access devices and high speed access techniques such as ADSL, cable modems, satellite modems, and the like, are expected to further accelerate the mass usage of the WWW.

Accordingly, it is expected that the number of entities offering services, products, etc., over the WWW will increase dramatically over the coming years. Until now, however, the INTERNET "experience" for users has been limited mostly to non-voice based input/output devices, such as keyboards, intelligent electronic pads, mice, trackballs, printers, monitors, etc. This presents somewhat of a bottleneck for interacting over the WWW for a variety of reasons.

First, there is the issue of familiarity. Many kinds of applications lend themselves much more naturally and fluently to a voice-based environment. For instance, most people shopping for audio recordings are very comfortable with asking a live sales clerk in a record store for information on titles by a particular author, where they can be found in the store, etc. While it is often possible to browse and search on one's own to locate items of interest, it is usually easier and more efficient to get some form of human assistance first, and, with few exceptions, this request for assistance is presented in the form of a oral query. In addition, many persons cannot or will not, because of physical or psychological barriers, use any of the aforementioned conventional I/O devices. For example, many older persons cannot easily read the text presented on WWW pages, or understand the layout/hierarchy of menus, or manipulate a mouse to make finely coordinated movements to indicate their selections. Many others are intimidated by the look and complexity of computer systems, WWW pages, etc., and therefore do not attempt to use online services for this reason as well.

Thus, applications which can mimic normal human interactions are likely to be preferred by potential on-line shoppers and persons looking for information over the WWW. It is also expected that the use of voice-based systems will increase the universe of persons willing to engage in e-commerce, e-learning, etc. To date, however, there are very few systems, if any, which permit this type of interaction, and, if they do, it is very limited. For example, various commercial programs sold by IBM (VIAVOICE™) and Kurzweil (DRAGON™) permit some user control of the interface (opening, closing files) and searching (by using previously trained URLs) but they do not present a flexible solution that can be used by a number of users across multiple cultures and without time consuming voice training. Typical prior efforts to implement voice based functionality in an INTERNET context can be seen in U.S. Pat. No. 5,819,220 incorporated by reference herein.

Another issue presented by the lack of voice-based systems is efficiency. Many companies are now offering technical support over the INTERNET, and some even offer live operator assistance for such queries. While this is very advantageous (for the reasons mentioned above) it is also extremely costly and inefficient, because a real person must be employed to handle such queries. This presents a practical limit that results in long wait times for responses or high labor overheads. An example of this approach can be seen U.S. Pat. No. 5,802,526 also incorporated by reference herein. In general, a service presented over the WWW is far more desirable if it is "scalable," or, in other words, able to handle an increasing amount of user traffic with little if any perceived delay or troubles by a prospective user.

In a similar context, while remote learning has become an increasingly popular option for many students, it is practically impossible for an instructor to be able to field questions from more than one person at a time. Even then, such interaction usually takes place for only a limited period of time because of other instructor time constraints. To date, however, there is no practical way for students to continue a human-like question and answer type dialog after the learning session is over, or without the presence of the instructor to personally address such queries.

Conversely, another aspect of emulating a human-like dialog involves the use of oral feedback. In other words, many persons prefer to receive answers and information in audible form. While a form of this functionality is used by some websites to communicate information to visitors, it is not performed in a real-time, interactive question-answer dialog fashion so its effectiveness and usefulness is limited.

Yet another area that could benefit from speech-based interaction involves so-called "search" engines used by INTERNET users to locate information of interest at web sites, such as the those available at YAHOO®.com, METACRAWLER®.com, EXCITE®.com, etc. These tools permit the user to form a search query using either combinations of keywords or metacategories to search through a web page database containing text indices associated with one or more distinct web pages. After processing the user's request, therefore, the search engine returns a number of hits which correspond, generally, to URL pointers and text excerpts from the web pages that represent the closest match made by such search engine for the particular user query based on the search processing logic used by search engine. The structure and operation of such prior art search engines, including the mechanism by which they build the web page database, and parse the search query, are well known in the art. To date, applicant is unaware of any such search engine that can easily and reliably search and retrieve information based on speech input from a user.

There are a number of reasons why the above environments (e-commerce, e-support, remote learning, INTERNET searching, etc.) do not utilize speech-based interfaces, despite the many benefits that would otherwise flow from such capability. First, there is obviously a requirement that the output of the speech recognizer be as accurate as possible. One of the more reliable approaches to speech recognition used at this time is based on the Hidden Markov Model (HMM)—a model used to mathematically describe any time series. A conventional usage of this technique is disclosed, for example, in U.S. Pat. No. 4,587,670 incorporated by reference herein. Because speech is considered to have an underlying sequence of one or more symbols, the HMM models corresponding to each symbol are trained on vectors from the speech waveforms. The Hidden Markov Model is a finite set of states, each of which is associated with a (generally multi-dimensional) probability distribution. Transitions among the states are governed by a set of probabilities called transition probabilities. In a particular state an outcome or observation can be generated, according to the associated probability distribution. This finite state machine changes state once every time unit, and each time t such that a state j is entered, a spectral parameter vector $O_t$ is generated with probability density $B_j(O_t)$. It is only the outcome, not the state visible to an external observer and therefore states are "hidden" to the outside; hence the name Hidden Markov Model. The basic theory of HMMs was published in a series of classic papers by Baum and his colleagues in the late 1960's and early 1970's. HMMs were first used in speech applications by Baker at Carnegie Mellon, by Jelenik and colleagues at IBM in the late 1970's and by Steve Young and colleagues at Cambridge University, UK in the 1990's. Some typical papers and texts are as follows:

1. L. E. Baum, T. Petrie, "Statistical inference for probabilistic functions for finite state Markov chains", Ann. Math. Stat., 37: 1554-1563, 1966
2. L. E. Baum, "An inequality and associated maximation technique in statistical estimation for probabilistic functions of Markov processes", Inequalities 3: 1-8, 1972
3. J. H. Baker, "The dragon system—An Overview", IEEE Trans. on ASSP Proc., ASSP-23(1): 24-29, Feb. 1975
4. F. Jeninek et al, "Continuous Speech Recognition: Statistical methods" in Handbook of Statistics, II, P. R. Kristnaiad, Ed. Amsterdam, The Netherlands, North-Holland, 1982
5. L. R. Bahl, F. Jeninek, R. L. Mercer, "A maximum likelihood approach to continuous speech recognition", IEEE Trans. Pattern Anal. Mach. Intell., PAMI-5: 179-190, 1983
6. J. D. Ferguson, "Hidden Markov Analysis: An Introduction", in Hidden Markov Models for Speech, Institute of Defense Analyses, Princeton, N.J. 1980.
7. H. R. Rabiner and B. H. Juang, "Fundamentals of Speech Recognition", Prentice Hall, 1993
8. H. R. Rabiner, "Digital Processing of Speech Signals", Prentice Hall, 1978

More recently research has progressed in extending HMM and combining HMMs with neural networks to speech recognition applications at various laboratories. The following is a representative paper:

9. Nelson Morgan, Hervé Bourlard, Steve Renals, Michael Cohen and Horacio Franco (1993), Hybrid Neural Network/Hidden Markov Model Systems for Continuous Speech Recognition. *Journal of Pattern Recognition and Artificial Intelligence*, Vol. 7, No. 4 pp. 899-916. Also in I. Guyon and P. Wang editors, *Advances in Pattern Recognition Systems using Neural Networks*, Vol. 7 of a Series in Machine Perception and Artificial Intelligence. World Scientific, February 1994.

All of the above are hereby incorporated by reference. While the HMM-based speech recognition yields very good results, contemporary variations of this technique cannot guarantee a word accuracy requirement of 100% exactly and consistently, as will be required for WWW applications for all possible all user and environment conditions. Thus, although speech recognition technology has been available for several years, and has improved significantly, the technical requirements have placed severe restrictions on the specifications for the speech recognition accuracy that is required for an application that combines speech recognition and natural language processing to work satisfactorily.

In contrast to word recognition, Natural language processing (NLP) is concerned with the parsing, understanding and indexing of transcribed utterances and larger linguistic units. Because spontaneous speech contains many surface phenomena such as disfluencies,—hesitations, repairs and restarts, discourse markers such as 'well' and other elements which cannot be handled by the typical speech recognizer, it is the problem and the source of the large gap that separates speech recognition and natural language processing technologies. Except for silence between utterances, another problem is the absence of any marked punctuation available for segmenting the speech input into meaningful units such as utterances. For optimal NLP performance, these types of phenomena should be annotated at its input. However, most continuous speech recognition systems produce only a raw sequence of words. Examples of conventional systems using NLP are shown in U.S. Pat. Nos. 4,991,094, 5,068,789, 5,146,405 and 5,680,628, all of which are incorporated by reference herein.

Second, most of the very reliable voice recognition systems are speaker-dependent, requiring that the interface be "trained" with the user's voice, which takes a lot of time, and is thus very undesirable from the perspective of a WWW environment, where a user may interact only a few times with a particular website. Furthermore, speaker-dependent systems usually require a large user dictionary (one for each unique user) which reduces the speed of recognition. This makes it much harder to implement a real-time dialog interface with satisfactory response capability (i.e., something that mirrors normal conversation—on the order of 3-5 seconds is probably ideal). At present, the typical shrink-wrapped speech recognition application software include offerings from IBM (VIAVOICE™) and Dragon Systems (DRAGON™). While most of these applications are adequate for dictation and other transcribing applications, they are woefully inadequate for applications such as NLQS where the word error rate must be close to 0%. In addition these offerings require long training times and are typically are non client-server configurations. Other types of trained systems are discussed in U.S. Pat. No. 5,231,670 assigned to Kurzweil, and which is also incorporated by reference herein.

Another significant problem faced in a distributed voice-based system is a lack of uniformity/control in the speech recognition process. In a typical stand-alone implementation of a speech recognition system, the entire SR engine runs on a single client. A well-known system of this type is depicted in U.S. Pat. No. 4,991,217 incorporated by reference herein. These clients can take numerous forms (desktop PC, laptop PC, PDA, etc.) having varying speech signal processing and communications capability. Thus, from the server side perspective, it is not easy to assure uniform treatment of all users accessing a voice-enabled web page, since such users may have significantly disparate word recognition and error rate performances. While a prior art reference to Gould et al.—U.S. Pat. No. 5,915,236—discusses generally the notion of tailoring a recognition process to a set of available computational resources, it does not address or attempt to solve the issue of how to optimize resources in a distributed environment such as a client-server model. Again, to enable such voice-based technologies on a wide-spread scale it is far more preferable to have a system that harmonizes and accounts for discrepancies in individual systems so that even the thinnest client is supportable, and so that all users are able to interact in a satisfactory manner with the remote server running the e-commerce, e-support and/or remote learning application.

Two references that refer to a distributed approach for speech recognition include U.S. Pat. Nos. 5,956,683 and 5,960,399 incorporated by reference herein. In the first of these, U.S. Pat. No. 5,956,683—Distributed Voice Recognition System (assigned to Qualcomm) an implementation of a distributed voice recognition system between a telephony-based handset and a remote station is described. In this implementation, all of the word recognition operations seem to take place at the handset. This is done since the patent describes the benefits that result from locating of the system for acoustic feature extraction at the portable or cellular phone in order to limit degradation of the acoustic features due to quantization distortion resulting from the narrow bandwidth telephony channel. This reference therefore does not address the issue of how to ensure adequate performance for a very thin client platform. Moreover, it is difficult to determine, how, if at all, the system can perform real-time word recognition, and there is no meaningful description of how to integrate the system with a natural language processor.

The second of these references—U.S. Pat. No. 5,960,399—Client/Server Speech Processor/Recognizer (assigned to GTE) describes the implementation of a HMM-based distributed speech recognition system. This reference is not instructive in many respects, however, including how to optimize acoustic feature extraction for a variety of client platforms, such as by performing a partial word recognition process where appropriate. Most importantly, there is only a description of a primitive server-based recognizer that only recognizes the user's speech and simply returns certain keywords such as the user's name and travel destination to fill out a dedicated form on the user's machine. Also, the streaming of the acoustic parameters does not appear to be implemented in real-time as it can only take place after silence is detected. Finally, while the reference mentions the possible use of natural language processing (column 9) there is no explanation of how such function might be implemented in a real-time fashion to provide an interactive feel for the user.

SUMMARY OF THE INVENTION

An object of the present invention, therefore, is to provide an improved system and method for overcoming the limitations of the prior art noted above;

A primary object of the present invention is to provide a word and phrase recognition system that is flexibly and optimally distributed across a client/platform computing architecture, so that improved accuracy, speed and uniformity can be achieved for a wide group of users;

A further object of the present invention is to provide a speech recognition system that efficiently integrates a distributed word recognition system with a natural language processing system, so that both individual words and entire speech utterances can be quickly and accurately recognized in any number of possible languages;

A related object of the present invention is to provide an efficient query response system so that an extremely accurate, real-time set of appropriate answers can be given in response to speech-based queries;

Yet another object of the present invention is to provide an interactive, real-time instructional/learning system that is distributed across a client/server architecture, and permits a real-time question/answer session with an interactive character;

A related object of the present invention is to implement such interactive character with an articulated response capability so that the user experiences a human-like interaction;

Still a further object of the present invention is to provide an INTERNET website with speech processing capability so that voice based data and commands can be used to interact with such site, thus enabling voice-based e-commerce and e-support services to be easily scaleable;

Another object is to implement a distributed speech recognition system that utilizes environmental variables as part of the recognition process to improve accuracy and speed;

A further object is to provide a scaleable query/response database system, to support any number of query topics and users as needed for a particular application and instantaneous demand;

Yet another object of the present invention is to provide a query recognition system that employs a two-step approach, including a relatively rapid first step to narrow down the list of potential responses to a smaller candidate set, and a second more computationally intensive second step to identify the best choice to be returned in response to the query from the candidate set;

A further object of the present invention is to provide a natural language processing system that facilitates query recognition by extracting lexical components of speech utterances, which components can be used for rapidly identifying a candidate set of potential responses appropriate for such speech utterances;

Another related object of the present invention is to provide a natural language processing system that facilitates query recognition by comparing lexical components of speech utterances with a candidate set of potential response to provide an extremely accurate best response to such query.

One general aspect of the present invention, therefore, relates to a natural language query system (NLQS) that offers a fully interactive method for answering user's questions over a distributed network such as the INTERNET or a local intranet. This interactive system when implemented over the worldwide web (WWW) services of the INTERNET functions so that a client or user can ask a question in a natural language such as English, French, German or Spanish and receive the appropriate answer at his or her personal computer also in his or her native natural language.

The system is distributed and consists of a set of integrated software modules at the client's machine and another set of integrated software programs resident on a server or set of servers. The client-side software program is comprised of a speech recognition program, an agent and its control program, and a communication program. The server-side program is comprised of a communication program, a natural language engine (NLE), a database processor (DBProcess), an interface program for interfacing the DBProcess with the NLE, and a SQL database. In addition, the client's machine is equipped with a microphone and a speaker. Processing of the speech utterance is divided between the client and server side so as to optimize processing and transmission latencies, and so as to provide support for even very thin client platforms.

In the context of an interactive learning application, the system is specifically used to provide a single-best answer to a user's question. The question that is asked at the client's machine is articulated by the speaker and captured by a microphone that is built in as in the case of a notebook computer or is supplied as a standard peripheral attachment. Once the question is captured, the question is processed partially by NLQS client-side software resident in the client's machine. The output of this partial processing is a set of speech vectors that are transported to the server via the INTERNET to complete the recognition of the user's questions. This recognized speech is then converted to text at the server.

After the user's question is decoded by the speech recognition engine (SRE) located at the server, the question is converted to a structured query language (SQL) query. This query is then simultaneously presented to a software process within the server called DBProcess for preliminary processing and to a Natural Language Engine (NLE) module for extracting the noun phrases (NP) of the user's question. During the process of extracting the noun phrase within the NLE, the tokens of the users' question are tagged. The tagged tokens are then grouped so that the NP list can be determined. This information is stored and sent to the DBProcess process.

In the DBProcess, the SQL query is fully customized using the NP extracted from the user's question and other environment variables that are relevant to the application. For example, in a training application, the user's selection of course, chapter and or section would constitute the environment variables. The SQL query is constructed using the extended SQL Full-Text predicates—CONTAINS, FREETEXT, NEAR, AND. The SQL query is next sent to the Full-Text search engine within the SQL database, where a Full-Text search procedure is initiated. The result of this search procedure is recordset of answers. This recordset contains stored questions that are similar linguistically to the user's question. Each of these stored questions has a paired answer stored in a separate text file, whose path is stored in a table of the database.

The entire recordset of returned stored answers is then returned to the NLE engine in the form of an array. Each stored question of the array is then linguistically processed sequentially one by one. This linguistic processing constitutes the second step of a 2-step algorithm to determine the single best answer to the user's question. This second step proceeds as follows: for each stored question that is returned in the recordset, a NP of the stored question is compared with the NP of the user's question. After all stored questions of the array are compared with the user's question, the stored question that yields the maximum match with the user's question is selected as the best possible stored question that matches the user's question. The metric that is used to determine the best possible stored question is the number of noun phrases.

The stored answer that is paired to the best-stored question is selected as the one that answers the user's question. The ID tag of the question is then passed to the DBProcess. This DBProcess returns the answer which is stored in a file.

A communication link is again established to send the answer back to the client in compressed form. The answer once received by the client is decompressed and articulated to the user by the text-to-speech engine. Thus, the invention can be used in any number of different applications involving interactive learning systems, INTERNET related commerce sites, INTERNET search engines, etc.

Computer-assisted instruction environments often require the assistance of mentors or live teachers to answer questions from students. This assistance often takes the form of organizing a separate pre-arranged forum or meeting time that is set aside for chat sessions or live call-in sessions so that at a scheduled time answers to questions may be provided. Because of the time immediacy and the on-demand or asynchronous nature of on-line training where a student may log on and take instruction at any time and at any location, it is important that answers to questions be provided in a timely and cost-effective manner so that the user or student can derive the maximum benefit from the material presented.

This invention addresses the above issues. It provides the user or student with answers to questions that are normally channeled to a live teacher or mentor. This invention provides a single-best answer to questions asked by the student. The student asks the question in his or her own voice in the language of choice. The speech is recognized and the answer to the question is found using a number of technologies including distributed speech recognition, full-text search database processing, natural language processing and text-to-speech technologies. The answer is presented to the user, as in the case of a live teacher, in an articulated manner by an agent that mimics the mentor or teacher, and in the language of choice—English, French, German, Japanese or other natural spoken language. The user can choose the agent's gender as well as several speech parameters such as pitch, volume and speed of the character's voice.

Other applications that benefit from NLQS are e-commerce applications. In this application, the user's query for a price of a book, compact disk or for the availability of any item that is to be purchased can be retrieved without the need to pick through various lists on successive web pages. Instead, the answer is provided directly to the user without any additional user input.

Similarly, it is envisioned that this system can be used to provide answers to frequently-asked questions (FAQs), and as a diagnostic service tool for e-support. These questions are typical of a give web site and are provided to help the user find information related to a payment procedure or the specifications of, or problems experienced with a product/service. In all of these applications, the NLQS architecture can be applied.

A number of inventive methods associated with these architectures are also beneficially used in a variety of INTERNET related applications.

Although the inventions are described below in a set of preferred embodiments, it will be apparent to those skilled in the art the present inventions could be beneficially used in many environments where it is necessary to implement fast, accurate speech recognition, and/or to provide a human-like dialog capability to an intelligent system.

BRIEF DESCRIPTION OF THE DRAWINGS

FIG. 1 is a block diagram of a preferred embodiment of a natural language query system (NLQS) of the present invention, which is distributed across a client/server computing architecture, and can be used as an interactive learning system, an e-commerce system, an e-support system, and the like;

FIG. 3 is a block diagram of a preferred embodiment of a set of routines and procedures used for handling an iterated set of speech utterances on the client side system of FIG. 2A-2C, transmitting speech data for such utterances to a remote server, and receiving appropriate responses back from such server;

FIG. 4B is a block diagram of a preferred set of routines and procedures used for implementing an SQL query builder for the server side system of FIG. 5;

FIG. 7A illustrates the organization of a full-text database course table used as part of server side system shown in FIG. 5 for an interactive learning embodiment of the present invention;

FIG. 7B illustrates the organization of a full-text database chapter table used as part of server side system shown in FIG. 5 for an interactive learning embodiment of the present invention;

FIG. 7C describes the fields used in a chapter table used as part of server side system shown in FIG. 5 for an interactive learning embodiment of the present invention;

FIG. 7D describes the fields used in a section table used as part of server side system shown in FIG. 5 for an interactive learning embodiment of the present invention;

FIGS. 11A-11C are flow diagrams illustrating steps performed in a preferred two step process implemented for query recognition by the NLQS of FIG. 2;

DETAILED DESCRIPTION OF THE INVENTION

Overview

Figure 2A:
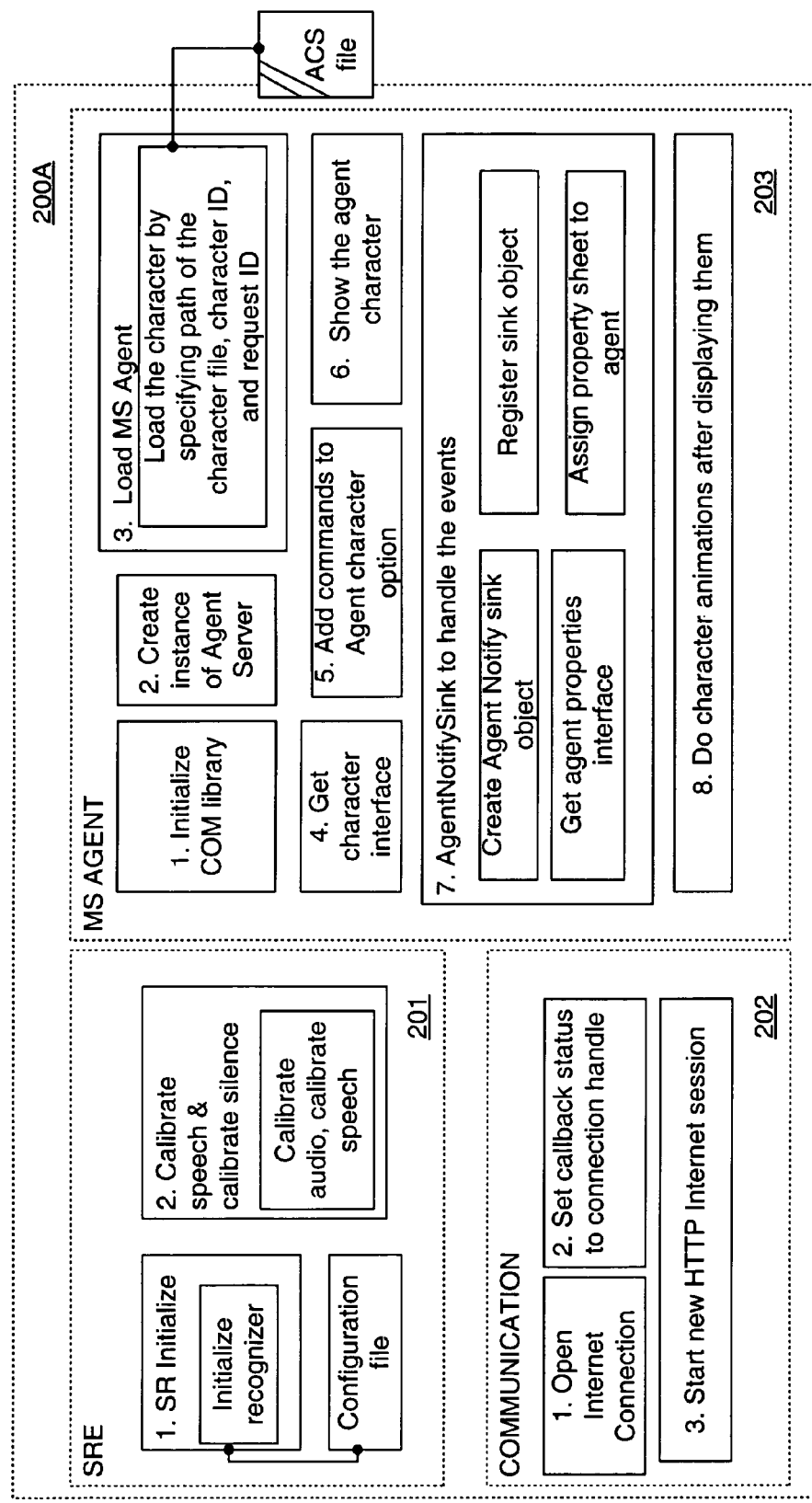
FIGS. 2A-2C are a block diagram of a preferred embodiment of a client side system, including speech capturing modules, partial speech processing modules, encoding modules, transmission modules, agent control modules, and answer/voice feedback modules that can be used in the aforementioned NLQS.

As alluded to above, the present inventions allow a user to ask a question in a natural language such as English, French, German, Spanish or Japanese at a client computing system (which can be as simple as a personal digital assistant or cell-phone, or as sophisticated as a high end desktop PC) and receive an appropriate answer from a remote server also in his or her native natural language. As such, the embodiment of the invention shown in FIG. 1 is beneficially used in what can be generally described as a Natural Language Query System (NLQS) 100, which is configured to interact on a real-time basis to give a human-like dialog capability/experience for e-commerce, e-support, and e-learning applications.

The processing for NLQS 100 is generally distributed across a client side system 150, a data link 160, and a server-side system 180. These components are well known in the art, and in a preferred embodiment include a personal computer system 150, an INTERNET connection 160A, 160B, and a larger scale computing system 180. It will be understood by those skilled in the art that these are merely exemplary components, and that the present invention is by no means limited to any particular implementation or combination of such systems. For example, client-side system 150 could also be implemented as a computer peripheral, a PDA, as part of a cell-phone, as part of an INTERNET-adapted appliance, an INTERNET linked kiosk, etc. Similarly, while an INTERNET connection is depicted for data link 160A, it is apparent that any channel that is suitable for carrying data between client system 150 and server system 180 will suffice, including a wireless link, an RF link, an IR link, a LAN, and the like. Finally, it will be further appreciated that server system 180 may be a single, large-scale system, or a collection of smaller systems interlinked to support a number of potential network users.

Initially speech input is provided in the form of a question or query articulated by the speaker at the client's machine or personal accessory as a speech utterance. This speech utterance is captured and partially processed by NLQS client-side software 155 resident in the client's machine. To facilitate and enhance the human-like aspects of the interaction, the question is presented in the presence of an animated character 157 visible to the user who assists the user as a personal information retriever/agent. The agent can also interact with the user using both visible text output on a monitor/display (not shown) and/or in audible form using a text to speech engine 159. The output of the partial processing done by SRE 155 is a set of speech vectors that are transmitted over communication channel 160 that links the user's machine or personal accessory to a server or servers via the INTERNET or a wireless gateway that is linked to the INTERNET as explained above. At server 180, the partially processed speech signal data is handled by a server-side SRE 182, which then outputs recognized speech text corresponding to the user's question. Based on this user question related text, a text-to-query converter 184 formulates a suitable query that is used as input to a database processor 186. Based on the query, database processor 186 then locates and retrieves an appropriate answer using a customized SQL query from database 188. A Natural Language Engine 190 facilitates structuring the query to database 188. After a matching answer to the user's question is found, the former is transmitted in text form across data link 160B, where it is converted into speech by text to speech engine 159, and thus expressed as oral feedback by animated character agent 157.

Because the speech processing is broken up in this fashion, it is possible to achieve real-time, interactive, human-like dialog consisting of a large, controllable set of questions/answers. The assistance of the animated agent 157 further enhances the experience, making it more natural and comfortable for even novice users. To make the speech recognition process more reliable, context-specific grammars and dictionaries are used, as well as natural language processing routines at NLE 190, to analyze user questions lexically. While context-specific processing of speech data is known in the art (see e.g., U.S. Pat. Nos. 5,960,394, 5,867,817, 5,758,322 and 5,384,892 incorporated by reference herein) the present inventors are unaware of any such implementation as embodied in the present inventions. The text of the user's question is compared against text of other questions to identify the question posed by the user by DB processor/engine (DBE) 186. By optimizing the interaction and relationship of the SR engines 155 and 182, the NLP routines 190, and the dictionaries and grammars, an extremely fast and accurate match can be made, so that a unique and responsive answer can be provided to the user.

On the server side 180, interleaved processing further accelerates the speech recognition process. In simplified terms, the query is presented simultaneously both to NLE 190 after the query is formulated, as well as to DBE 186. NLE 190 and SRE 182 perform complementary functions in the overall recognition process. In general, SRE 182 is primarily responsible for determining the identity of the words articulated by the user, while NLE 190 is responsible for the linguistic morphological analysis of both the user's query and the search results returned after the database query.

After the user's query is analyzed by NLE 190 some parameters are extracted and sent to the DBProcess. Additional statistics are stored in an array for the $2^{nd}$ step of processing. During the $2^{nd}$ step of 2-step algorithm, the recordset of preliminary search results are sent to the NLE 160 for processing. At the end of this $2^{nd}$ step, the single question that matches the user's query is sent to the DBProcess where further processing yields the paired answer that is paired with the single best stored question.

Thus, the present invention uses a form of natural language processing (NLP) to achieve optimal performance in a speech based web application system. While NLP is known in the art, prior efforts in Natural Language Processing (NLP) work nonetheless have not been well integrated with Speech Recognition (SR) technologies to achieve reasonable results in a web-based application environment. In speech recognition, the result is typically a lattice of possible recognized words each with some probability of fit with the speech recognizer. As described before, the input to a typical NLP system is typically a large linguistic unit. The NLP system is then charged with the parsing, understanding and indexing of this large linguistic unit or set of transcribed utterances. The result of this NLP process is to understand lexically or morphologically the entire linguistic unit as opposed to word recognition. Put another way, the linguistic unit or sentence of connected words output by the SRE has to be understood lexically, as opposed to just being "recognized".

As indicated earlier, although speech recognition technology has been available for several years, the technical requirements for the NLQS invention have placed severe restrictions on the specifications for the speech recognition accuracy that is required for an application that combines speech recognition and natural language processing to work satisfactorily. In realizing that even with the best of conditions, it might be not be possible to achieve the perfect 100% speech recognition accuracy that is required, the present invention employs an algorithm that balances the potential risk of the speech recognition process with the requirements of the natural language processing so that even in cases where perfect speech recognition accuracy is not achieved for each word in the query, the entire query itself is nonetheless recognized with sufficient accuracy.

This recognition accuracy is achieved even while meeting very stringent user constraints, such as short latency periods of 3 to 5 seconds (ideally—ignoring transmission latencies which can vary) for responding to a speech-based query, and for a potential set of 100-250 query questions. This quick response time gives the overall appearance and experience of a real-time discourse that is more natural and pleasant from the user's perspective. Of course, non-real time applications, such as translation services for example, can also benefit from the present teachings as well, since a centralized set of HMMs, grammars, dictionaries, etc., are maintained.

General Aspects of Speech Recognition Used in the Present Inventions

General background information on speech recognition can be found in the prior art references discussed above and incorporated by reference herein. Nonetheless, a discussion of some particular exemplary forms of speech recognition structures and techniques that are well-suited for NLQS 100 is provided next to better illustrate some of the characteristics, qualities and features of the present inventions.

Speech recognition technology is typically of two types—speaker independent and speaker dependent. In speaker-dependent speech recognition technology, each user has a voice file in which a sample of each potentially recognized word is stored. Speaker-dependent speech recognition systems typically have large vocabularies and dictionaries making them suitable for applications as dictation and text transcribing. It follows also that the memory and processor resource requirements for the speaker-dependent can be and are typically large and intensive.

Conversely speaker-independent speech recognition technology allows a large group of users to use a single vocabulary file. It follows then that the degree of accuracy that can be achieved is a function of the size and complexity of the grammars and dictionaries that can be supported for a given language. Given the context of applications for which NLQS, the use of small grammars and dictionaries allow speaker independent speech recognition technology to be implemented in NLQS.

The key issues or requirements for either type—speaker-independent or speaker-dependent, are accuracy and speed. As the size of the user dictionaries increase, the speech recognition accuracy metric—word error rate (WER) and the speed of recognition decreases. This is so because the search time increases and the pronunciation match becomes more complex as the size of the dictionary increases.

The basis of the NLQS speech recognition system is a series of Hidden Markov Models (HMM), which, as alluded to earlier, are mathematical models used to characterize any time varying signal. Because parts of speech are considered to be based on an underlying sequence of one or more symbols, the HMM models corresponding to each symbol are trained on vectors from the speech waveforms. The Hidden Markov Model is a finite set of states, each of which is associated with a (generally multi-dimensional) probability distribution. Transitions among the states are governed by a set of probabilities called transition probabilities. In a particular state an outcome or observation can be generated, according to an associated probability distribution. This finite state machine changes state once every time unit, and each time t such that a state j is entered, a spectral parameter vector $O_t$ is generated with probability density $B_j(O_t)$. It is only the outcome, not the state which is visible to an external observer and therefore states are "hidden" to the outside; hence the name Hidden Markov Model.

In isolated speech recognition, it is assumed that the sequence of observed speech vectors corresponding to each word can each be described by a Markov model as follows:

$$O = o_1, o_2, \ldots o_T \quad (1\text{-}1)$$

where $o_t$ is a speech vector observed at time t. The isolated word recognition then is to compute:

$$\arg\max\{P(w_i|O)\} \quad (1\text{-}2)$$

By using Bayes' Rule, $$\{P(w_i|O)\} = [P(O|w_i)P(w_i)]/P(O) \quad (1\text{-}3)$$

In the general case, the Markov model when applied to speech also assumes a finite state machine which changes state once every time unit and each time that a state j is entered, a speech vector $o_t$ is generated from the probability density $b_j(o_t)$. Furthermore, the transition from state i to state j is also probabilistic and is governed by the discrete probability $a_{ij}$.

For a state sequence X, the joint probability that O is generated by the model M moving through a state sequence X is the product of the transition probabilities and the output probabilities. Only the observation sequence is known—the state sequence is hidden as mentioned before.

Given that X is unknown, the required likelihood is computed by summing over all possible state sequences $X = x(1), x(2), x(3), \ldots x(T)$, that is $$P(O|M) = \Sigma\{a_{x(0)x(1)}\pi b(x)(o_t)a_{x(t)x(t+1)}\}$$

Given a set of models $M_i$, corresponding to words $w_i$, equation 1-2 is solved by using 1-3 and also by assuming that:

$$P(O|w_i) = P(O|M_i)$$

All of this assumes that the parameters $\{a_{ij}\}$ and $\{b_j(o_t)\}$ are known for each model $M_i$. This can be done, as explained earlier, by using a set of training examples corresponding to a particular model. Thereafter, the parameters of that model can be determined automatically by a robust and efficient re-estimation procedure. So if a sufficient number of representative examples of each word are collected, then a HMM can be constructed which simply models all of the many sources of variability inherent in real speech. This training is well-known in the art, so it is not described at length herein, except to note that the distributed architecture of the present invention enhances the quality of HMMs, since they are derived and constituted at the server side, rather than the client side. In this way, appropriate samples from users of different geographical areas can be easily compiled and analyzed to optimize the possible variations expected to be seen across a particular language to be recognized. Uniformity of the speech recognition process is also well-maintained, and error diagnostics are simplified, since each prospective user is using the same set of HMMs during the recognition process.

To determine the parameters of a HMM from a set of training samples, the first step typically is to make a rough guess as to what they might be. Then a refinement is done using the Baum-Welch estimation formulae. By these formulae, the maximum likelihood estimates of $\mu_j$ (where $\mu_j$ is mean vector and $\Sigma_j$ is covariance matrix) is:

$$\mu_j = \Sigma^T_{t=1} L_j(t) o_t / [\Sigma^T_{t=1} L_j(t) o_t]$$

A forward-backward algorithm is next used to calculate the probability of state occupation $L_j(t)$. If the forward probability $\alpha_j(t)$ for some model M with N states is defined as:

$$\alpha_j(t) = P(o_1, \ldots, o_t, x(t)=j|M)$$

This probability can be calculated using the recursion:

$$\alpha_j(t) = [\Sigma^{N-1}_{i=2} \alpha(t-1) a_{ij}] b_j(o_t)$$

Similarly the backward probability can be computed using the recursion:

$$\beta_j(t) = \Sigma^{N-1}_{j=2} a_{ij} b_j(o_{t+1})(t+1)$$

Realizing that the forward probability is a joint probability and the backward probability is a conditional probability, the probability of state occupation is the product of the two probabilities:

$$\alpha j(t)\beta_j(t) = P(O, x(t)=j|M)$$

Hence the probability of being in state j at a time t is:

$$L_j(t) = 1/P[\alpha_j(t)\beta_j(t)]$$

where $P = P(O|M)$

To generalize the above for continuous speech recognition, we assume the maximum likelihood state sequence where the summation is replaced by a maximum operation. Thus for a given model M, let $\phi j(t)$ represent the maximum likelihood of observing speech vectors $o_1$ to $o_t$ and being used in state j at time t:

$$\phi_j(t) = \max\{\phi j(t)(t-1)a_{ij}\}\beta_j(o_t)$$

Expressing this logarithmically to avoid underflow, this likelihood becomes:

$$\psi_j(t) = \max\{\psi_i(t-1) + \log(a_{ij})\} + \log(b_j(o_t))$$

This is also known as the Viterbi algorithm. It can be visualized as finding the best path through a matrix where the vertical dimension represents the states of the HMM and horizontal dimension represents frames of speech i.e. time. To complete the extension to connected speech recognition, it is further assumed that each HMM representing the underlying sequence is connected. Thus the training data for continuous speech recognition should consist of connected utterances; however, the boundaries between words do not have to be known.

To improve computational speed/efficiency, the Viterbi algorithm is sometimes extended to achieve convergence by using what is known as a Token Passing Model. The token passing model represents a partial match between the observation sequence $o_1$ to $o_t$ and a particular model, subject to the constraint that the model is in state j at time t. This token passing model can be extended easily to connected speech environments as well if we allow the sequence of HMMs to be defined as a finite state network. A composite network that includes both phoneme-based HMMs and complete words can be constructed so that a single-best word can be recognized to form connected speech using word N-best extraction from the lattice of possibilities. This composite form of HMM-based connected speech recognizer is the basis of the NLQS speech recognizer module. Nonetheless, the present invention is not limited as such to such specific forms of speech recognizers, and can employ other techniques for speech recognition if they are otherwise compatible with the present architecture and meet necessary performance criteria for accuracy and speed to provide a real-time dialog experience for users.

The representation of speech for the present invention's HMM-based speech recognition system assumes that speech is essentially either a quasi-periodic pulse train (for voiced speech sounds) or a random noise source (for unvoiced sounds). It may be modeled as two sources—one a impulse train generator with pitch period P and a random noise generator which is controlled by a voice/unvoiced switch. The output of the switch is then fed into a gain function estimated from the speech signal and scaled to feed a digital filter H(z) controlled by the vocal tract parameter characteristics of the speech being produced. All of the parameters for this model—the voiced/unvoiced switching, the pitch period for voiced sounds, the gain parameter for the speech signal and the coefficient of the digital filter, vary slowly with time. In extracting the acoustic parameters from the user's speech input so that it can evaluated in light of a set of HMMs, cepstral analysis is typically used to separate the vocal tract information from the excitation information. The cepstrum of a signal is computed by taking the Fourier (or similar) transform of the log spectrum. The principal advantage of extracting cepstral coefficients is that they are de-correlated and the diagonal covariances can be used with HMMs. Since the human ear resolves frequencies non-linearly across the audio spectrum, it has been shown that a front-end that operates in a similar non-linear way improves speech recognition performance.

Accordingly, instead of a typical linear prediction-based analysis, the front-end of the NLQS speech recognition engine implements a simple, fast Fourier transform based filter bank designed to give approximately equal resolution on the Mel-scale. To implement this filter bank, a window of speech data (for a particular time frame) is transformed using a software based Fourier transform and the magnitude taken. Each FFT magnitude is then multiplied by the corresponding filter gain and the results accumulated. The cepstral coefficients that are derived from this filter-bank analysis at the front end are calculated during a first partial processing phase of the speech signal by using a Discrete Cosine Transform of the log filter bank amplitudes. These cepstral coefficients are called Mel-Frequency Cepstral Coefficients (MFCC) and they represent some of the speech parameters transferred from the client side to characterize the acoustic features of the user's speech signal. These parameters are chosen for a number of reasons, including the fact that they can be quickly and consistently derived even across systems of disparate capabilities (i.e., for everything from a low power PDA to a high powered desktop system), they give good discrimination, they lend themselves to a number of useful recognition related manipulations, and they are relatively small and compact in size so that they can be transported rapidly across even a relatively narrow band link. Thus, these parameters represent the least amount of information that can be used by a subsequent server side system to adequately and quickly complete the recognition process.

To augment the speech parameters an energy term in the form of the logarithm of the signal energy is added. Accordingly, RMS energy is added to the 12 MFCC's to make 13 coefficients. These coefficients together make up the partially processed speech data transmitted in compressed form from the user's client system to the remote server side.

The performance of the present speech recognition system is enhanced significantly by computing and adding time derivatives to the basic static MFCC parameters at the server side. These two other sets of coefficients—the delta and acceleration coefficients representing change in each of the 13 values from frame to frame (actually measured across several frames), are computed during a second partial speech signal processing phase to complete the initial processing of the speech signal, and are added to the original set of coefficients after the latter are received. These MFCCs together with the delta and acceleration coefficients constitute the observation vector $O_t$ mentioned above that is used for determining the appropriate HMM for the speech data.

The delta and acceleration coefficients are computed using the following regression formula:

$$d_t = \Sigma^\theta_{\theta=1}[c_{t+\theta} - c_{t-\theta}]/2\Sigma^\theta_{\theta=1}\theta^2$$

where $d_t$ is a delta coefficient at time t computed in terms of the corresponding static coefficients:

$$d_t = [c_{t+\theta} - c_{t-\theta}]/2\theta$$

In a typical stand-alone implementation of a speech recognition system, the entire SR engine runs on a single client. In other words, both the first and second partial processing phases above are executed by the same DSP (or microprocessor) running a ROM or software code routine at the client's computing machine.

In contrast, because of several considerations, specifically—cost, technical performance, and client hardware uniformity, the present NLQS system uses a partitioned or distributed approach. While some processing occurs on the client side, the main speech recognition engine runs on a centrally located server or number of servers. More specifically, as noted earlier, capture of the speech signals, MFCC vector extraction and compression are implemented on the client's machine during a first partial processing phase. The routine is thus streamlined and simple enough to be implemented within a browser program (as a plug in module, or a downloadable applet for example) for maximum ease of use and utility. Accordingly, even very "thin" client platforms can be supported, which enables the use of the present system across a greater number of potential sites. The primary MFCCs are then transmitted to the server over the channel, which, for example, can include a dial-up INTERNET connection, a LAN connection, a wireless connection and the like. After decompression, the delta and acceleration coefficients are computed at the server to complete the initial speech processing phase, and the resulting observation vectors $O_t$ are also determined.

General Aspects of Speech Recognition Engine

The speech recognition engine is also located on the server, and is based on a HTK-based recognition network compiled from a word-level network, a dictionary and a set of HMMs. The recognition network consists of a set of nodes connected by arcs. Each node is either a HMM model instance or a word end. Each model node is itself a network consisting of states connected by arcs. Thus when fully compiled, a speech recognition network consists of HMM states connected by transitions. For an unknown input utterance with T frames, every path from the start node to the exit node of the network passes through T HMM states. Each of these paths has log probability which is computed by summing the log probability of each individual transition in the path and the log probability of each emitting state generating the corresponding observation. The function of the Viterbi decoder is find those paths through the network which have the highest log probability. This is found using the Token Passing algorithm. In a network that has many nodes, the computation time is reduced by only allowing propagation of those tokens which will have some chance of becoming winners. This process is called pruning.

Natural Language Processor

In a typical natural language interface to a database, the user enters a question in his/her natural language, for example, English. The system parses it and translates it to a query language expression. The system then uses the query language expression to process the query and if the search is successful, a recordset representing the results is displayed in English either formatted as raw text or in a graphical form. For a natural language interface to work well involves a number of technical requirements.

For example, it needs to be robust—in the sentence 'What's the departments turnover' it needs to decide that the word whats=what's=what is. And it also has to determine that departments=department's. In addition to being robust, the natural language interface has to distinguish between the several possible forms of ambiguity that may exist in the natural language—lexical, structural, reference and ellipsis ambiguity. All of these requirements, in addition to the general ability to perform basic linguistic morphological operations of tokenization, tagging and grouping, are implemented within the present invention.

Tokenization is implemented by a text analyzer which treats the text as a series of tokens or useful meaningful units that are larger than individual characters, but smaller than phrases and sentences. These include words, separable parts of words, and punctuation. Each token is associated with an offset and a length. The first phase of tokenization is the process of segmentation which extracts the individual tokens from the input text and keeps track of the offset where each token originated in the input text. The tokenizer output lists the offset and category for each token. In the next phase of the text analysis, the tagger uses a built-in morphological analyzer to look up each word/token in a phrase or sentence and internally lists all parts of speech. The output is the input string with each token tagged with a parts of speech notation. Finally the grouper which functions as a phrase extractor or phrase analyzer, determines which groups of words form phrases. These three operations which are the foundations for any modern linguistic processing schemes, are fully implemented in optimized algorithms for determining the single-best possible answer to the user's question.

SQL Database and Full-Text Query

Another key component of present system is a SQL-database. This database is used to store text, specifically the answer-question pairs are stored in full-text tables of the database. Additionally, the full-text search capability of the database allows full-text searches to be carried out.

While a large portion of all digitally stored information is in the form of unstructured data, primarily text, it is now possible to store this textual data in traditional database systems in character-based columns such as varchar and text. In order to effectively retrieve textual data from the database, techniques have to be implemented to issue queries against textual data and to retrieve the answers in a meaningful way where it provides the answers as in the case of the NLQS system.

There are two major types of textual searches: Property—This search technology first applies filters to documents in order to extract properties such as author, subject, type, word count, printed page count, and time last written, and then issues searches against those properties; Full-text—this search technology first creates indexes of all non-noise words in the documents, and then uses these indexes to support linguistic searches and proximity searches.

Two additional technologies are also implemented in this particular RDBMs: SQL Server also have been integrated: A Search service—a full-text indexing and search service that is called both index engine and search, and a parser that accepts full-text SQL extensions and maps them into a form that can be processed by the search engine.

The four major aspects involved in implementing full-text retrieval of plain-text data from a full-text-capable database are: Managing the definition of the tables and columns that are registered for full-text searches; Indexing the data in registered columns—the indexing process scans the character streams, determines the word boundaries (this is called word breaking), removes all noise words (this also is called stop words), and then populates a full-text index with the remaining words; Issuing queries against registered columns for populated full-text indexes; Ensuring that subsequent changes to the data in registered columns gets propagated to the index engine to keep the full-text indexes synchronized.

The underlying design principle for the indexing, querying, and synchronizing processes is the presence of a full-text unique key column (or single-column primary key) on all tables registered for full-text searches. The full-text index contains an entry for the non-noise words in each row together with the value of the key column for each row.

When processing a full-text search, the search engine returns to the database the key values of the rows that match the search criteria.

The full-text administration process starts by designating a table and its columns of interest for full-text search. Customized NLQS stored procedures are used first to register tables and columns as eligible for full-text search. After that, a separate request by means of a stored procedure is issued to populate the full-text indexes. The result is that the underlying index engine gets invoked and asynchronous index population begins. Full-text indexing tracks which significant words are used and where they are located. For example, a full-text index might indicate that the word "NLQS" is found at word number 423 and word number 982 in the Abstract column of the DevTools table for the row associated with a ProductID of 6. This index structure supports an efficient search for all items containing indexed words as well as advanced search operations, such as phrase searches and proximity searches. (An example of a phrase search is looking for "white elephant," where "white" is followed by "elephant". An example of a proximity search is looking for "big" and "house" where "big" occurs near "house".) To prevent the full-text index from becoming bloated, noise words such as "a," "and," and "the" are ignored.

Extensions to the Transact-SQL language are used to construct full-text queries. The two key predicates that are used in the NLQS are CONTAINS and FREETEXT.

The CONTAINS predicate is used to determine whether or not values in full-text registered columns contain certain words and phrases. Specifically, this predicate is used to search for:

A word or phrase.
The prefix of a word or phrase.
A word or phrase that is near another.
A word that is an inflectional form of another (for example, "drive" is the inflectional stem of "drives," "drove," "driving," and "driven").
A set of words or phrases, each of which is assigned a different weighting.

The relational engine within SQL Server recognizes the CONTAINS and FREETEXT predicates and performs some minimal syntax and semantic checking, such as ensuring that the column referenced in the predicate has been registered for full-text searches. During query execution, a full-text predicate and other relevant information are passed to the full-text search component. After further syntax and semantic validation, the search engine is invoked and returns the set of unique key values identifying those rows in the table that satisfy the full-text search condition. In addition to the FREETEXT and CONTAINS, other predicates such as AND, LIKE, NEAR are combined to create the customized NLQS SQL construct.

Full-Text Query Architecture of the SQL Database

The full-text query architecture is comprised of the following several components—Full-Text Query component, the SQL Server Relational Engine, the Full-Text provider and the Search Engine.

The Full-Text Query component of the SQL database accept a full-text predicate or rowset-valued function from the SQL Server; transform parts of the predicate into an internal format, and sends it to Search Service, which returns the matches in a rowset. The rowset is then sent back to SQL Server. SQL Server uses this information to create the resultset that is then returned to the submitter of the query.

The SQL Server Relational Engine accepts the CONTAINS and FREETEXT predicates as well as the CONTAINSTABLE( ) and FREETEXTTABLE( ) rowset-valued functions. During parse time, this code checks for conditions such as attempting to query a column that has not been registered for full-text search. If valid, then at run time, the ft_search_condition and context information is sent to the full-text provider. Eventually, the full-text provider returns a rowset to SQL Server, which is used in any joins (specified or implied) in the original query. The Full-Text Provider parses and validates the ft_search_condition, constructs the appropriate internal representation of the full-text search condition, and then passes it to the search engine. The result is returned to the relational engine by means of a rowset of rows that satisfy ft_search_condition.

Client Side System 150

Figure 2B:
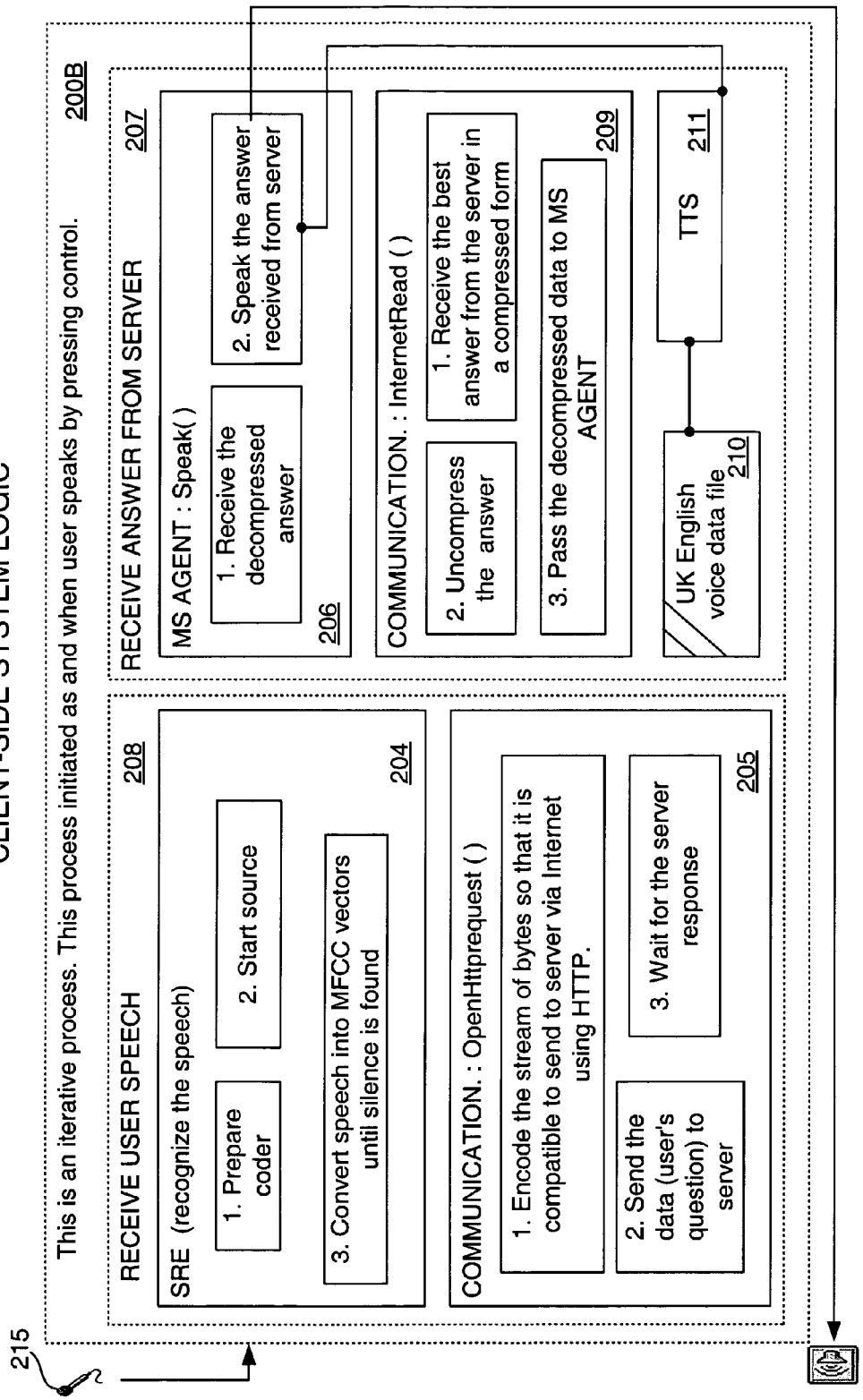
Figure 2C:
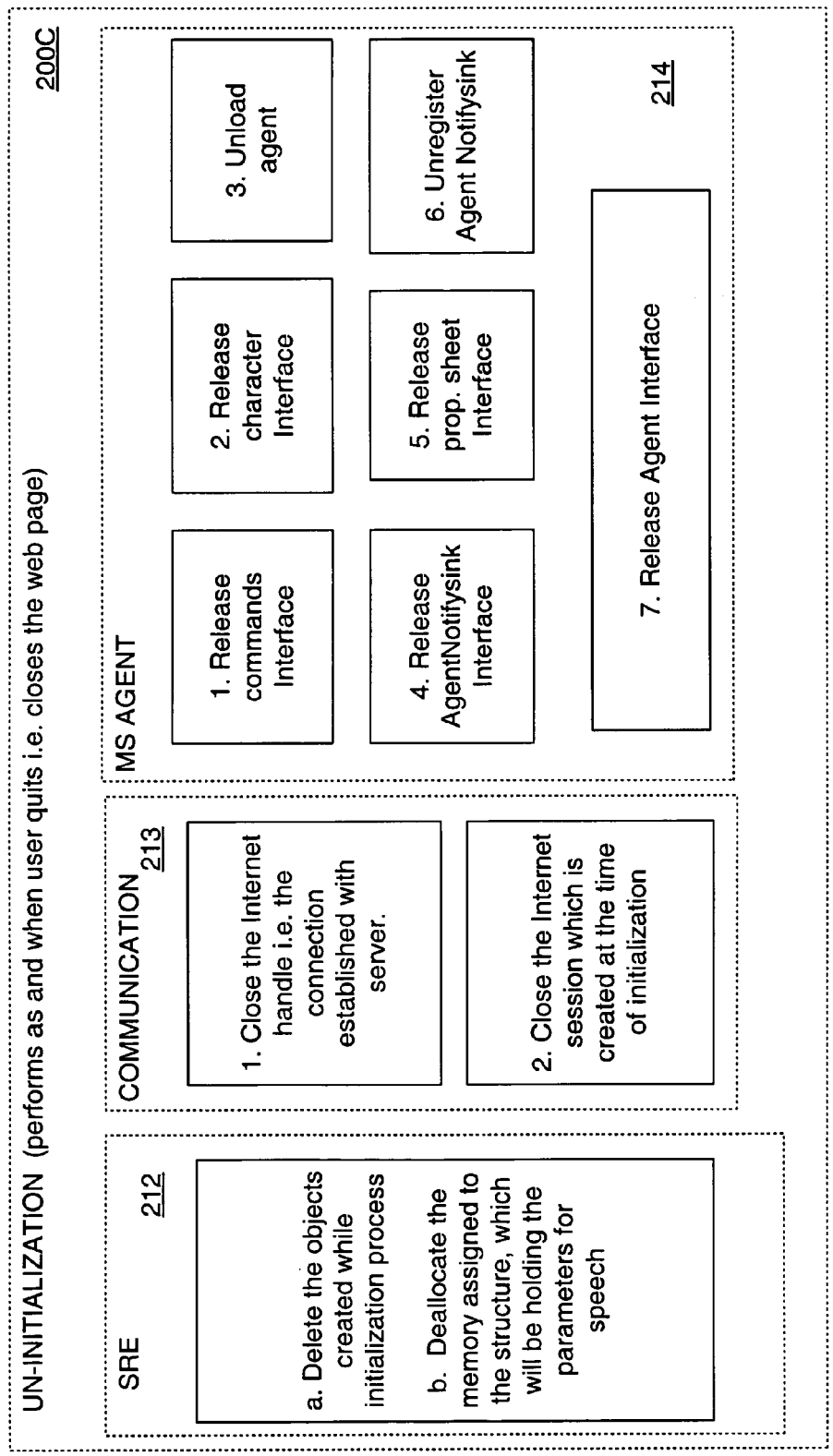

The architecture of client-side system 150 of Natural Language Query System 100 is illustrated in greater detail in FIGS. 2A-2C. Referring to FIG. 2A, the three main processes effectuated by Client System 150 are illustrated as follows: Initialization process 200A consisting of SRE 201, Communication 202 and Microsoft (MS) Agent 203 routines; at FIG. 2B an iterative process 200B consisting of two sub-routines: a) Receive User Speech 208—made up of SRE 204 and Communication 205; and b) Receive Answer from Server 207—made up of MS Speak Agent 206, Communication 209, Voice data file 210 and Text to Speech Engine 211. Finally, in FIG. 2C un-initialization process 200C is made up of three sub-routines: SRE 212, Communication 213, and MS Agent 214. Each of the above three processes are described in detail in the following paragraphs. It will be appreciated by those skilled in the art that the particular implementation for such processes and routines will vary from client platform to platform, so that in some environments such processes may be embodied in hard-coded routines executed by a dedicated DSP, while in others they may be embodied as software routines executed by a shared host processor, and in still others a combination of the two may be used.

Initialization at Client System 150

Figure 2D:
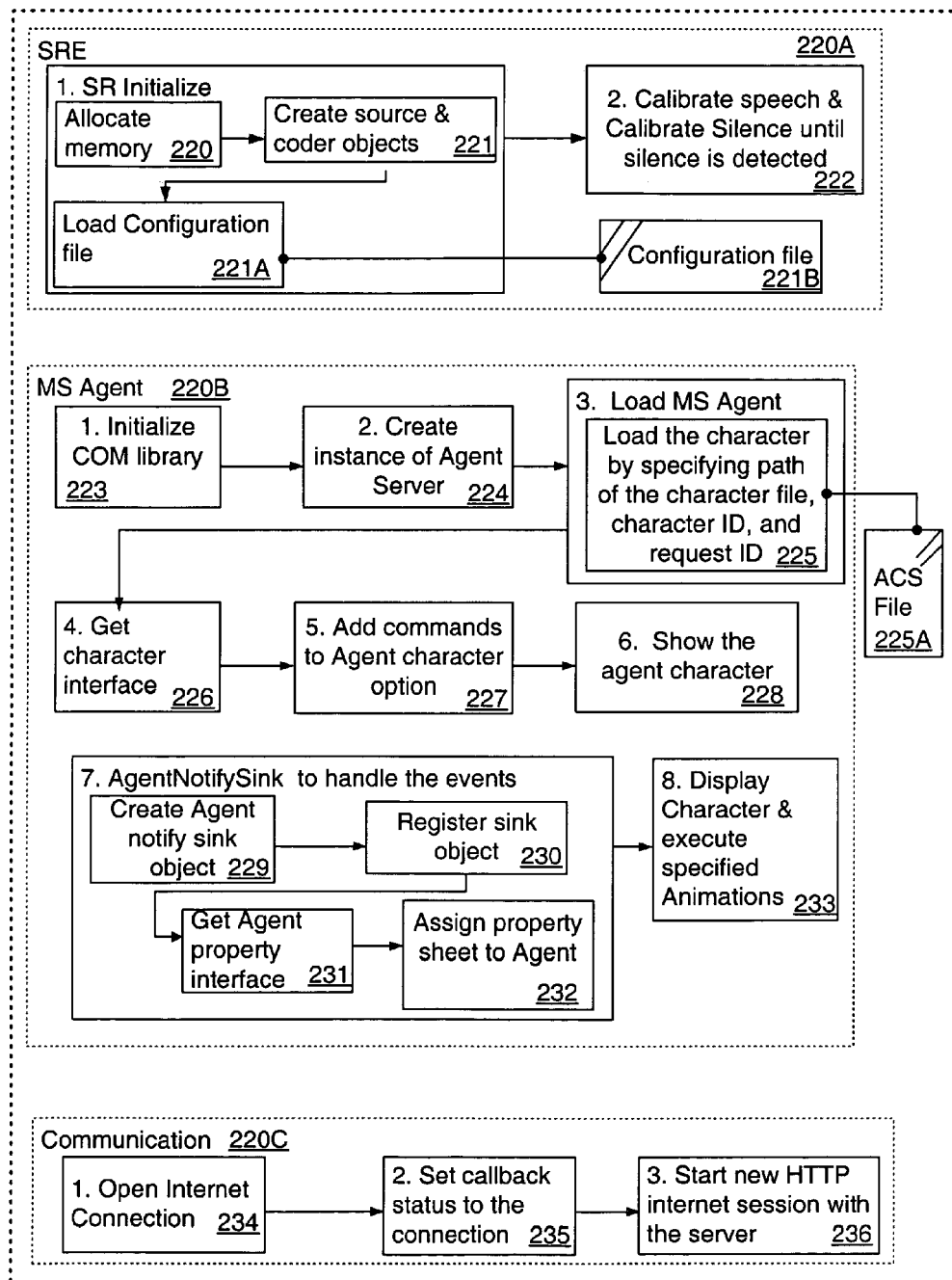
FIG. 2D is a block diagram of a preferred embodiment of a set of initialization routines and procedures used for the client side system of FIG. 2A-2C.

The initialization of the Client System 150 is illustrated in FIG. 2D and is comprised generally of 3 separate initializing processes: client-side Speech Recognition Engine 220A, MS Agent 220B and Communication processes 220C.

Initialization of Speech Recognition Engine 220A

Speech Recognition Engine 155 is initialized and configured using the routines shown in 220A. First, an SRE COM Library is initialized. Next, memory 220 is allocated to hold Source and Coder objects, are created by a routine 221. Loading of configuration file 221A from configuration data file 221B also takes place at the same time that the SRE Library is initialized. In configuration file 221B, the type of the input of Coder and the type of the output of the Coder are declared. The structure, operation, etc. of such routines are well-known in the art, and they can be implemented using a number of fairly straightforward approaches. Accordingly, they are not discussed in detail herein. Next, Speech and Silence components of an utterance are calibrated using a routine 222, in a procedure that is also well-known in the art. To calibrate the speech and silence components, the user preferably articulates a sentence that is displayed in a text box on the screen. The SRE library then estimates the noise and other parameters required to find e silence and speech elements of future user utterances.

Initialization of MS Agent 220B

The software code used to initialize and set up a MS Agent 220B is also illustrated in FIG. 2D. The MS Agent 220B routine is responsible for coordinating and handling the actions of the animated agent 157 (FIG. 1). This initialization thus consists of the following steps:

1. Initialize COM library 223. This part of the code initializes the COM library, which is required to use ActiveX Controls, which controls are well-known in the art.
2. Create instance of Agent Server 224—this part of the code creates an instance of Agent ActiveX control.
3. Loading of MS Agent 225—this part of the code loads MS Agent character from a specified file 225A containing general parameter data for the Agent Character, such as the overall appearance, shape, size, etc.
4. Get Character Interface 226—this part of the code gets an appropriate interface for the specified character; for example, characters may have different control/interaction capabilities that can be presented to the user.
5. Add Commands to Agent Character Option 227—this part of the code adds commands to an Agent Properties sheet, which sheet can be accessed by clicking on the icon that appears in the system tray, when the Agent character is loaded e.g., that the character can Speak, how he/she moves, TTS Properties, etc.
6. Show the Agent Character 228—this part of the code displays the Agent character on the screen so it can be seen by the user;
7. AgentNotifySink—to handle events. This part of the code creates AgentNotifySink object 229, registers it at 230 and then gets the Agent Properties interface 231. The property sheet for the Agent character is assigned using routine 232.
8. Do Character Animations 233—This part of the code plays specified character animations to welcome the user to NLQS 100.

The above then constitutes the entire sequence required to initialize the MS Agent. As with the SRE routines, the MS Agent routines can be implemented in any suitable and conventional fashion by those skilled in the art based on the present teachings. The particular structure, operation, etc. of such routines is not critical, and thus they are not discussed in detail herein.

In a preferred embodiment, the MS Agent is configured to have an appearance and capabilities that are appropriate for the particular application. For instance, in a remote learning application, the agent has the visual form and mannerisms/ attitude/gestures of a college professor. Other visual props (blackboard, textbook, etc.) may be used by the agent and presented to the user to bring to mind the experience of being in an actual educational environment. The characteristics of the agent may be configured at the client side 150, and/or as part of code executed by a browser program (not shown) in response to configuration data and commands from a particular web page. For example, a particular website offering medical services may prefer to use a visual image of a doctor. These and many other variations will be apparent to those skilled in the art for enhancing the human-like, real-time dialog experience for users.

Initialization of Communication Link 160A

The initialization of Communication Link 160A is shown with reference to process 220C FIG. 2D. Referring to FIG. 2D, this initialization consists of the following code components: Open INTERNET Connection 234—this part of the code opens an INTERNET Connection and sets the parameter for the connection. Then Set Callback Status routine 235 sets the callback status so as to inform the user of the status of connection. Finally Start New HTTP INTERNET Session 236 starts a new INTERNET session. The details of Communications Link 160 and the set up process 220C are not critical, and will vary from platform to platform. Again, in some cases, users may use a low-speed dial-up connection, a dedicated high speed switched connection (T1 for example), an always-on xDSL connection, a wireless connection, and the like.

Iterative Processing of Queries/Answers

As illustrated in FIG. 3, once initialization is complete, an iterative query/answer process is launched when the user presses the Start Button to initiate a query. Referring to FIG. 3, the iterative query/answer process consists of two main sub-processes implemented as routines on the client side system 150: Receive User Speech 240 and Receive User Answer 243. The Receive User Speech 240 routine receives speech from the user (or another audio input source), while the Receive User Answer 243 routine receives an answer to the user's question in the form of text from the server so that it can be converted to speech for the user by text-to-speech engine 159. As used herein, the term "query" is referred to in the broadest sense to refer, to either a question, a command, or some form of input used as a control variable by the system. For example, a query may consist of a question directed to a particular topic, such as "what is a network" in the context of a remote learning application. In an e-commerce application a query might consist of a command to "list all books by Mark Twain" for example. Similarly, while the answer in a remote learning application consists of text that is rendered into audible form by the text to speech engine 159, it could also be returned as another form of multi-media information, such as a graphic image, a sound file, a video file, etc. depending on the requirements of the particular application. Again, given the present teachings concerning the necessary structure, operation, functions, performance, etc., of the client-side Receive User Speech 240 and Receiver User Answer 243 routines, one of ordinary skill in the art could implement such in a variety of ways.

Receive User Speech—As illustrated in FIG. 3, the Receive User Speech routine 240 consists of a SRE 241 and a Communication 242 process, both implemented again as routines on the client side system 150 for receiving and partially processing the user's utterance. SRE routine 241 uses a coder 248 which is prepared so that a coder object receives speech data from a source object. Next the Start Source 249 routine is initiated. This part of the code initiates data retrieval using the source Object which will in turn be given to the Coder object. Next, MFCC vectors 250 are extracted from the Speech utterance continuously until silence is detected. As alluded to earlier, this represents the first phase of processing of the input speech signal, and in a preferred embodiment, it is intentionally restricted to merely computing the MFCC vectors for the reasons already expressed above. These vectors include the 12 cepstral coefficients and the RMS energy term, for a total of 13 separate numerical values for the partially processed speech signal.

In some environments, nonetheless, it is conceivable that the MFCC delta parameters and MFCC acceleration parameters can also be computed at client side system 150, depending on the computation resources available, the transmission bandwidth in data link 160A available to server side system 180, the speed of a transceiver used for carrying data in the data link, etc. These parameters can be determined automatically by client side system upon initializing SRE 155 (using some type of calibration routine to measure resources), or by direct user control, so that the partitioning of signal processing responsibilities can be optimized on a case-by-case basis. In some applications, too, server side system 180 may lack the appropriate resources or routines for completing the processing of the speech input signal. Therefore, for some applications, the allocation of signal processing responsibilities may be partitioned differently, to the point where in fact both phases of the speech signal processing may take place at client side system 150 so that the speech signal is completely—rather than partially—processed and transmitted for conversion into a query at server side system 180.

Again in a preferred embodiment, to ensure reasonable accuracy and real-time performance from a query/response perspective, sufficient resources are made available in a client side system so that 100 frames per second of speech data can be partially processed and transmitted through link 160A. Since the least amount of information that is necessary to complete the speech recognition process (only 13 coefficients) is sent, the system achieves a real-time performance that is believed to be highly optimized, because other latencies (i.e., client-side computational latencies, packet formation latencies, transmission latencies) are minimized. It will be apparent that the principles of the present invention can be extended to other SR applications where some other methodology is used for breaking down the speech input signal by an SRE (i.e., non-MFCC based). The only criteria is that the SR processing be similarly dividable into multiple phases, and with the responsibility for different phases being handled on opposite sides of link 160A depending on overall system performance goals, requirements and the like. This functionality of the present invention can thus be achieved on a system-by-system basis, with an expected and typical amount of optimization being necessary for each particular implementation.

Thus, the present invention achieves a response rate performance that is tailored in accordance with the amount of information that is computed, coded and transmitted by the client side system 150. So in applications where real-time performance is most critical, the least possible amount of extracted speech data is transmitted to reduce these latencies, and, in other applications, the amount of extracted speech data that is processed, coded and transmitted can be varied.

Communication—transmit communication module 242 is used to implement the transport of data from the client to the server over the data link 160A, which in a preferred embodiment is the INTERNET. As explained above, the data consists of encoded MFCC vectors that will be used at then server-side of the Speech Recognition engine to complete the speech recognition decoding. The sequence of the communication is as follows:

OpenHTTPRequest 251—this part of the code first converts MFCC vectors to a stream of bytes, and then processes the bytes so that it is compatible with a protocol known as HTTP. This protocol is well-known in the art, and it is apparent that for other data links another suitable protocol would be used.
  1. Encode MFCC Byte Stream 251—this part of the code encodes the MFCC vectors, so that they can be sent to the server via HTTP.
  2. Send data 252—this part of the code sends MFCC vectors to the server using the INTERNET connection and the HTTP protocol.

Wait for the Server Response 253—this part of the code monitors the data link 160A a response from server side system 180 arrives. In summary, the MFCC parameters are extracted or observed on-the-fly from the input speech signal. They are then encoded to a HTTP byte stream and sent in a streaming fashion to the server before the silence is detected—i.e. sent to server side system 180 before the utterance is complete. This aspect of the invention also facilitates a real-time behavior, since data can be transmitted and processed even while the user is still speaking.

Receive Answer from Server 243 is comprised of the following modules as shown in FIG. 3. MS Agent 244, Text-to-Speech Engine 245 and receive communication modules 246. All three modules interact to receive the answer from server side system 180. As illustrated in FIG. 3, the receive communication process consists of three separate processes implemented as a receive routine on client side system 150: a Receive the Best Answer 258 receives the best answer over data link 160B (the HTTP communication channel). The answer is de-compressed at 259 and then the answer is passed by code 260 to the MS Agent 244, where it is received by code portion 254. A routine 255 then articulates the answer using text-to-speech engine 257. Of course, the text can also be displayed for additional feedback purposes on a monitor used with client side system 150. The text to speech engine uses a natural language voice data file 256 associated with it that is appropriate for the particular language application (i.e., English, French, German, Japanese, etc.). As explained earlier when the answer is something more than text, it can be treated as desired to provide responsive information to the user, such as with a graphics image, a sound, a video clip, etc.

Uninitialization

Figure 4:
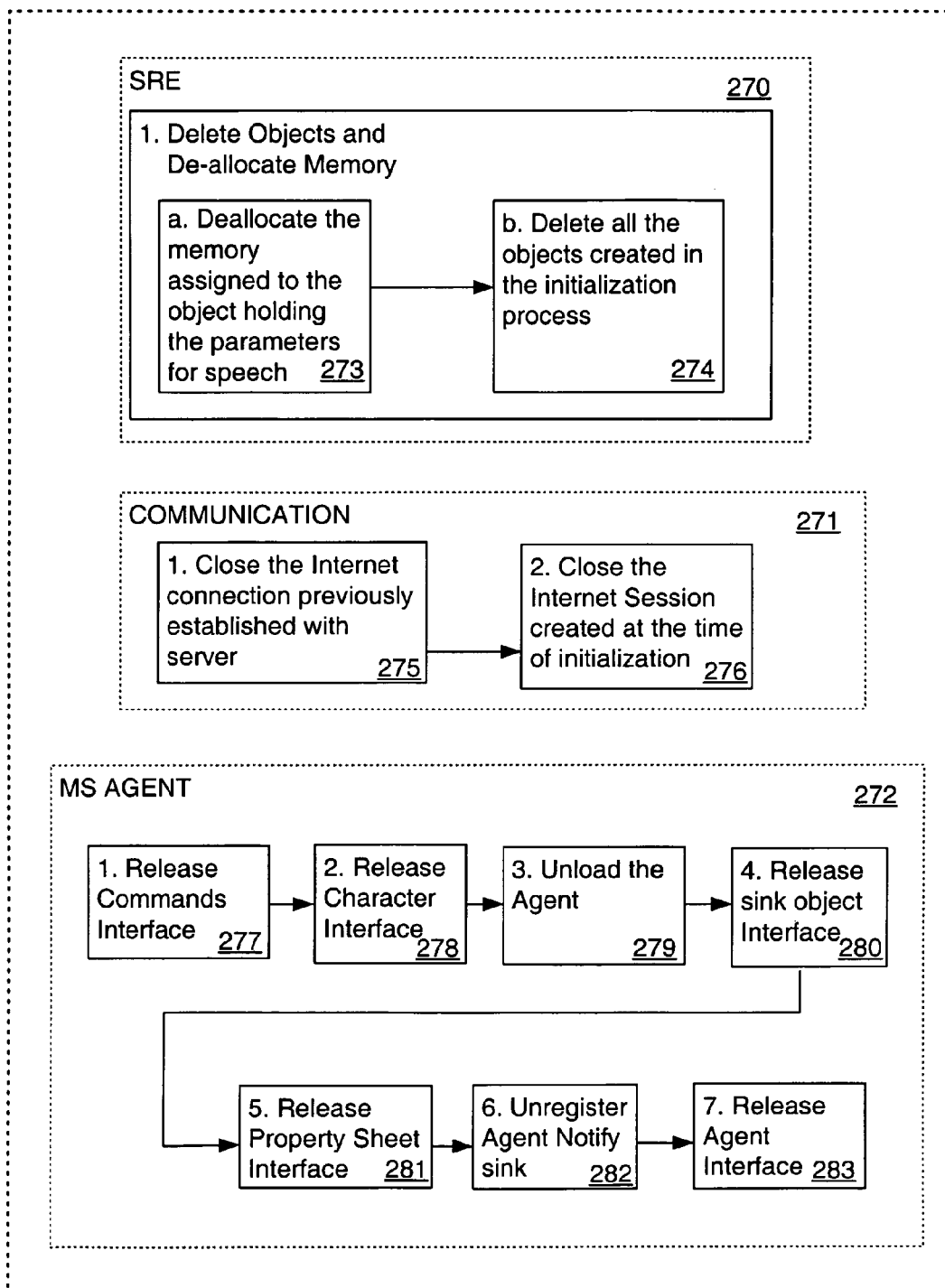
FIG. 4 is a block diagram of a preferred embodiment of a set of initialization routines and procedures used for un-initializing the client side system of FIGS. 2A-2C.

The un-initialization routines and processes are illustrated in FIG. 4. Three functional modules are used for un-initializing the primary components of the client side system 150; these include SRE 270, Communications 271 and MS Agent 272 un-initializing routines. To un-initialize SRE 220A, memory that was allocated in the initialization phase is de-allocated by code 273 and objects created during such initialization phase are deleted by code 274. Similarly, as illustrated in FIG. 4, to un-initialize Communications module 220C the INTERNET connection previously established with the server is closed by code portion 275 of the Communication Un-initialization routine 271. Next the INTERNET session created at the time of initialization is also closed by routine 276. For the un-initialization of the MS Agent 220B, as illustrated in FIG. 4, MS Agent Un-initialization routine 272 first releases the Commands Interface 227 using routine 277. This releases the commands added to the property sheet during loading of the agent character by routine 225. Next the Character Interface initialized by routine 226 is released by routine 278 and the Agent is unloaded at 279. The Sink Object Interface is then also released 280 followed by the release of the Property Sheet Interface 281. The Agent Notify Sink 282 then un-registers the Agent and finally the Agent Interface 283 is released which releases all the resources allocated during initialization steps identified in FIG. 2D.

It will be appreciated by those skilled in the art that the particular implementation for such un-initialization processes and routines in FIG. 4 will vary from client platform to client platform, as for the other routines discussed above. The structure, operation, etc. of such routines are well-known in the art, and they can be implemented using a number of fairly straightforward approaches without undue effort. Accordingly, they are not discussed in detail herein.

Description of Server Side System 180

Introduction

Figure 11A:
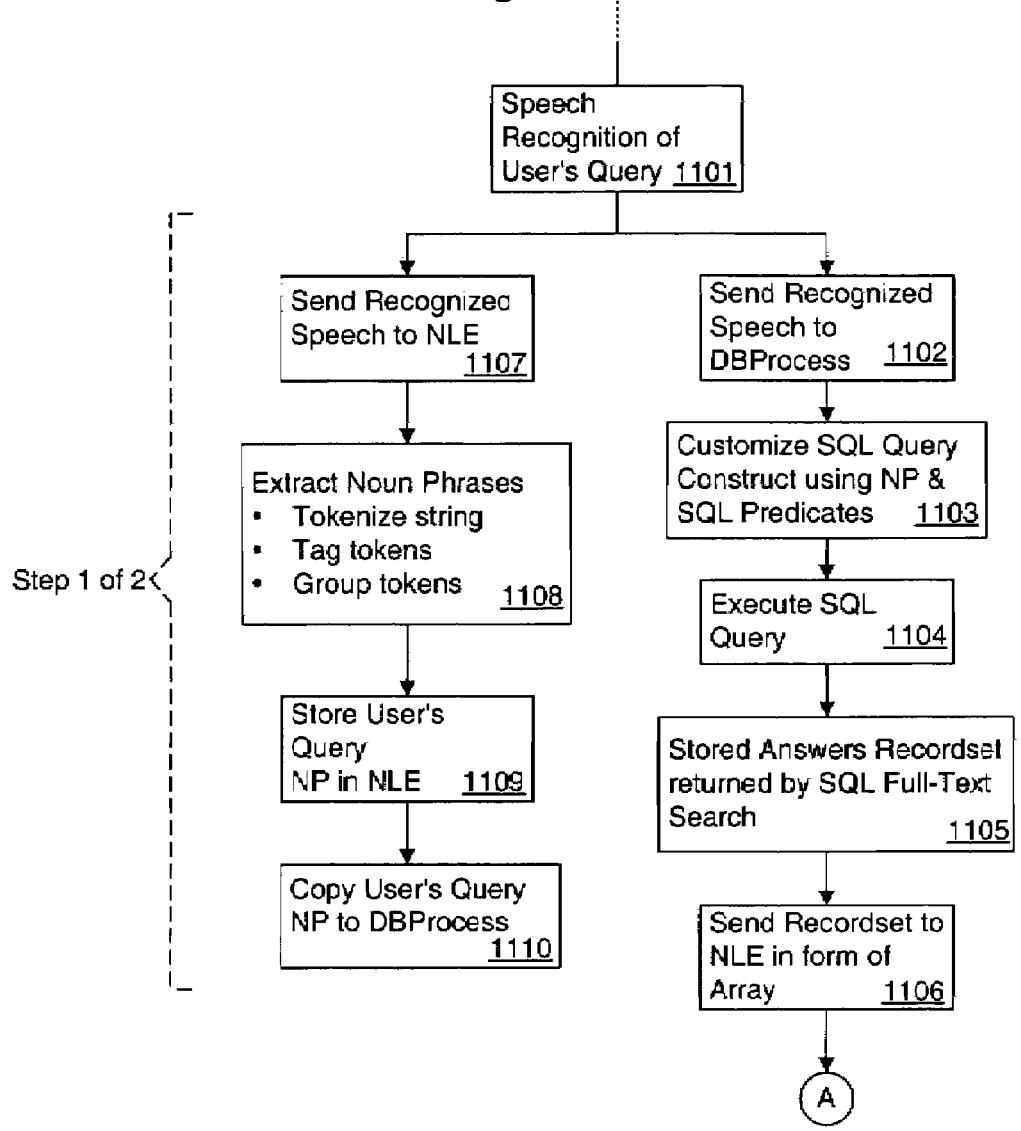
Figure 11C:
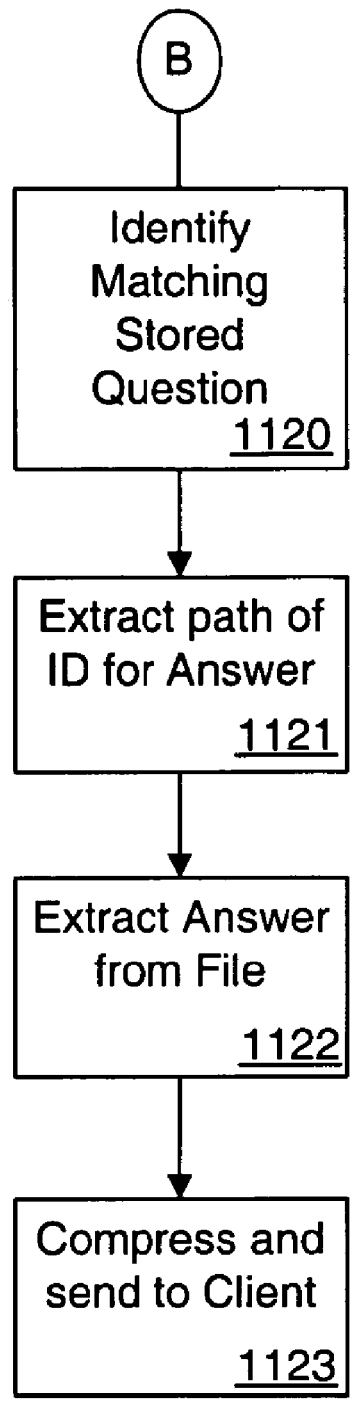

A high level flow diagram of the set of preferred processes implemented on server side system 180 of Natural Language Query System 100 is illustrated in FIG. 11A through FIG. 11C. In a preferred embodiment, this process consists of a two step algorithm for completing the processing of the speech input signal, recognizing the meaning of the user's query, and retrieving an appropriate answer/response for such query.

The $1^{st}$ step as illustrated in FIG. 11A can be considered a high-speed first-cut pruning mechanism, and includes the following operations: after completing processing of the speech input signal, the user's query is recognized at step 1101, so that the text of the query is simultaneously sent to Natural Language Engine 190 (FIG. 1) at step 1107, and to DB Engine 186 (also FIG. 1) at step 1102. By "recognized" in this context it is meant that the user's query is converted into a text string of distinct native language words through the HMM technique discussed earlier.

At NLE 190, the text string undergoes morphological linguistic processing at step 1108: the string is tokenized the tags are tagged and the tagged tokens are grouped Next the noun phrases (NP) of the string are stored at 1109, and also copied and transferred for use by DB Engine 186 during a DB Process at step 1110. As illustrated in FIG. 11A, the string corresponding to the user's query which was sent to the DB Engine 186 at 1102, is used together with the NP received from NLE 190 to construct an SQL Query at step 1103. Next, the SQL query is executed at step 1104, and a record set of potential questions corresponding to the user's query are received as a result of a full-text search at 1105, which are then sent back to NLE 190 in the form of an array at step 1106.

As can be seen from the above, this first step on the server side processing acts as an efficient and fast pruning mechanism so that the universe of potential "hits" corresponding to the user's actual query is narrowed down very quickly to a manageable set of likely candidates in a very short period of time.

Referring to FIG. 11B, in contrast to the first step above, the $2^{nd}$ step can be considered as the more precise selection portion of the recognition process. It begins with linguistic processing of each of the stored questions in the array returned by the full-text search process as possible candidates representing the user's query. Processing of these stored questions continues in NLE 190 as follows: each question in the array of questions corresponding to the record set returned by the SQL full-text search undergoes morphological linguistic processing at step 1111: in this operation, a text string corresponding to the retrieved candidate question is tokenized, the tags are tagged and the tagged tokens are grouped. Next, noun phrases of the string are computed and stored at step 1112. This process continues iteratively at point 1113, and the sequence of steps at 1118,1111, 1112, 1113 are repeated so that an NP for each retrieved candidate question is computed and stored. Once an NP is computed for each of the retrieved candidate questions of the array, a comparison is made between each such retrieved candidate question and the user's query based on the magnitude of the NP value at step 1114. This process is also iterative in that steps 1114, 1115, 1116, 1119 are repeated so that the comparison of the NP for each retrieved candidate question with that of the NP of the user's query is completed. When there are no more stored questions in the array to be processed at step 1117, the stored question that has the maximum NP relative to the user's query, is identified at 1117A as the stored question which best matches the user's query.

Notably, it can be seen that the second step of the recognition process is much more computationally intensive than the first step above, because several text strings are tokenized, and a comparison is made of several NPs. This would not be practical, nonetheless, if it were not for the fact that the first step has already quickly and efficiently reduced the candidates to be evaluated to a significant degree. Thus, this more computationally intensive aspect of the present invention is extremely valuable, however because it yields extremely high accuracy in the overall query recognition process. In this regard, therefore, this second step of the query recognition helps to ensure the overall accuracy of the system, while the first step helps to maintain a satisfactory speed that provides a real-time feel for the user.

As illustrated in FIG. 11C, the last part of the query/response process occurs by providing an appropriate matching answer/response to the user. Thus, an identity of a matching stored question is completed at step 1120. Next a file path corresponding to an answer of the identified matching question is extracted at step 1121. Processing continues so that the answer is extracted from the file path at 1122 and finally the answer is compressed and sent to client side system 150 at step 1123.

The discussion above is intended to convey a general overview of the primary components, operations, functions and characteristics of those portions of NLQS system 100 that reside on server side system 180. The discussion that follows describes in more detail the respective sub-systems.

Software Modules Used in Server Side System 180

Figure 5:
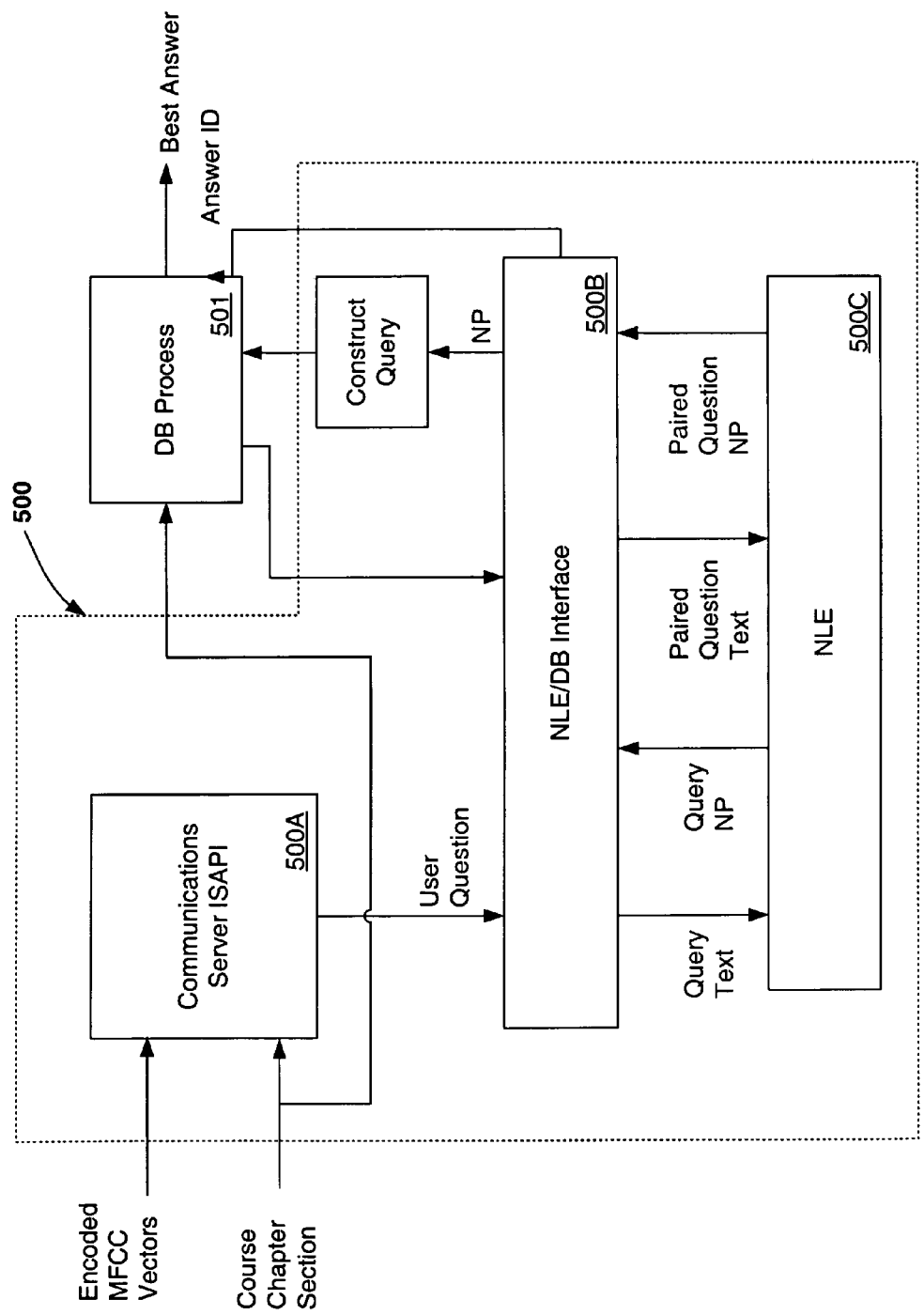
FIG. 5 is a block diagram of a preferred embodiment of a server side system, including a speech recognition module to complete processing of the speech utterances, environmental and grammar control modules, query formulation modules, a natural language engine, a database control module, and a query response module that can be used in the aforementioned NLQS.

The key software modules used on server-side system 180 of the NLQS system are illustrated in FIG. 5. These include generally the following components: a Communication module 500—identified as CommunicationServer ISAPI 500A (which is executed by SRE Server-side 182—FIG. 1 and is explained in more detail below), and a database process DBProcess module 501 (executed by DB Engine 186—FIG. 1). Natural language engine module 500C (executed by NLE 190—FIG. 1) and an interface 500B between the NLE process module 500C and the DBProcess module 500B. As shown here, CommunicationServerISAPI 500A includes a server-side speech recognition engine and appropriate communication interfaces required between client side system 150 and server side system 180. As further illustrated in FIG. 5, server-side logic of Natural Language Query System 100 also can be characterized as including two dynamic link library components: CommunicationServerISAPI 500 and DBProcess 501. The CommunicationServerIASPI 500 is comprised of 3 sub-modules: Server-side Speech Recognition Engine module 500A; Interface module 500B between the Natural Language Engine modules 500C and DBProcess 501; and the Natural Language Engine modules 500C.

DB Process 501 is a module whose primary function is to connect to a SQL database and to execute an SQL query that is composed in response to the user's query. In addition, this module interfaces with logic that fetches the correct answer from a file path once this answer is passed to it from the Natural Language Engine module 500C.

Speech Recognition Sub-System 182 on Server-Side System 180

Figure 4A:
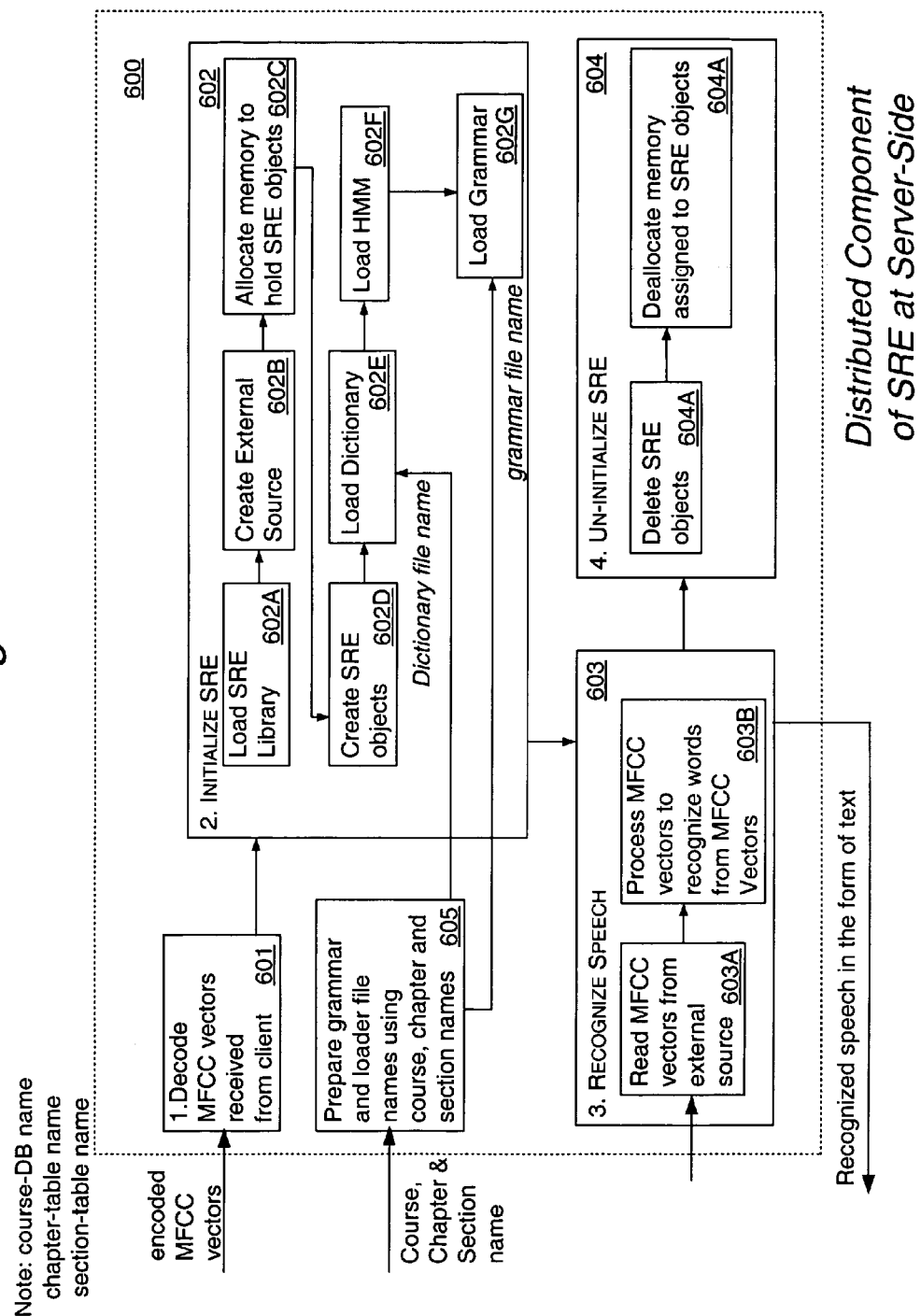
FIG. 4A is a block diagram of a preferred embodiment of a set of routines and procedures used for implementing a distributed component of a speech recognition module for the server side system of FIG. 5.

The server side speech recognition engine module 500A is a set of distributed components that perform the necessary functions and operations of speech recognition engine 182 (FIG. 1) at server-side 180. These components can be implemented as software routines that are executed by server side 180 in conventional fashion. Referring to FIG. 4A, a more detailed break out of the operation of the speech recognition components 600 at the server-side can be seen as follows:

Within a portion 601 of the server side SRE module 500A, the binary MFCC vector byte stream corresponding to the speech signal's acoustic features extracted at client side system 150 and sent over the communication channel 160 is received. The MFCC acoustic vectors are decoded from the encoded HTTP byte stream as follows: Since the MFCC vectors contain embedded NULL characters, they cannot be transferred in this form to server side system 180 as such using HTTP protocol. Thus the MFCC vectors are first encoded at client-side 150 before transmission in such a way that all the speech data is converted into a stream of bytes without embedded NULL characters in the data. At the very end of the byte stream a single NULL character is introduced to indicate the termination of the stream of bytes to be transferred to the server over the INTERNET 160A using HTTP protocol.

As explained earlier, to conserve latency time between the client and server, a smaller number of bytes (just the 13 MFCC coefficients) are sent from client side system 150 to server side system 180. This is done automatically for each platform to ensure uniformity, or can be tailored by the particular application environment—i.e., such as where it is determined that it will take less time to compute the delta and acceleration coefficients at the server (26 more calculations), than it would take to encode them at the client, transmit them, and then decode them from the HTTP stream. In general, since server side system 180 is usually better equipped to calculate the MFCC delta and acceleration parameters, this is a preferable choice. Furthermore, there is generally more control over server resources compared to the client's resources, which means that future upgrades, optimizations, etc., can be disseminated and shared by all to make overall system performance more reliable and predictable. So, the present invention can accommodate even the worst-case scenario where the client's machine may be quite thin and may just have enough resources to capture the speech input data and do minimal processing.

Dictionary Preparation & Grammar Files

Referring to FIG. 4A, within code block 605, various options selected by the user (or gleaned from the user's status within a particular application) are received. For instance, in the case of a preferred remote learning system, Course, Chapter and/or Section data items are communicated. In the case of other applications (such as e-commerce) other data options are communicated, such as the Product Class, Product Category, Product Brand, etc. loaded for viewing within his/her browser. These selected options are based on the context experienced by the user during an interactive process, and thus help to limit and define the scope—i.e. grammars and dictionaries that will be dynamically loaded to speech recognition engine 182 (FIG. 1) for Viterbi decoding during processing of the user speech utterance. For speech recognition to be optimized both grammar and dictionary files are used in a preferred embodiment. A Grammar file supplies the universe of available user queries; i.e., all the possible words that are to be recognized. The Dictionary file provides phonemes (the information of how a word is pronounced—this depends on the specific native language files that are installed—for example, UK English or US English) of each word contained in the grammar file. It is apparent that if all the sentences for a given environment that can be recognized were contained in a single grammar file then recognition accuracy would be deteriorated and the loading time alone for such grammar and dictionary files would impair the speed of the speech recognition process.

To avoid these problems, specific grammars are dynamically loaded or actively configured as the current grammar according to the user's context, i.e., as in the case of a remote learning system, the Course, Chapter and/or Section selected. Thus the grammar and dictionary files are loaded dynamically according to the given Course, Chapter and/or Section as dictated by the user, or as determined automatically by an application program executed by the user.

The second code block 602 implements the initialization of Speech Recognition engine 182 (FIG. 1). The MFCC vectors received from client side system 150 along with the grammar filename and the dictionary file names are introduced to this block to initialize the speech decoder.

As illustrated in FIG. 4A, the initialization process 602 uses the following sub-routines: A routine 602*a* for loading an SRE library. This then allows the creation of an object identified as External Source with code 602*b* using the received MFCC vectors. Code 602*c* allocates memory to hold the recognition objects. Routine 602*d* then also creates and initializes objects that are required for the recognition such as: Source, Coder, Recognizer and Results Loading of the Dictionary created by code 602*e*, Hidden Markov Models (HMMs) generated with code 602*f*; and Loading of the Grammar file generated by routine 602*g*.

Speech Recognition 603 is the next routine invoked as illustrated in FIG. 4A, and is generally responsible for completing the processing of the user speech signals input on the client side 150, which, as mentioned above, are preferably only partially processed (i.e., only MFCC vectors are computed during the first phase) when they are transmitted across link 160. Using the functions created in External Source by subroutine 602*b*, this code reads MFCC vectors, one at a time from an External Source 603*a*, and processes them in block 603*b* to realize the words in the speech pattern that are symbolized by the MFCC vectors captured at the client. During this second phase, an additional 13 delta coefficients and an additional 13 acceleration coefficients are computed as part of the recognition process to obtain a total of 39 observation vectors $O_t$ referred to earlier. Then, using a set of previously defined Hidden Markov Models (HMMs), the words corresponding to the user's speech utterance are determined in the manner described earlier. This completes the word "recognition" aspect of the query processing, which results are used further below to complete the query processing operations.

It will be appreciated by those skilled in the art that the distributed nature and rapid performance of the word recognition process, by itself, is extremely useful and may be implemented in connection with other environments that do not implicate or require additional query processing operations. For example, some applications may simply use individual recognized words for filling in data items on a computer generated form, and the aforementioned systems and processes can provide a rapid, reliable mechanism for doing so.

Once the user's speech is recognized, the flow of SRE 182 passes to Un-initialize SRE routine 604 where the speech engine is un-initialized as illustrated. In this block all the objects created in the initialization block are deleted by routine 604*a*, and memory allocated in the initialization block during the initialization phase are removed by routine 604*b*.

Again, it should be emphasized that the above are merely illustrative of embodiments for implementing the particular routines used on a server side speech recognition system of the present invention. Other variations of the same that achieve the desired functionality and objectives of the present invention will be apparent from the present teachings.

Database Processor 186 Operation—DBProcess

Construction of an SQL Query used as part of the user query processing is illustrated in FIG. 4B, a SELECT SQL statement is preferably constructed using a conventional CONTAINS predicate. Module 950 constructs the SQL query based on this SELECT SQL statement, which query is used for retrieving the best suitable question stored in the database corresponding to the user's articulated query, (designated as Question here). A routine 951 then concatenates a table name with the constructed SELECT statement. Next, the number of words present in each Noun Phrase of Question asked by the user is calculated by routine 952. Then memory is allocated by routine 953 as needed to accommodate all the words present in the NP. Next a word List (identifying all the distinct words present in the NP) is obtained by routine 954. After this, this set of distinct words are concatenated by routine 955 to the SQL Query separated with a NEAR ( ) keyword. Next, the AND keyword is concatenated to the SQL Query by routine 956 after each NP. Finally memory resources are freed by code 957 so as to allocate memory to store the words received from NP for any next iteration. Thus, at the end of this process, a completed SQL Query corresponding to the user's articulated question is generated.

Figure 4C:
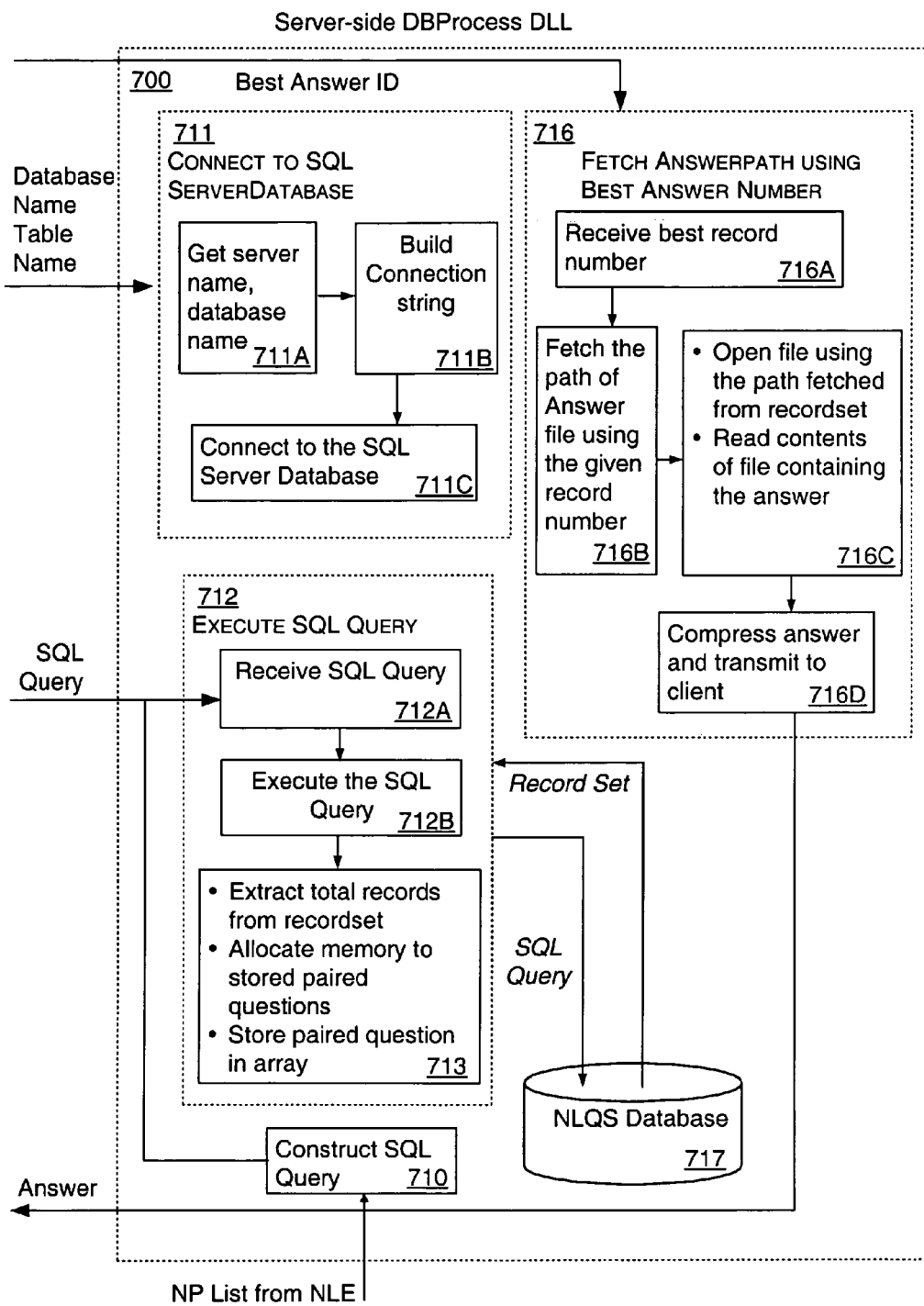
FIG. 4C is a block diagram of a preferred embodiment of a set of routines and procedures used for implementing a database control process module for the server side system of FIG. 5.

Connection to SQL Server—As illustrated in FIG. 4C, after the SQL Query is constructed by routine 710, a routine 711 implements a connection to the query database 717 to continue processing of the user query. The connection sequence and the subsequent retrieved record set is implemented using routines 700 which include the following:

1. Server and database names are assigned by routine 711A to a DBProcess member variable
2. A connection string is established by routine 711B;
3. The SQL Server database is connected under control of code 711C
4. The SQL Query is received by routine 712A
5. The SQL Query is executed by code 712B
6. Extract the total number of records retrieved by the query—713
7. Allocate the memory to store the total number of paired questions—713
8. Store the entire number of paired questions into an array—713

Once the Best Answer ID is received at 716 FIG. 4C, from the NLE 14 (FIG. 5), the code corresponding 716C receives it passes it to code in 716B where the path of the Answer file is determined using the record number. Then the file is opened 716C using the path passed to it and the contents of the file corresponding to the answer is read. Then the answer is compressed by code in 716D and prepared for transmission over the communication channel 160B (FIG. 1).

NLQS Database 188—Table Organization

Figure 6:
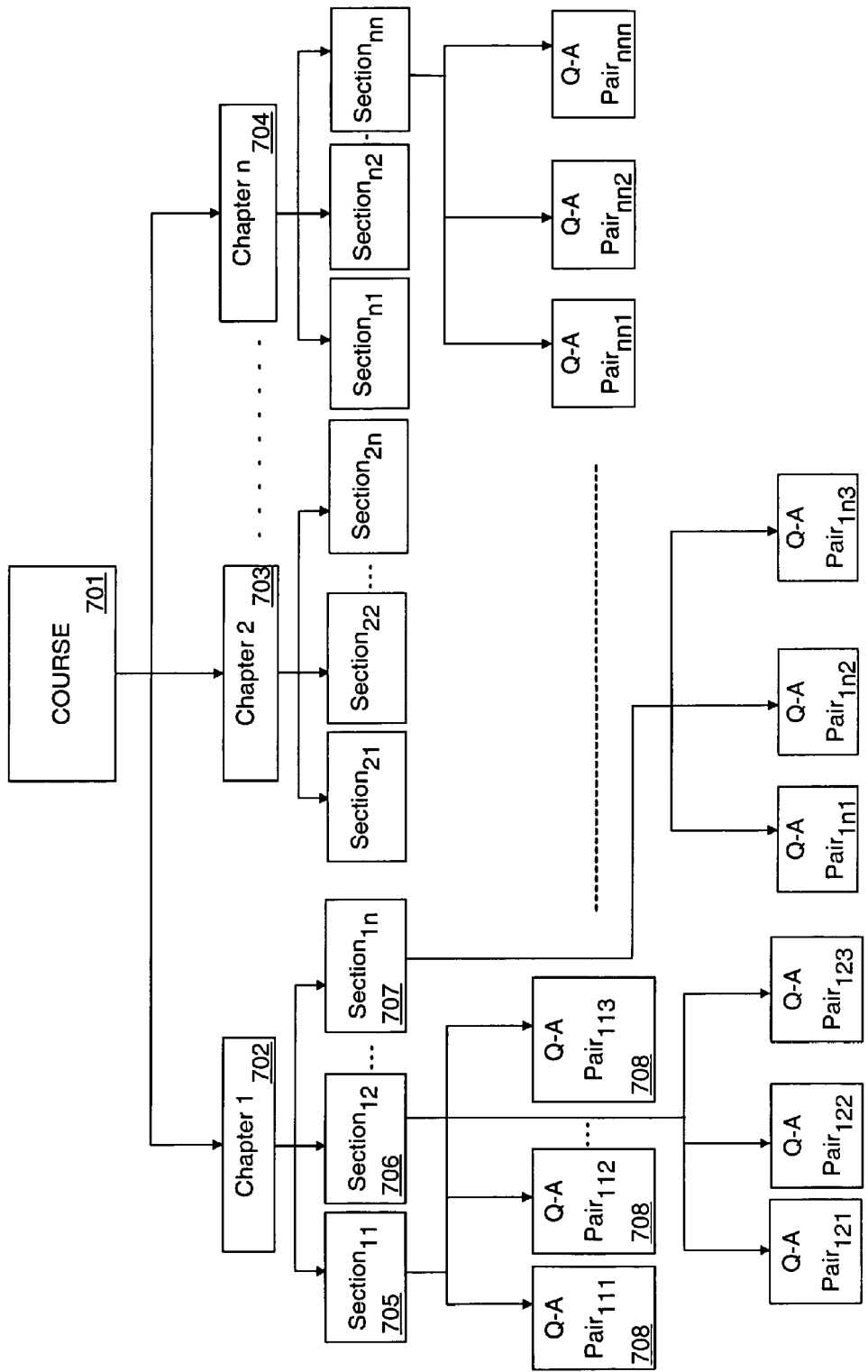
FIG. 6 illustrates the organization of a full-text database used as part of server side system shown in FIG. 5.

FIG. 6 illustrates a preferred embodiment of a logical structure of tables used in a typical NLQS database 188 (FIG. 1). When NLQS database 188 is used as part of NLQS query system 100 implemented as a remote learning/training environment, this database will include an organizational multi-level hierarchy that consists typically of a Course 701, which is made of several chapters 702, 703, 704. Each of these chapters can have one or more Sections 705, 706, 707 as shown for Chapter 1. A similar structure can exist for Chapter 2, Chapter 3 . . . Chapter N. Each section has a set of one or more question-answer pairs 708 stored in tables described in more detail below. While this is an appropriate and preferable arrangement for a training/learning application, it is apparent that other implementations would be possible and perhaps more suitable for other applications such as e-commerce, e-support, INTERNET browsing, etc., depending on overall system parameters.

It can be seen that the NLQS database 188 organization is intricately linked to the switched grammar architecture described earlier. In other words, the context (or environment) experienced by the user can be determined at any moment in time based at the selection made at the section level, so that only a limited subset of question-answer pairs 708 for example are appropriate for section 705. This in turn means that only a particular appropriate grammar for such question-answer pairs may be switched in for handling user queries while the user is experiencing such context. In a similar fashion, an e-commerce application for an INTERNET based business may consist of a hierarchy that includes a first level "home" page 701 identifying user selectable options (product types, services, contact information, etc.), a second level may include one or more "product types" pages 702, 703, 704, a third page may include particular product models 705, 706, 707, etc., and with appropriate question-answer pairs 708 and grammars customized for handling queries for such product models. Again, the particular implementation will vary from application to application, depending on the needs and desires of such business, and a typical amount of routine optimization will be necessary for each such application.

Table Organization

In a preferred embodiment, an independent database is used for each Course. Each database in turn can include three types of tables as follows: a Master Table as illustrated in FIG. 7A, at least one Chapter Table as illustrated in FIG. 7B and at least one Section Table as illustrated in FIG. 7C.

As illustrated in FIG. 7A, a preferred embodiment of a Master Table has six columns—Field Name 701A, Data Type 702A, Size 703A, Null 704A, Primary Key 705A and Indexed 706A. These parameters are well-known in the art of database design and structure. The Master Table has only two fields—Chapter Name 707A and Section Name 708A. Both Chapter-Name and Section Name are commonly indexed.

A preferred embodiment of a Chapter Table is illustrated in FIG. 7B. As with the Master Table, the Chapter Table has six (6) columns—Field Name 720, Data Type 721, Size 722, Null 723, Primary Key 724 and Indexed 725. There are nine (9) rows of data however, in this case,—Chapter_ID 726, Answer_ID 727, Section Name 728, Answer_Title 729, PairedQuestion 730, AnswerPath 731, Creator 732, Date of Creation 733 and Date of Modification 734.

An explanation of the Chapter Table fields is provided in FIG. 7C. Each of the eight (8) Fields 720 has a description 735 and stores data corresponding to:

AnswerID 727—an integer that is automatically incremented for each answer given for user convenience Section_Name 728—the name of the section to which the particular record belongs. This field along with the AnswerID is used as the primary key Answer_Title 729—A short description of the title of the answer to the user query PairedQuestion 730—Contains one or more combinations of questions for the related answers whose path is stored in the next column AnswerPath AnswerPath 731—contains the path of a file, which contains the answer to the related questions stored in the previous column; in the case of a pure question/answer application, this file is a text file, but, as mentioned above, could be a multi-media file of any kind transportable over the data link 160

Creator 732—Name of Content Creator

Date_of_Creation 733—Date on which content was created

Date of Modification 734—Date on which content was changed or modified

A preferred embodiment of a Section Table is illustrated in FIG. 7D. The Section Table has six (6) columns—Field Name 740, Data Type 741, Size 742, Null 743, Primary Key 744 and Indexed 745. There are seven (7) rows of data—Answer_ID 746, Answer_Title 747, PairedQuestion 748, AnswerPath 749, Creator 750, Date of Creation 751 and Date of Modification 752. These names correspond to the same fields, columns already described above for the Master Table and Chapter Table.

Again, this is a preferred approach for the specific type of learning/training application described herein. Since the number of potential applications for the present invention is quite large, and each application can be customized, it is expected that other applications (including other learning/training applications) will require and/or be better accommodated by another table, column, and field structure/hierarchy.

Figure 10:
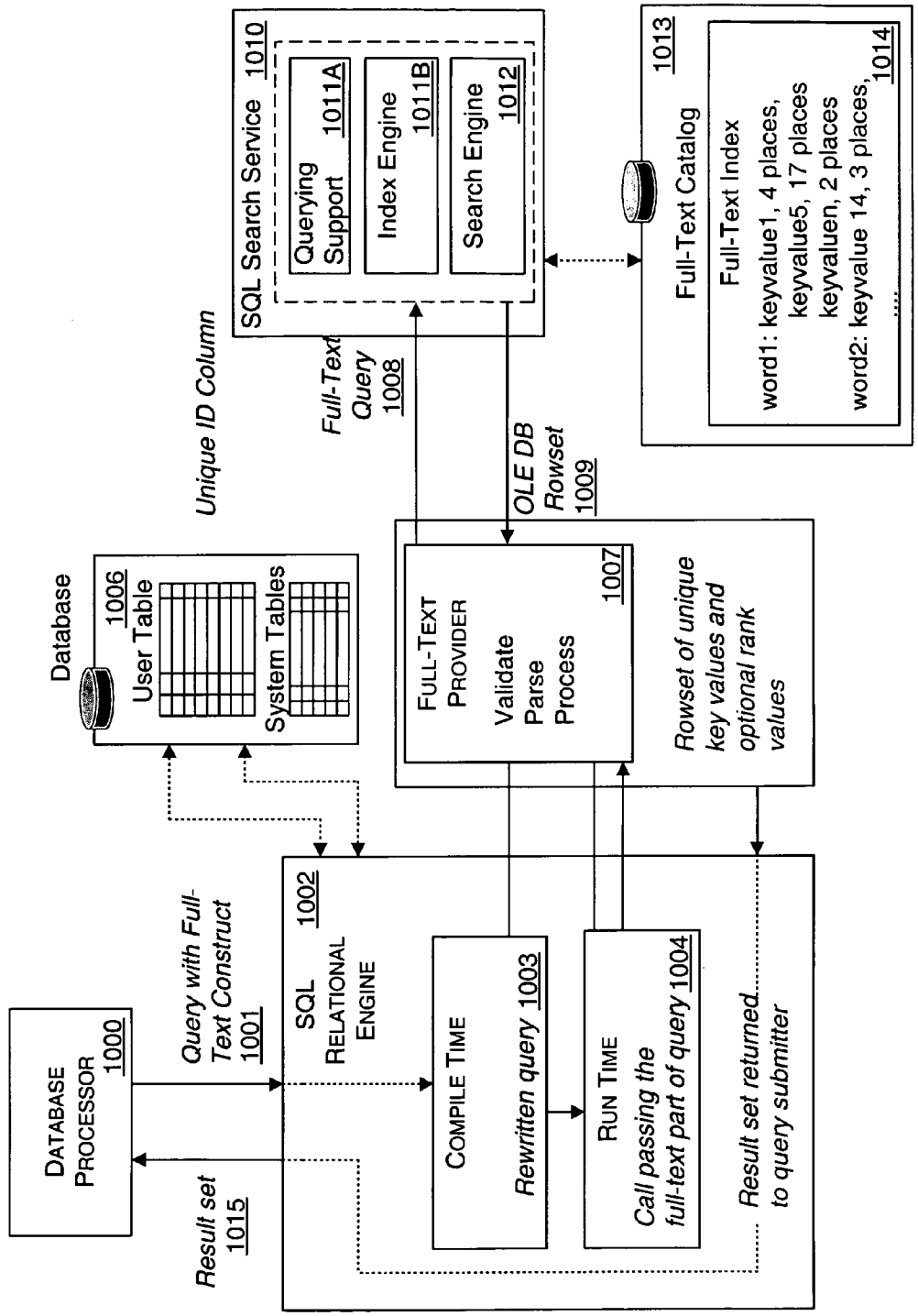
FIG. 10 is a block diagram of a preferred embodiment of a SQL database search and support system for the present invention.

Search Service and Search Engine—A query text search service is performed by an SQL Search System 1000 shown in FIG. 10. This system provides querying support to process full-text searches. This is where full-text indexes reside.

In general, SQL Search System determines which entries in a database index meet selection criteria specified by a particular text query that is constructed in accordance with an articulated user speech utterance. The Index Engine 1011B is the entity that populates the Full-Text Index tables with indexes which correspond to the indexable units of text for the stored questions and corresponding answers. It scans through character strings, determines word boundaries, removes all noise words and then populates the full-text index with the remaining words. For each entry in the full text database that meets the selection criteria, a unique key column value and a ranking value are returned as well. Catalog set 1013 is a file-system directory that is accessible only by an Administrator and Search Service 1010. Full-text indexes 1014 are organized into full-text catalogs, which are referenced by easy to handle names. Typically, full-text index data for an entire database is placed into a single full-text catalog.

The schema for the full-text database as described (FIG. 7, FIG. 7A, FIG. 7B, FIG. 7C, FIG. 7D) is stored in the tables 1006 shown in FIG. 10. Take for example, the tables required to describe the structure the stored question/answer pairs required for a particular course. For each table—Course Table, Chapter Table, Section Table, there are fields—column information that define each parameters that make up the logical structure of the table. This information is stored in User and System tables 1006. The key values corresponding to those tables are stored as Full-Text catalogs 1013. So when processing a full-text search, the search engine returns to the SQL Server the key values of the rows that match the search criteria. The relational engine then uses this information to respond to the query.

As illustrated in FIG. 10, a Full-Text Query Process is implemented as follows:

1. A query 1001 that uses a SQL full-text construct generated by DB processor 186 is submitted to SQL Relational Engine 1002.
2. Queries containing either a CONTAINS or FREETEXT predicate are rewritten by routine 1003 so that a responsive rowset returned later from Full-Text Provider 1007 will be automatically joined to the table that the predicate is acting upon. This rewrite is a mechanism used to ensure that these predicates are a seamless extension to a traditional SQL Server. After the compiled query is internally rewritten and checked for correctness in item 1003, the query is passed to RUN TIME module 1004. The function of module 1004 is to convert the rewritten SQL construct to a validated run-time process before it is sent to the Full-Text Provider, 1007.
3. After this, Full-Text Provider 1007 is invoked, passing the following information for the query:
   a. A ft_search_condition parameter (this is a logical flag indicating a full text search condition)
   b. A name of a full-text catalog where a full-text index of a table resides
   c. A locale ID to be used for language (for example, word breaking)
   d. Identities of a database, table, and column to be used in the query
   e. If the query is comprised of more than one full-text construct; when this is the case Full-text provider 1007 is invoked separately for each construct.
4. SQL Relational Engine 1002 does not examine the contents of ft_search_condition. Instead, this information is passed along to Full-text provider 1007, which verifies the validity of the query and then creates an appropriate internal representation of the full-text search condition.
5. The query request/command 1008 is then passed to Querying Support 1011A.
6. Querying Support 1012 returns a rowset 1009 from Full-Text Catalog 1013 that contains unique key column values for any rows that match the full-text search criteria. A rank value also is returned for each row.
7. The rowset of key column values 1009 is passed to SQL Relational Engine 1002. If processing of the query implicates either a CONTAINSTABLE( ) or FREETEXTTABLE( ) function, RANK values are returned; otherwise, any rank value is filtered out.
8. The rowset values 1009 are plugged into the initial query with values obtained from relational database 1006, and a result set 1015 is then returned for further processing to yield a response to the user.

At this stage of the query recognition process, the speech utterance by the user has already been rapidly converted into a carefully crafted text query, and this text query has been initially processed so that an initial matching set of results can be further evaluated for a final determination of the appropriate matching question/answer pair. The underlying principle that makes this possible is the presence of a full-text unique key column for each table that is registered for full-text searches. Thus when processing a full-text search, SQL Search Service 1010 returns to SQL server 1002 the key values of the rows that match the database. In maintaining these full-text databases 1013 and full text indexes 1014, the present invention has the unique characteristic that the full-text indices 1014 are not updated instantly when the full-text registered columns are updated. This operation is eliminated, again, to reduce recognition latency, increase response speed, etc. Thus, as compared to other database architectures, this updating of the full-text index tables, which would otherwise take a significant time, is instead done asynchronously at a more convenient time.

Interface Between NLE 190 and DB Processor 188

Figure 4D:
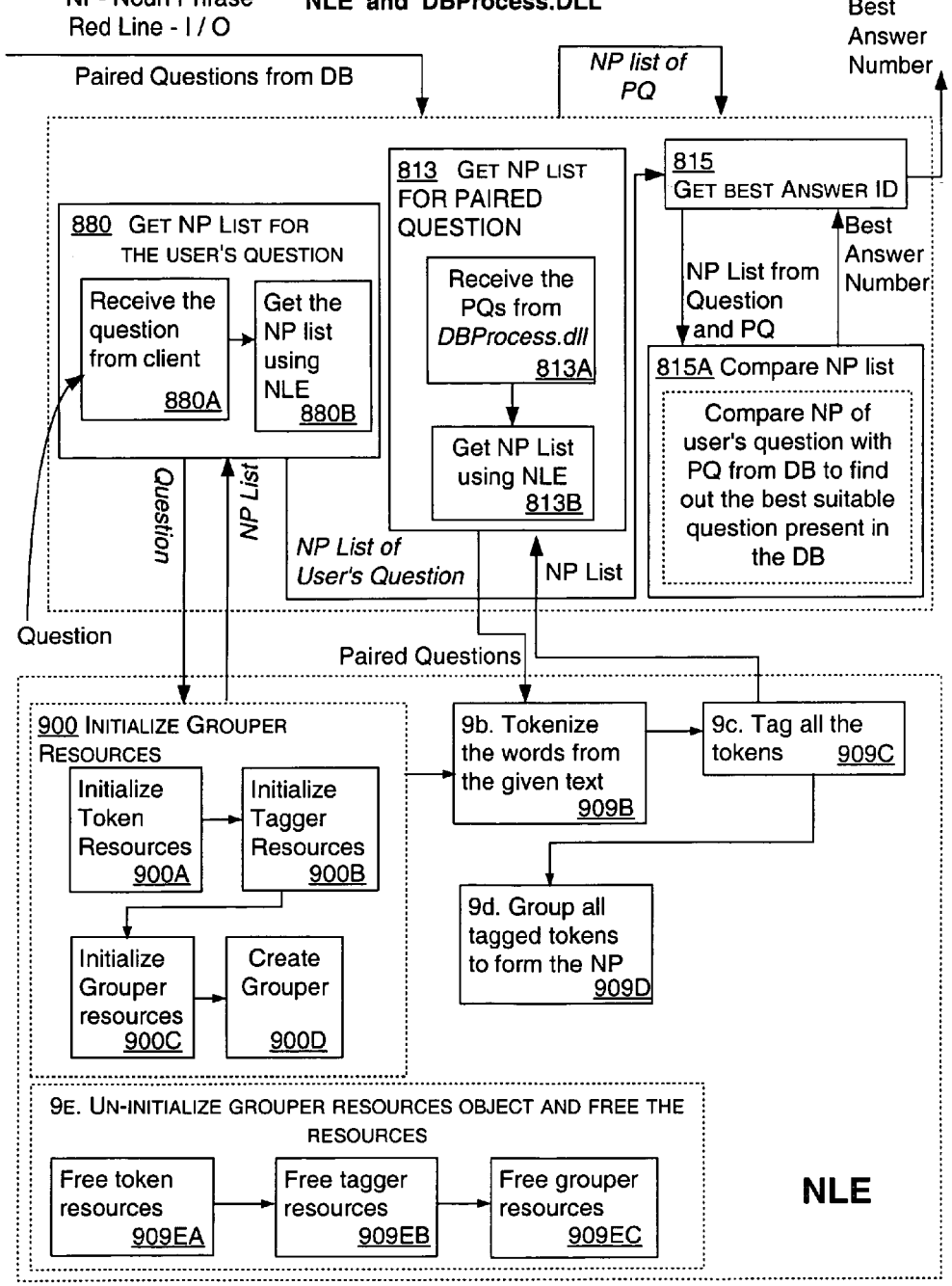
FIG. 4D is a block diagram of a preferred embodiment of a set of routines and procedures used for implementing a natural language engine that provides query formulation support, a query response module, and an interface to the database control process module for the server side system of FIG. 5.

The result set 1015 of candidate questions corresponding to the user query utterance are presented to NLE 190 for further processing as shown in FIG. 4D to determine a "best" matching question/answer pair. An NLE/DBProcessor interface module coordinates the handling of user queries, analysis of noun-phrases (NPs) of retrieved questions sets from the SQL query based on the user query, comparing the retrieved question NPs with the user query NP, etc. between NLE 190 and DB Processor 188. So, this part of the server side code contains functions, which interface processes resident in both NLE block 190 and DB Processor block 188. The functions are illustrated in FIG. 4D; As seen here, code routine 880 implements functions to extract the Noun Phrase (NP) list from the user's question. This part of the code interacts with NLE 190 and gets the list of Noun Phrases in a sentence articulated by the user. Similarly, Routine 813 retrieves an NP list from the list of corresponding candidate/paired questions 1015 and stores these questions into an (ranked by NP value) array. Thus, at this point, NP data has been generated for the user query, as well as for the candidate questions 1015. As an example of determining the noun phrases of a sentence such as: "What issues have guided the President in considering the impact of foreign trade policy on American businesses?" NLE 190 would return the following as noun phrases: President, issues, impact of foreign trade policy, American businesses, impact, impact of foreign trade, foreign trade, foreign trade policy, trade, trade policy, policy, businesses. The methodology used by NLE 190 will thus be apparent to those skilled in the art from this set of noun phrases and noun sub-phrases generated in response to the example query.

Next, a function identified as Get Best Answer ID 815 is implemented. This part of the code gets a best answer ID corresponding to the user's query. To do this, routines 813A, 813B first find out the number of Noun phrases for each entry in the retrieved set 1015 that match with the Noun phrases in the user's query. Then routine 815a selects a final result record from the candidate retrieved set 1015 that contains the maximum number of matching Noun phrases.

Conventionally, nouns are commonly thought of as "naming" words, and specifically as the names of "people, places, or things". Nouns such as John, London, and computer certainly fit this description, but the types of words classified by the present invention as nouns is much broader than this. Nouns can also denote abstract and intangible concepts such as birth, happiness, evolution, technology, management, imagination, revenge, politics, hope, cookery, sport, and literacy. Because of the enormous diversity of nouns compared to other parts of speech, the Applicant has found that it is much more relevant to consider the noun phrase as a key linguistic metric. So, the great variety of items classified as nouns by the present invention helps to discriminate and identify individual speech utterances much easier and faster than prior techniques disclosed in the art.

Following this same thought, the present invention also adopts and implements another linguistic entity—the word phrase—to facilitate speech query recognition. The basic structure of a word phrase—whether it be a noun phrase, verb phrase, adjective phrase—is three parts—[pre-Head string], [Head] and [post-Head string]. For example, in the minimal noun phrase—"the children," "children" is classified as the Head of the noun phrase. In summary, because of the diversity and frequency of noun phrases, the choice of noun phrase as the metric by which stored answer is linguistically chosen, has a solid justification in applying this technique to the English natural language as well as other natural languages. So, in sum, the total noun phrases in a speech utterance taken together operate extremely well as unique type of speech query fingerprint.

The ID corresponding to the best answer corresponding to the selected final result record question is then generated by routine 815 which then returns it to DB Process shown in FIG. 4C. As seen there, a Best Answer ID I is received by routine 716A, and used by a routine 716B to retrieve an answer file path. Routine 716C then opens and reads the answer file, and communicates the substance of the same to routine 716D. The latter then compresses the answer file data, and sends it over data link 160 to client side system 150 for processing as noted earlier (i.e., to be rendered into audible feedback, visual text/graphics, etc.). Again, in the context of a learning/instructional application, the answer file may consist solely of a single text phrase, but in other applications the substance and format will be tailored to a specific question in an appropriate fashion. For instance, an "answer" may consist of a list of multiple entries corresponding to a list of responsive category items (i.e., a list of books to a particular author) etc. Other variations will be apparent depending on the particular environment.

Natural Language Engine 190

Again referring to FIG. 4D, the general structure of NL engine 190 is depicted. This engine implements the word analysis or morphological analysis of words that make up the user's query, as well as phrase analysis of phrases extracted from the query.

Figure 8:
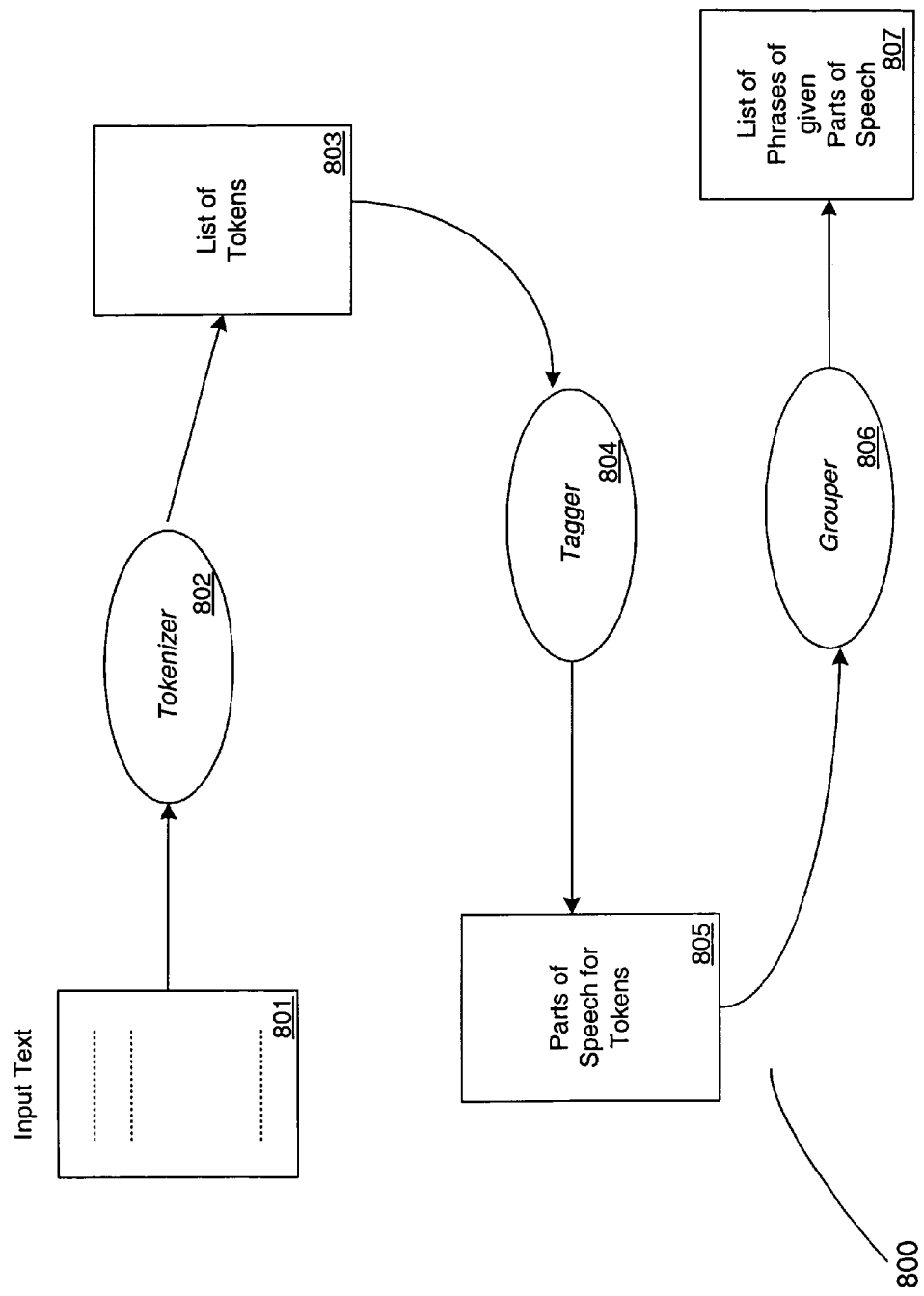
FIG. 8 is a flow diagram of a first set of operations performed by a preferred embodiment of a natural language engine on a speech utterance including Tokenization, Tagging and Grouping.
Figure 9:
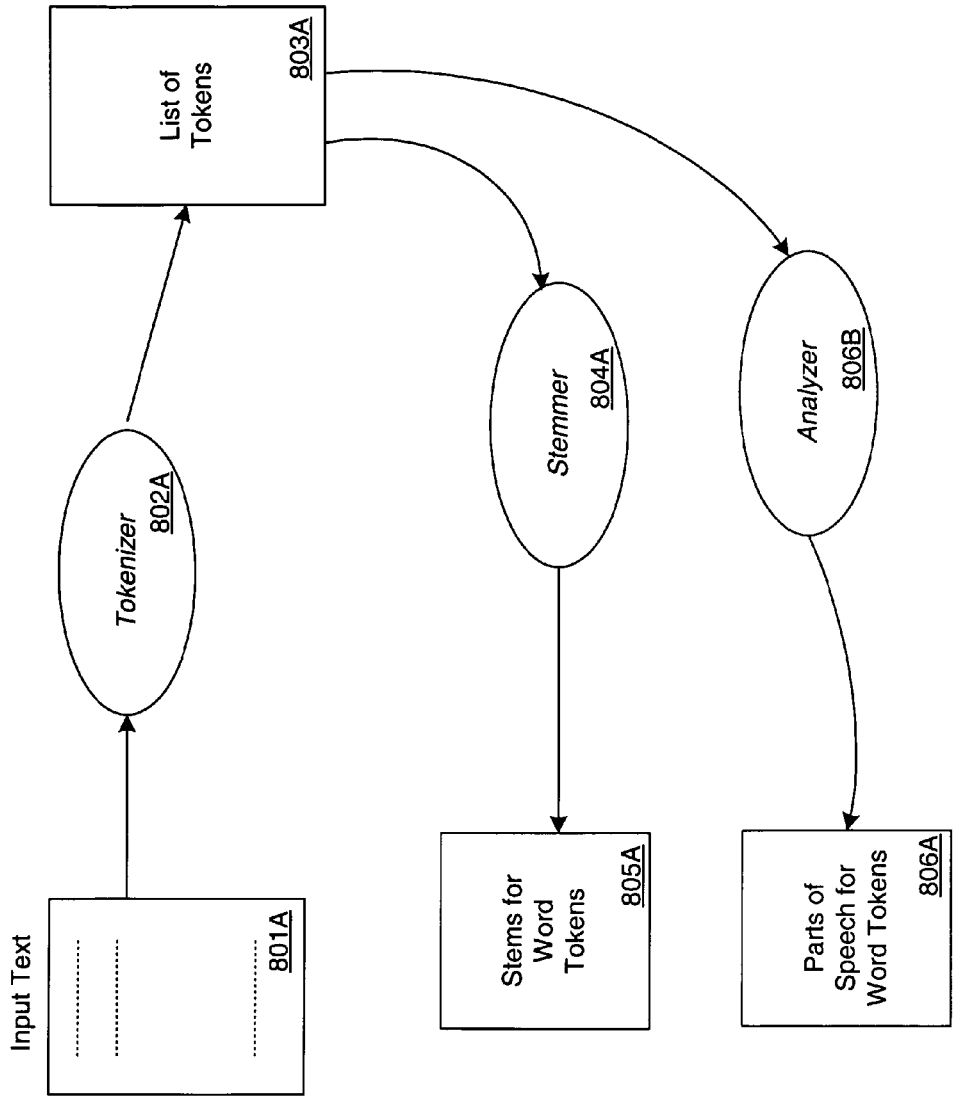
FIG. 9 is a flow diagram of the operations performed by a preferred embodiment of a natural language engine on a speech utterance including stemming and Lexical Analysis

As illustrated in FIG. 9, the functions used in a morphological analysis include tokenizers 802A, stemmers 804A and morphological analyzers 806A. The functions that comprise the phrase analysis include tokenizers, taggers and groupers, and their relationship is shown in FIG. 8.

Tokenizer 802A is a software module that functions to break up text of an input sentence 801A into a list of tokens 803A. In performing this function, tokenizer 802A goes through input text 801A and treats it as a series of tokens or useful meaningful units that are typically larger than individual characters, but smaller than phrases and sentences. These tokens 803A can include words, separable parts of word and punctuation. Each token 803A is given an offset and a length. The first phase of tokenization is segmentation, which extracts the individual tokens from the input text and keeps track of the offset where each token originated from in the input text. Next, categories are associated with each token, based on its shape. The process of tokenization is well-known in the art, so it can be performed by any convenient application suitable for the present invention.

Following tokenization, a stemmer process 804A is executed, which can include two separate forms—inflectional and derivational, for analyzing the tokens to determine their respective stems 805A. An inflectional stemmer recognizes affixes and returns the word which is the stem. A derivational stemmer on the other hand recognizes derivational affixes and returns the root word or words. While stemmer 804A associates an input word with its stem, it does not have parts of speech information. Analyzer 806B takes a word independent of context, and returns a set of possible parts of speech 806A.

As illustrated in FIG. 8, phrase analysis 800 is the next step that is performed after tokenization. A tokenizer 802 generates tokens from input text 801. Tokens 803 are assigned to parts of a speech tag by a tagger routine 804, and a grouper routine 806 recognizes groups of words as phrases of a certain syntactic type. These syntactic types include for example the noun phrases mentioned earlier, but could include other types if desired such as verb phrases and adjective phrases. Specifically, tagger 804 is a parts-of-speech disambiguator, which analyzes words in context. It has a built-in morphological analyzer (not shown) that allows it to identify all possible parts of speech for each token. The output of tagger 804 is a string with each token tagged with a parts-of-speech label 805. The final step in the linguistic process 800 is the grouping of words to form phrases 807. This function is performed by the grouper 806, and is very dependent, of course, on the performance and output of tagger component 804.

Accordingly, at the end of linguistic processing 800, a list of noun phrases (NP) 807 is generated in accordance with the user's query utterance. This set of NPs generated by NLE 190 helps significantly to refine the search for the best answer, so that a single-best answer can be later provided for the user's question.

The particular components of NLE 190 are shown in FIG. 4D, and include several components. Each of these components implement the several different functions required in NLE 190 as now explained.

Initialize Grouper Resources Object and the Library 900—this routine initializes the structure variables required to create grouper resource object and library. Specifically, it initializes a particular natural language used by NLE 190 to create a Noun Phrase, for example the English natural language is initialized for a system that serves the English language market. In turn, it also creates the objects (routines) required for Tokenizer, Tagger and Grouper (discussed above) with routines 900A, 900B, 900C and 900D respectively, and initializes these objects with appropriate values. It also allocates memory to store all the recognized Noun Phrases for the retrieved question pairs.

Tokenizing of the words from the given text (from the query or the paired questions) is performed with routine 909B—here all the words are tokenized with the help of a local dictionary used by NLE 190 resources. The resultant tokenized words are passed to a Tagger routine 909C. At routine 909C, tagging of all the tokens is done and the output is passed to a Grouper routine 909D.

The Grouping of all tagged token to form NP list is implemented by routine 909D so that the Grouper groups all the tagged token words and outputs the Noun Phrases.

Un-initializing of the grouper resources object and freeing of the resources, is performed by routines 909EA, 909EB and 909EC. These include Token Resources, Tagger Resources and Grouper Resources respectively. After initialization, the resources are freed. The memory that was used to store all Noun Phrases are also de-allocated.

Additional Embodiments

Figure 13:
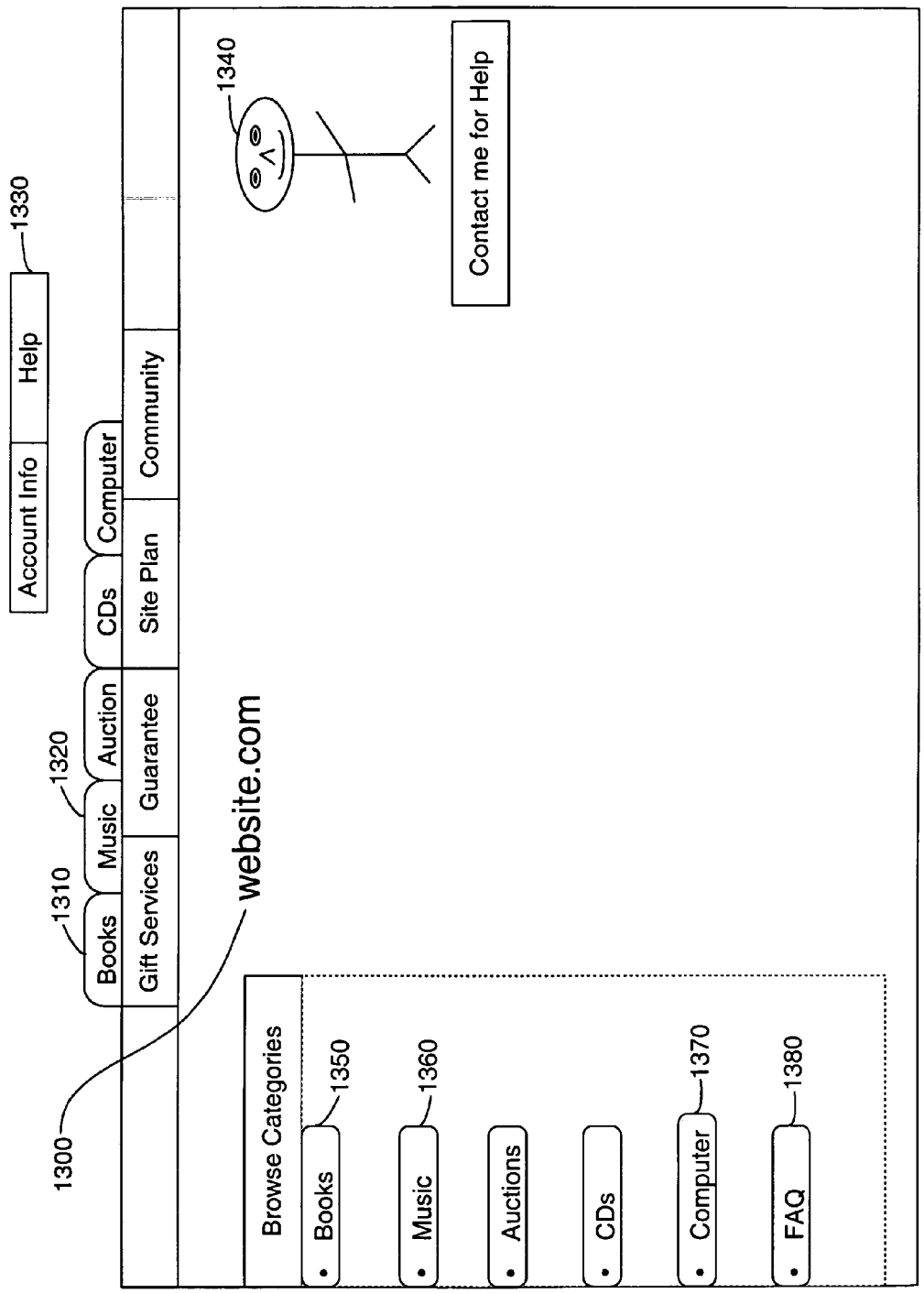
FIGS. 13-17 are illustrations of another embodiment of the present invention implemented as part of a Web-based e-commerce system.
Figure 14:
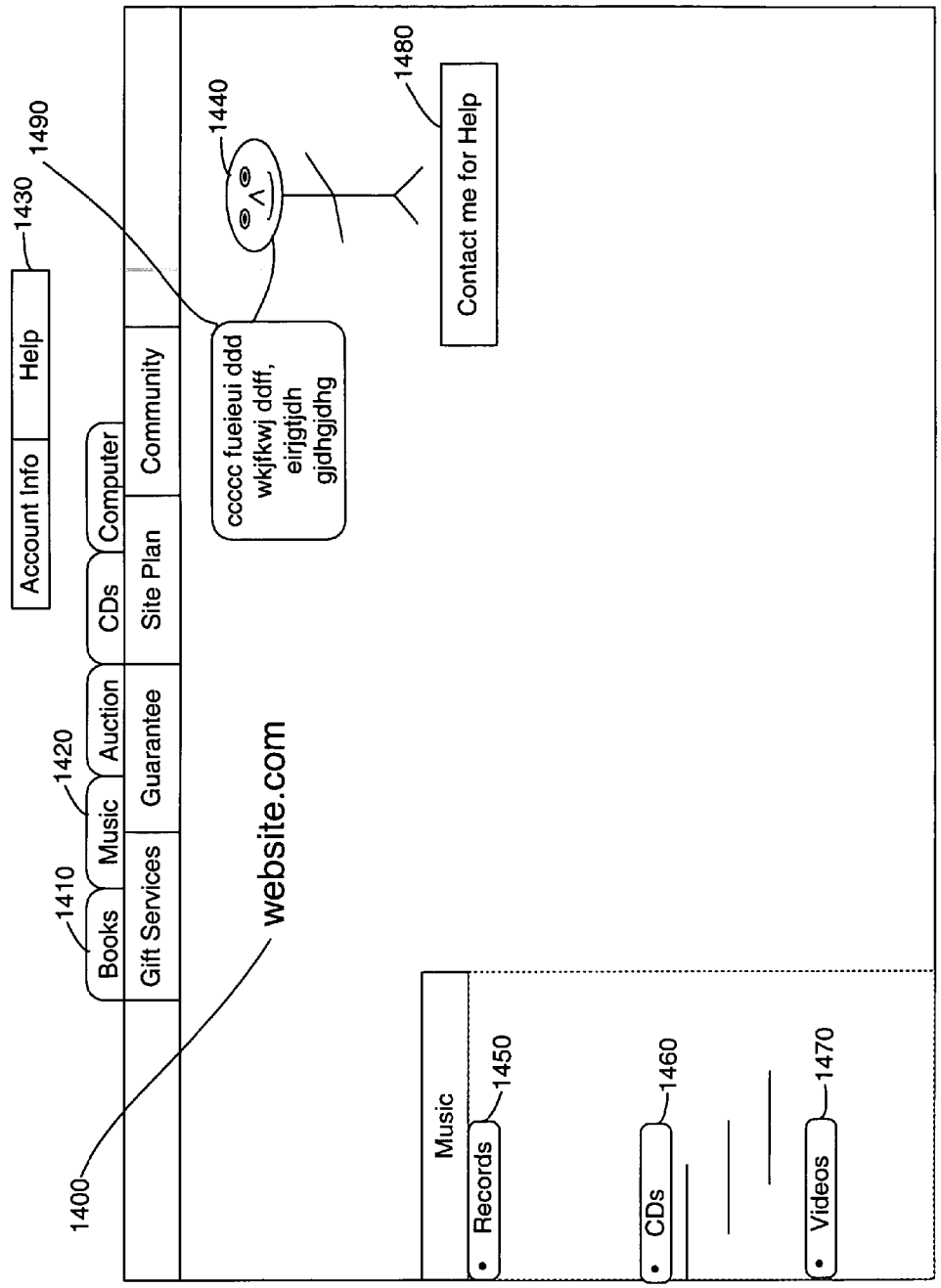
Figure 15:
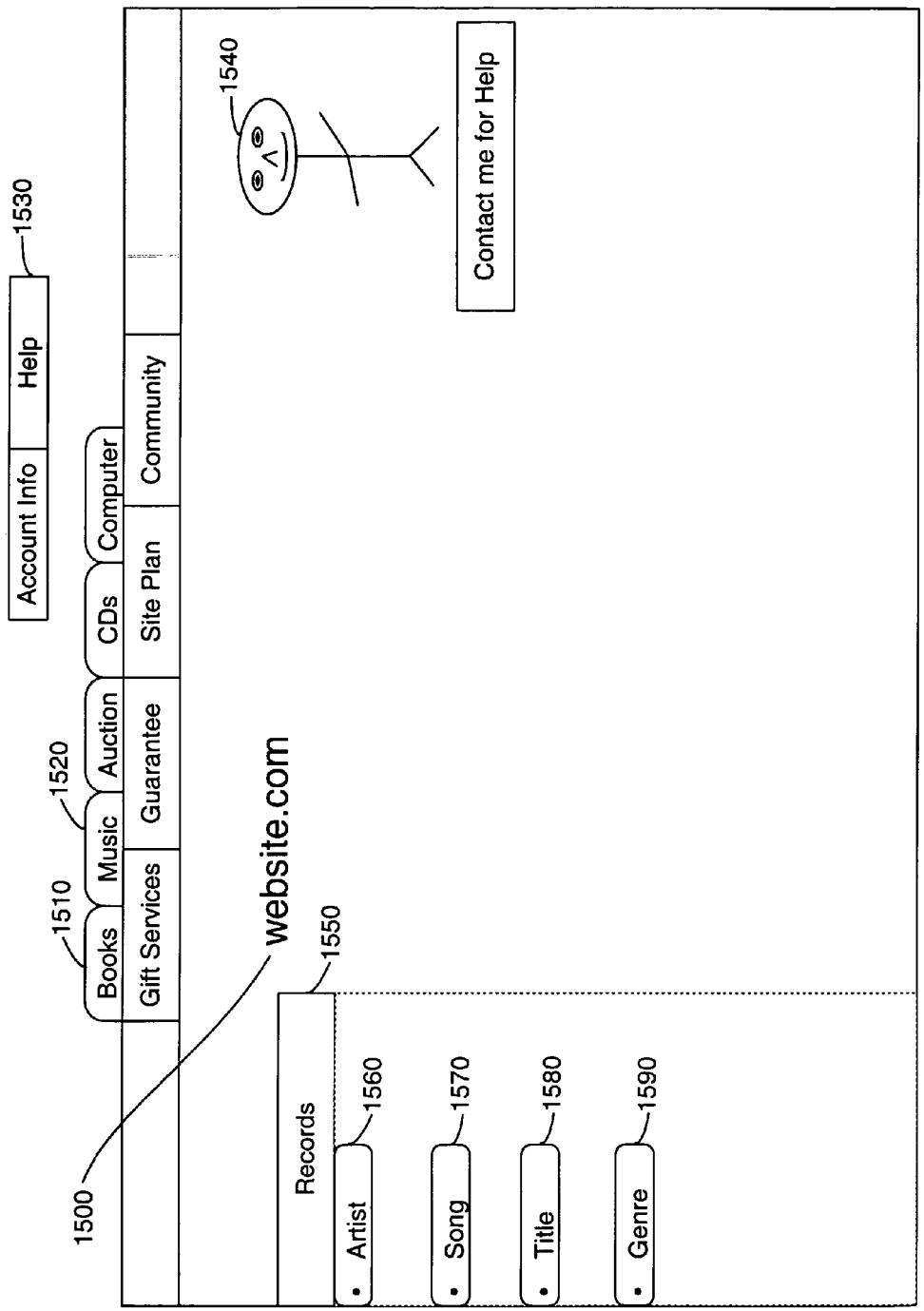
Figure 16:
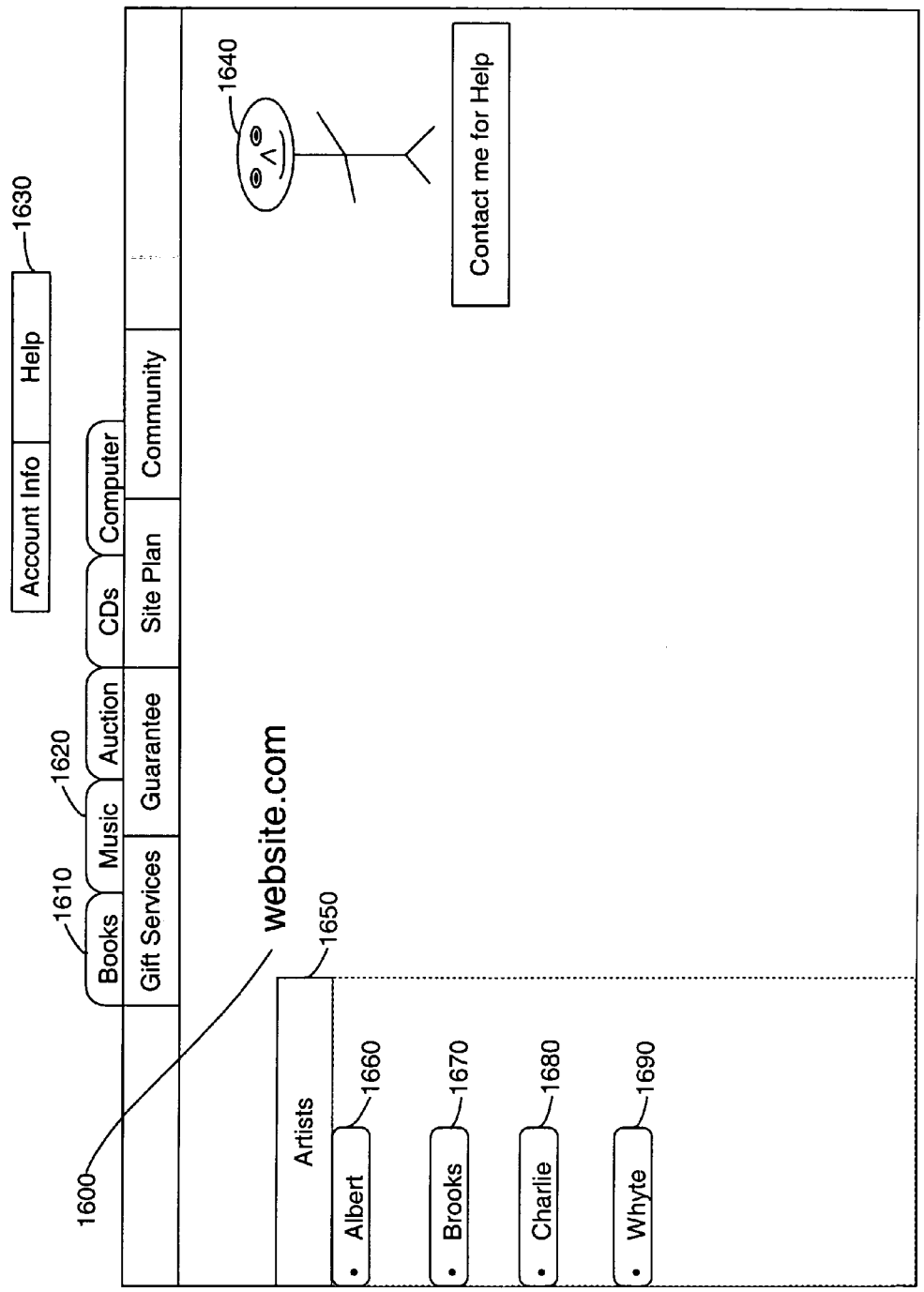
Figure 17:
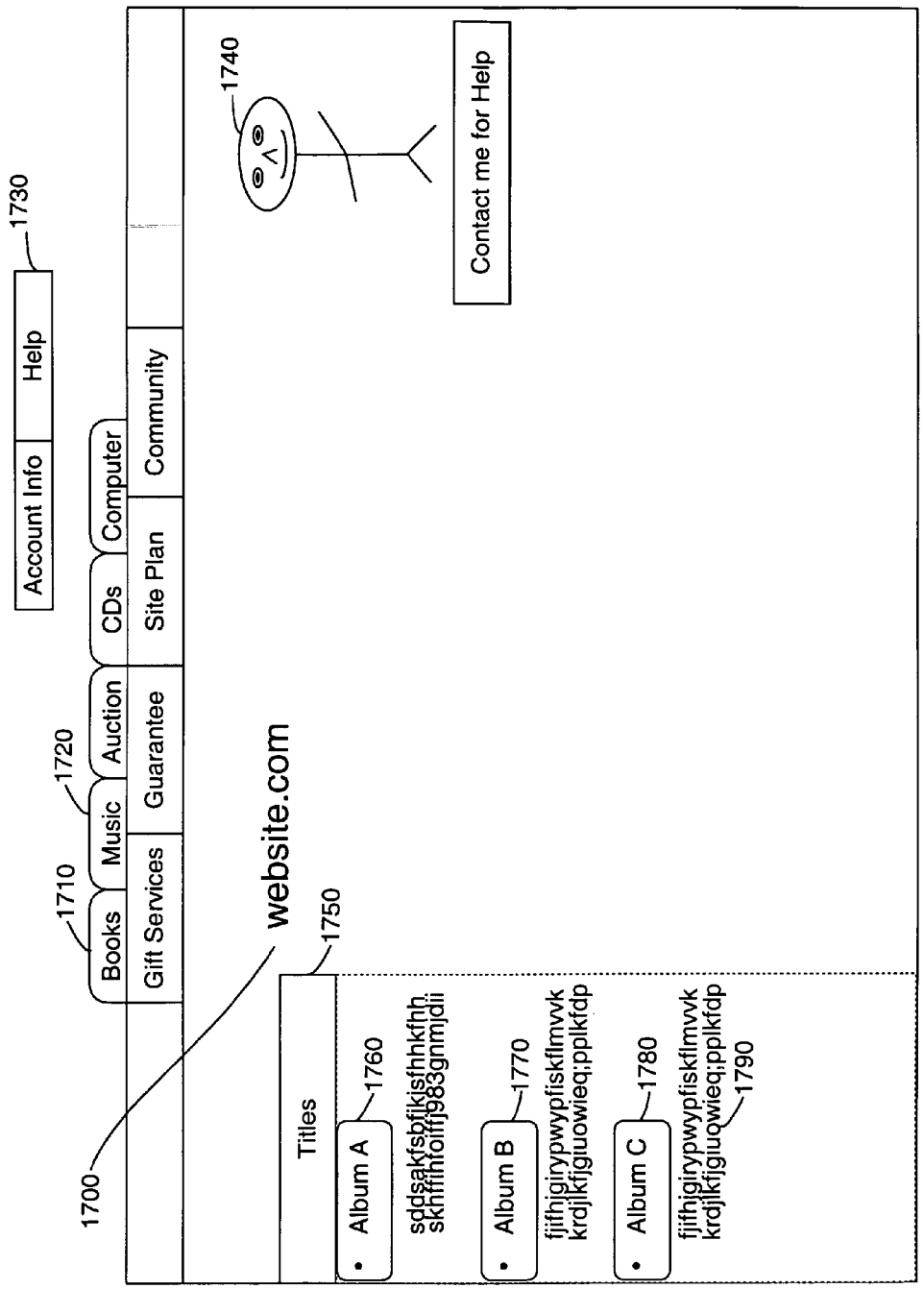

In an e-commerce embodiment of the present invention as illustrated in FIG. 13, a web page 1300 contains typical visible links such as Books 1310, Music 1320 so that on clicking the appropriate link the customer is taken to those pages. The web page may be implemented using HTML, a Java applet, or similar coding techniques which interact with the user's browser. For example, if customer wants to buy an album C by Artist Albert, he traverses several web pages as follows: he first clicks on Music (FIG. 13, 1360), which brings up page 1400 where he/she then clicks on Records (FIG. 14, 1450). Alternatively, he/she could select CDs 1460, Videos 1470, or other categories of books 1410, music 1420 or help 1430. As illustrated in FIG. 15, this brings up another web page 1500 with links for Records 1550, with sub-categories—Artist 1560, Song 1570, Title 1580, Genre 1590. The customer must then click on Artist 1560 to select the artist of choice. This displays another web page 1600 as illustrated in FIG. 16. On this page the various artists 1650 are listed as illustrated— Albert 1650, Brooks 1660, Charlie 1670, Whyte 1690 are listed under the category Artists 1650. The customer must now click on Albert 1660 to view the albums available for Albert. When this is done, another web page is displayed as shown in FIG. 17. Again this web page 1700 displays a similar look and feel, but with the albums available 1760, 1770, 1780 listed under the heading Titles 1750. The customer can also read additional information 1790 for each album. This album information is similar to the liner notes of a shrink-wrapped album purchased at a retail store. One Album A is identified, the customer must click on the Album A 1760. This typically brings up another text box with the information about its availability, price, shipping and handling charges etc.

When web page 1300 is provided with functionality of a NLQS of the type described above, the web page interacts with the client side and server side speech recognition modules described above. In this case, the user initiates an inquiry by simply clicking on a button designated Contact Me for Help 1480 (this can be a link button on the screen, or a key on the keyboard for example) and is then told by character 1440 about how to elicit the information required. If the user wants Album A by artist Albert, the user could articulate "Is Album A by Brooks available?" in much the same way they would ask the question of a human clerk at a brick and mortar facility. Because of the rapid recognition performance of the present invention, the user's query would be answered in real-time by character 1440 speaking out the answer in the user's native language. If desired, a readable word balloon 1490 could also be displayed to see the character's answer and so that save/print options can also be implemented. Similar appropriate question/answer pairs for each page of the website can be constructed in accordance with the present teachings, so that the customer is provided with an environment that emulates a normal conversational human-like question and answer dialog for all aspects of the web site. Character 1440 can be adjusted and tailored according to the particular commercial application, or by the user's own preferences, etc. to have a particular voice style (man, woman, young, old, etc.) to enhance the customer's experience.

In a similar fashion, an articulated user query might be received as part of a conventional search engine query, to locate information of interest on the INTERNET in a similar manner as done with conventional text queries. If a reasonably close question/answer pair is not available at the server side (for instance, if it does not reach a certain confidence level as an appropriate match to the user's question) the user could be presented with the option of increasing the scope so that the query would then be presented simultaneously to one or more different NLEs across a number of servers, to improve the likelihood of finding an appropriate matching question/answer pair. Furthermore, if desired, more than one "match" could be found, in the same fashion that conventional search engines can return a number of potential "hits" corresponding to the user's query. For some such queries, of course, it is likely that real-time performance will not be possible (because of the disseminated and distributed processing) but the advantage presented by extensive supplemental question/answer database systems may be desirable for some users.

It is apparent as well that the NLQS of the present invention is very natural and saves much time for the user and the e-commerce operator as well. In an e-support embodiment, the customer can retrieve information quickly and efficiently, and without need for a live customer agent. For example, at a consumer computer system vendor related support site, a simple diagnostic page might be presented for the user, along with a visible support character to assist him/her. The user could then select items from a "symptoms" page (i.e., a "monitor" problem, a "keyboard" problem, a "printer" problem, etc.) simply by articulating such symptoms in response to prompting from the support character. Thereafter, the system will direct the user on a real-time basis to more specific sub-menus, potential solutions, etc. for the particular recognized complaint. The use of a programmable character thus allows the web site to be scaled to accommodate a large number of hits or customers without any corresponding need to increase the number of human resources and its attendant training issues.

As an additional embodiment, the searching for information on a particular web site may be accelerated with the use of the NLQS of the present invention. Additionally, a significant benefit is that the information is provided in a user-friendly manner through the natural interface of speech. The majority of web sites presently employ lists of frequently asked questions which the user typically wades item by item in order to obtain an answer to a question or issue. For example, as displayed in FIG. 13, the customer clicks on Help 1330 to initiate the interface with a set of lists. Other options include computer related items at 1370 and frequently asked questions (FAQ) at 1380.

Figure 18A:
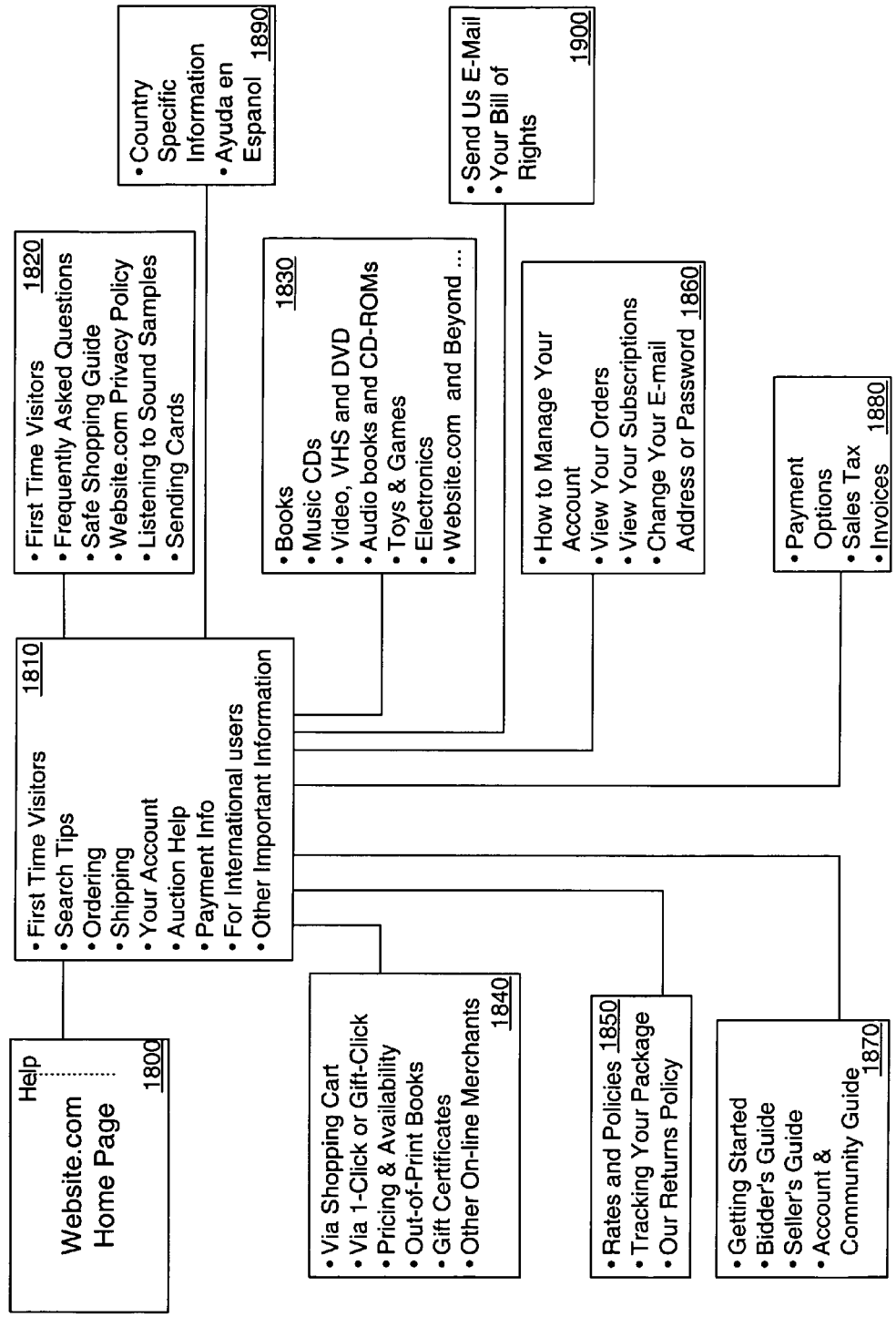
FIG. 18 is an illustration of another embodiment of the present invention implemented as part of a voice-based Help Page for an E-Commerce Web Site.
Figure 18B:
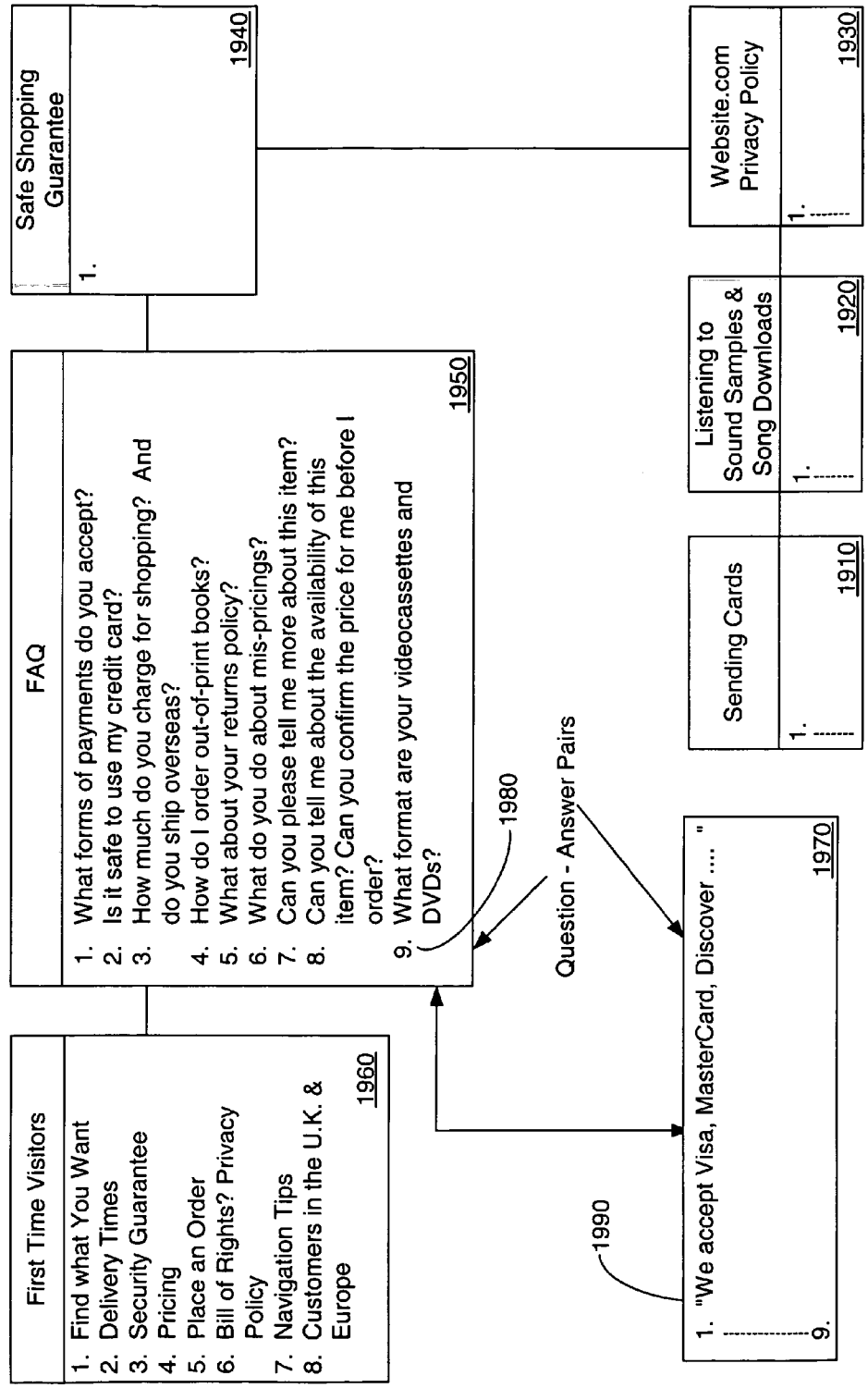

As illustrated in FIG. 18, a web site plan for typical web page is displayed. This illustrates the number of pages that have to be traversed in order to reach the list of Frequently-Asked Questions. Once at this page, the user has to scroll and manually identify the question that matches his/her query. This process is typically a laborious task and may or may not yield the information that answers the user's query. The present art for displaying this information is illustrated in FIG. 18. This figure identifies how the information on a typical web site is organized: the Help link (FIG. 13, 1330) typically shown on the home page of the web page is illustrated shown on FIG. 18 as 1800. Again referring to FIG. 18, each sub-category of information is listed on a separate page. For example, 1810 lists sub-topics such as 'First Time Visitors', 'Search Tips', 'Ordering', 'Shipping', 'Your Account' etc. Other pages deal with 'Account information' 1860, 'Rates and Policies' 1850 etc. Down another level, there are pages that deal exclusively with a sub-sub topics on a specific page such as 'First Time Visitors' 1960, 'Frequently Asked Questions' 1950, 'Safe Shopping Guarantee' 1940, etc. So if a customer has a query that is best answered by going to the Frequently Asked Questions link, he or she has to traverse three levels of busy and cluttered screen pages to get to the Frequently Asked Questions page 1950. Typically, there are many lists of questions 1980 that have to be manually scrolled through. While scrolling visually, the customer then has to visually and mentally match his or her question with each listed question. If a possible match is sighted, then that question is clicked and the answer then appears in text form which then is read.

In contrast, the process of obtaining an answer to a question using a web page enabled with the present NLQS can be achieved much less laboriously and efficiently. The user would articulate the word "Help" (FIG. 13, 1330). This would immediately cause a character (FIG. 13, 1340) to appear with the friendly response "May I be of assistance. Please state your question?". Once the customer states the question, the character would then perform an animation or reply "Thank you, I will be back with the answer soon". After a short period time (preferably not exceeding 5-7 seconds) the character would then speak out the answer to the user's question. As illustrated in FIG. 18 the answer would be the answer 1990 returned to the user in the form of speech is the answer that is paired with the question 1950. For example, the answer 1990: "We accept Visa, MasterCard and Discover credit cards", would be the response to the query 2000 "What forms of payments do you accept?"

Figure 12:
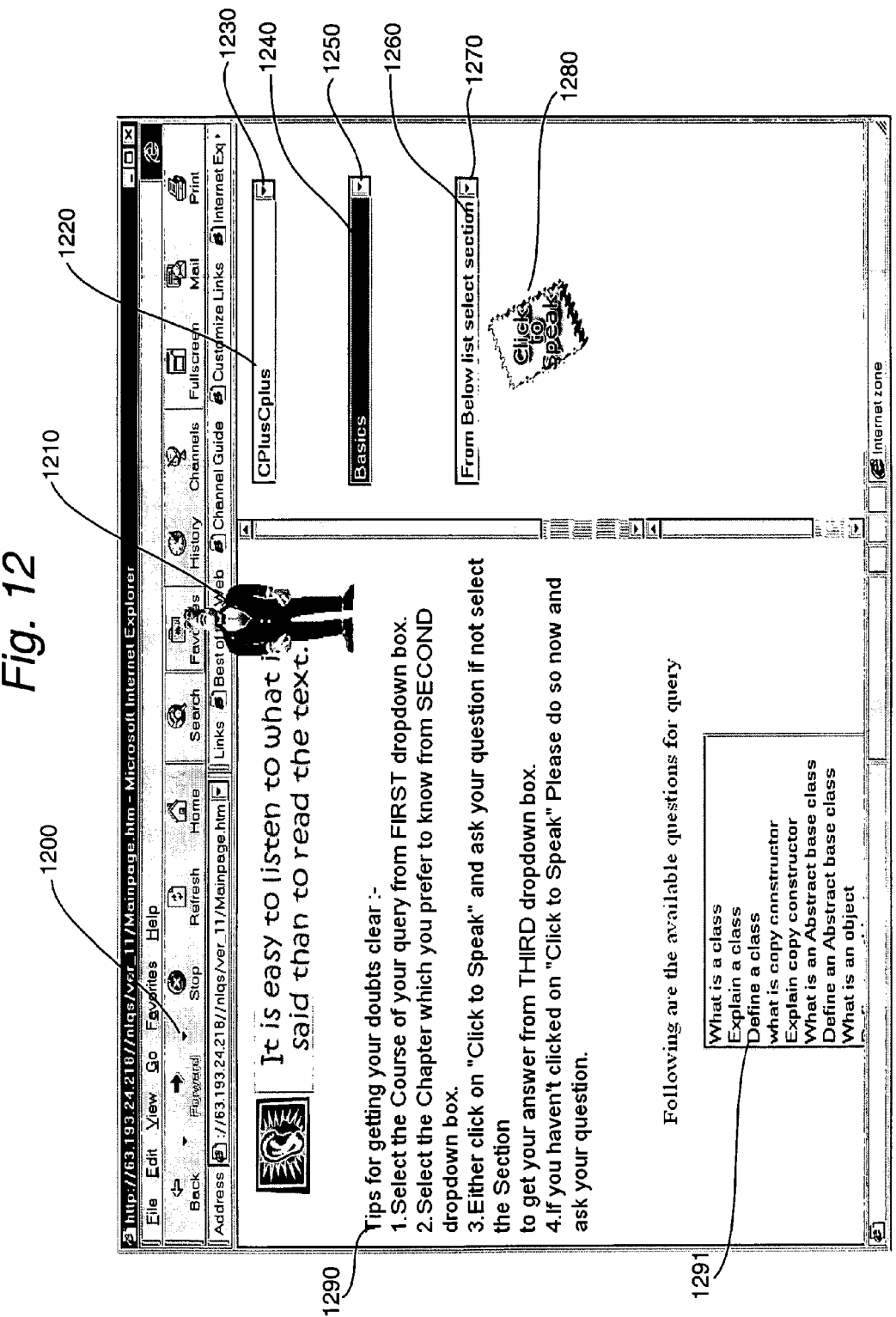
FIG. 12 is an illustration of another embodiment of the present invention implemented as part of a Web-based speech based learning/training System.

Another embodiment of the invention is illustrated in FIG. 12. This web page illustrates a typical website that employs NLQS in a web-based learning environment. As illustrated in FIG. 12, the web page in browser 1200, is divided into two or more frames. A character 1210 in the likeness of an instructor is available on the screen and appears when the student initiates the query mode either by speaking the word "Help" into a microphone (FIG. 2B, 215) or by clicking on the link 'Click to Speak' (FIG. 12, 1280). Character 1210 would then prompt the student to select a course 1220 from the drop down list 1230. If the user selects the course 'CPlusPlus', the character would then confirm verbally that the course "CPlusPlus" was selected. The character would then direct the student to make the next selection from the drop-down list 1250 that contains the selections for the chapters 1240 from which questions are available. Again, after the student makes the selection, the character 1210 confirms the selection by speaking. Next character 1210 prompts the student to select 'Section' 1260 of the chapter from which questions are available from the drop down list 1270. Again, after the student makes the selection, character 1210 confirms the selection by articulating the 'Section' 1260 chosen. As a prompt to the student, a list of possible questions appear in the list box 1291. In addition, tips 1290 for using the system are displayed. Once the selections are all made, the student is prompted by the character to ask the question as follows: "Please ask your query now". The student then speaks his query and after a short period of time, the character responds with the answer preceded by the question as follows: "The answer to your question . . . is as follows: . . . ". This procedure allows the student to quickly retrieve answers to questions about any section of the course and replaces the tedium of consulting books, and references or indices. In short, it is can serve a number of uses from being a virtual teacher answering questions on-the-fly or a flash card substitute.

From preliminary data available to the inventors, it is estimate that the system can easily accommodate 100-250 question/answer pairs while still achieving a real-time feel and appearance to the user (i.e., less than 10 seconds of latency, not counting transmission) using the above described structures and methods. It is expected, of course, that these figures will improve as additional processing speed becomes available, and routine optimizations are employed to the various components noted for each particular environment.

Again, the above are merely illustrative of the many possible applications of the present invention, and it is expected that many more web-based enterprises, as well as other consumer applications (such as intelligent, interactive toys) can utilize the present teachings. Although the present invention has been described in terms of a preferred embodiment, it will be apparent to those skilled in the art that many alterations and modifications may be made to such embodiments without departing from the teachings of the present invention. It will also be apparent to those skilled in the art that many aspects of the present discussion have been simplified to give appropriate weight and focus to the more germane aspects of the present invention. The microcode and software routines executed to effectuate the inventive methods may be embodied in various forms, including in a permanent magnetic media, a non-volatile ROM, a CD-ROM, or any other suitable machine-readable format. Accordingly, it is intended that the all such alterations and modifications be included within the scope and spirit of the invention as defined by the following claims.

What is claimed is:

1. A method of recognizing a speech utterance from a user at a network server system, comprising:
   automatically evaluating an amount of computing resources available at the network server system for performing speech recognition operations during a connection on speech related data transmitted by a client device being used by the user;
   wherein said speech related data corresponds to partially recognized speech data;
   automatically specifying a first set of speech recognition operations to be performed by the network server system during said connection on said speech related data from the client device in response to the evaluating;
   wherein said first set of speech recognition operations are specified during an initialization period and are configurable on a connection-by-connection basis with each client device; and
   further wherein full recognition of the speech utterance is performed across a distributed client-server system, with said speech utterance being mapped to a predefined query/answer pair stored in a query database maintained by an operator of the network server system.

2. The method of claim 1, wherein said partially recognized speech data includes a byte stream of mel frequency cepstrum coefficients (MFCC).

3. The method of claim 1, wherein the client device is configured to perform a second set of speech recognition operations based on evaluating an amount of computing resources available at the client device.

4. The method of claim 1, wherein said first set of speech recognition operations are configured based on an application executing on the client device.

5. The method of claim 1, wherein said speech related data is communicated under control of an INTERNET browser running on the client device over an INTERNET connection to the network server system.

6. The method of claim 1, further comprising:
   providing an electronic agent to present interactive real-time responses to the speech utterance in a same language as said speech utterance, said electronic agent being adapted to mimic behavior and responses of a human agent.

7. The method of claim 6, wherein said electronic agent has a visual appearance and natural language speech output correlated to a context experienced by a user providing the speech utterance, an environment experienced by said user, and/or a group associated with said user.

8. The method of claim 6, wherein a different electronic agent can be presented to different users providing speech utterances received by the network server system.

9. The method of claim 6, wherein characteristics of said electronic agent, including visual appearance parameters and/or vocal parameters can be controlled by a user of the client device.

10. A system for recognizing a speech utterance from a user at a network server system comprising:

a first routine adapted for automatically evaluating an amount of computing resources available at the network server system for performing speech recognition operations during a connection on speech related data transmitted by a client device being used by the user;

wherein said speech related data corresponds to partially recognized speech data;

a second routine adapted for automatically performing a first set of speech recognition operations during said connection at the network server system on said speech related data from the client device in response to the evaluating of the first routine;

wherein said first set of speech recognition operations are specified during an initialization period and are configurable on a connection-by-connection basis with each client device; and further wherein full recognition of the speech utterance is performed across a distributed client-server system, with said speech related data being mapped to a predefined query/answer pair stored in a query database maintained by an operator of the network server system.

11. The system of claim 10, wherein said first routine is included as part of an INTERNET web browser program executing on the client device.

12. The system of claim 10, wherein the client device is a portable electronic appliance adapted for INTERNET communications.

13. The system of claim 12, wherein said speech related data is transmitted using a byte stream that is continuous during non-silent periods.

\* \* \* \* \*